(12) United States Patent
Vymenets et al.

(10) Patent No.: US 9,392,112 B2
(45) Date of Patent: Jul. 12, 2016

(54) FLOW DESIGNER FOR CONTACT CENTERS

(71) Applicant: GENESYS TELECOMMUNICATIONS LABORATORIES, INC., Daly City, CA (US)

(72) Inventors: Leonid Vymenets, Toronto (CA); Praphul Kumar, Falls Church, VA (US); Herbert Willi Artur Ristock, Walnut Creek, CA (US); Vyacheslav Zhakov, Burlingame, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/723,429

(22) Filed: May 27, 2015

(65) Prior Publication Data

US 2015/0350437 A1 Dec. 3, 2015

Related U.S. Application Data

(60) Provisional application No. 62/003,525, filed on May 27, 2014.

(51) Int. Cl.
| | |
|---|---|
| *H04M 3/00* | (2006.01) |
| *H04M 5/00* | (2006.01) |
| *H04M 3/51* | (2006.01) |
| *H04M 3/523* | (2006.01) |
| *G06Q 30/00* | (2012.01) |
| *H04M 3/22* | (2006.01) |
| *G06F 3/0484* | (2013.01) |

(52) U.S. Cl.
CPC ......... *H04M 3/5175* (2013.01); *G06F 3/04842* (2013.01); *G06Q 30/016* (2013.01); *H04M 3/2227* (2013.01); *H04M 3/5183* (2013.01); *H04M 3/5191* (2013.01); *H04M 3/523* (2013.01); *H04M 3/5232* (2013.01)

(58) Field of Classification Search
USPC ............. 379/265.03, 265.02, 265.01, 265.11, 379/266.08, 272
See application file for complete search history.

(56) References Cited

U.S. PATENT DOCUMENTS

| | | | |
|---|---|---|---|
| 5,608,789 A | 3/1997 | Fisher et al. | |
| 2009/0080641 A1* | 3/2009 | Fitzgerald | H04M 3/493 379/265.11 |
| 2013/0251126 A1* | 9/2013 | Hollander | H04M 3/5183 379/93.17 |
| 2014/0177819 A1 | 6/2014 | Vymenets et al. | |
| 2014/0233719 A1 | 8/2014 | Vymenets et al. | |

* cited by examiner

*Primary Examiner* — Quynh Nguyen

(74) *Attorney, Agent, or Firm* — Lewis Roca Rothgerber Christie LLP

(57) ABSTRACT

In a system for managing an interaction flow for a contact center, the system includes: a processor; and a memory coupled to the processor, wherein the memory has stored thereon, instructions that, when executed by the processor, cause the processor to: display on a graphical display, an interaction flow canvas and an interaction block selection tool; receive a user input to add a first interaction block to the interaction flow canvas; generate a first interaction instruction corresponding to the first interaction block; and receive a user input to add a second interaction block to the interaction flow canvas, wherein the first interaction instruction comprises an instruction for proceeding to the second interaction block after a criterion of the first interaction block is satisfied.

38 Claims, 51 Drawing Sheets
(41 of 51 Drawing Sheet(s) Filed in Color)

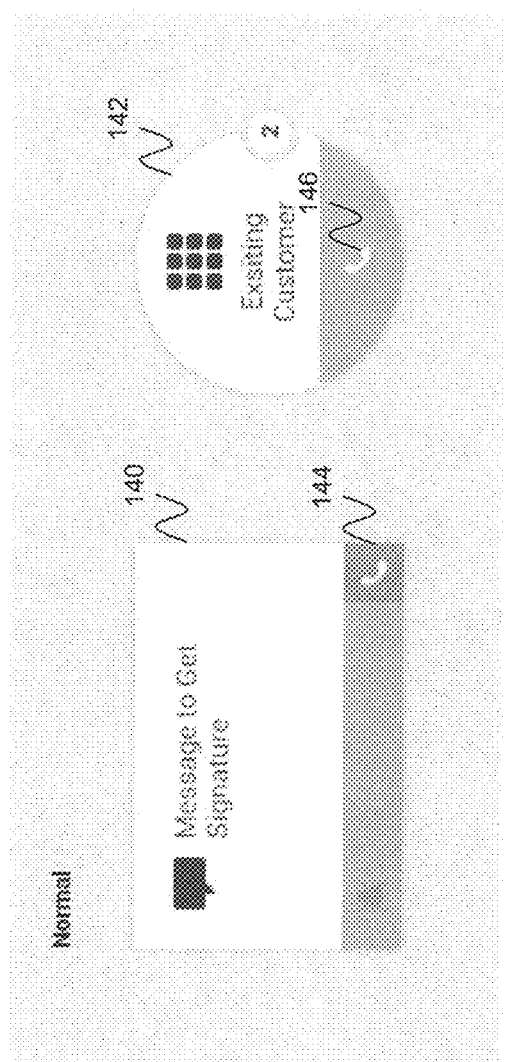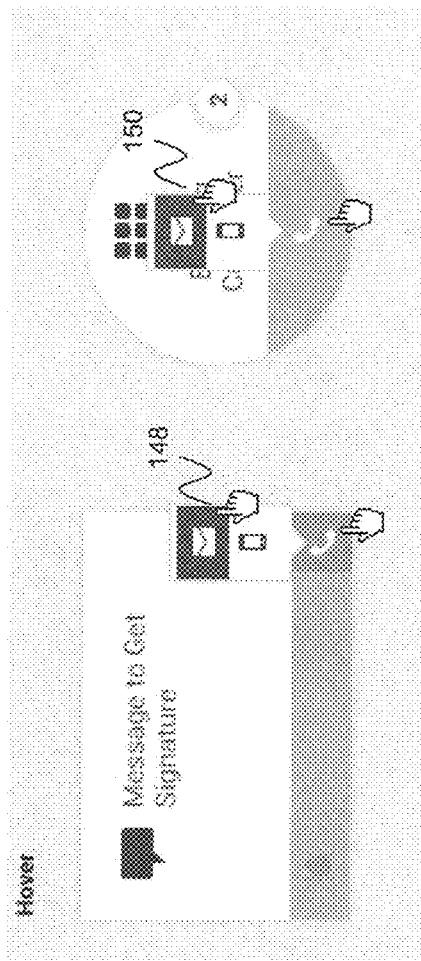

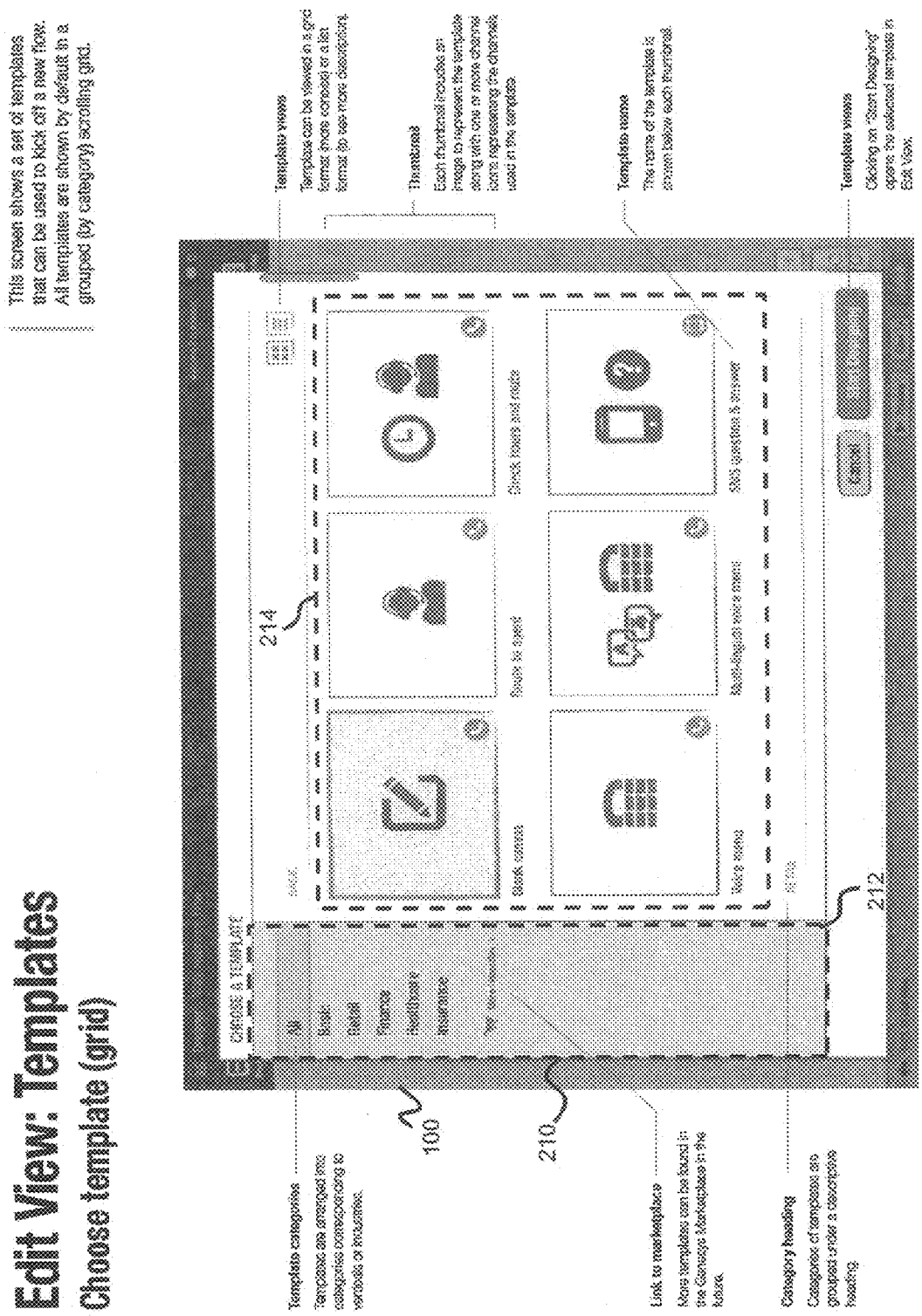

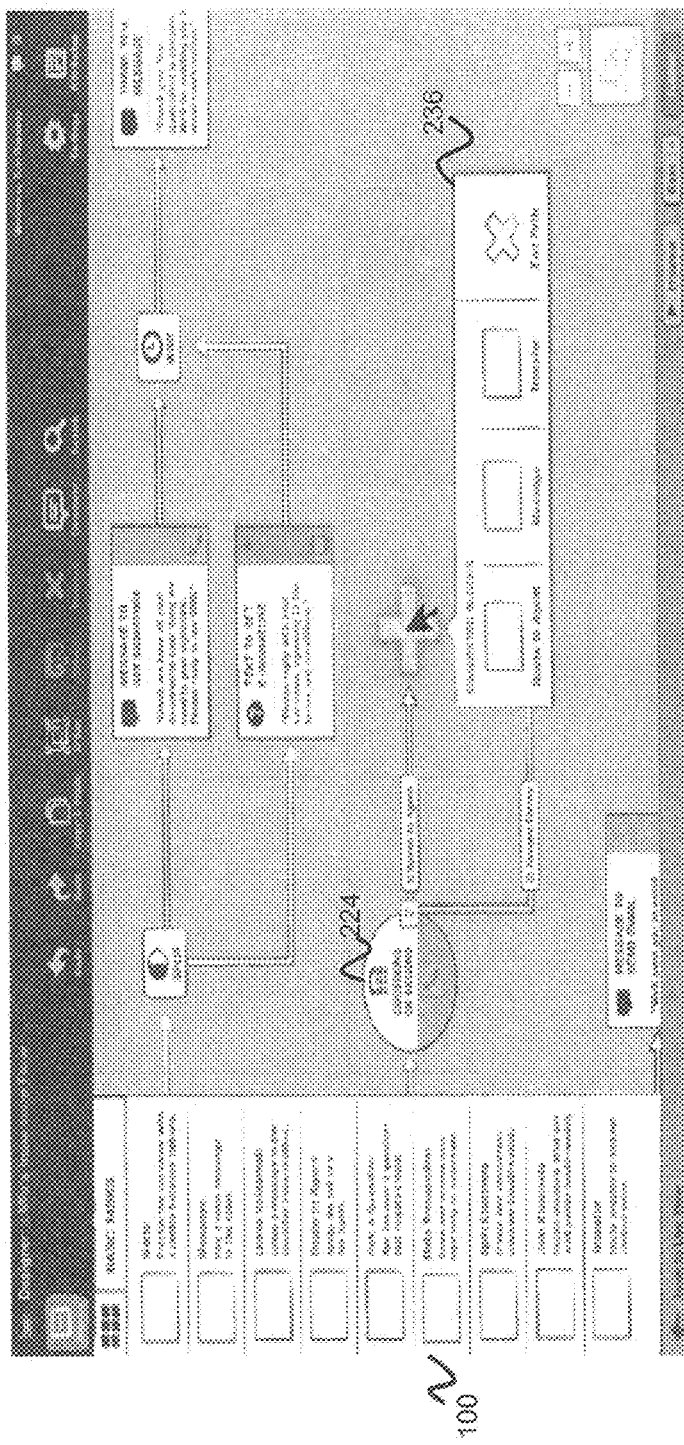

FIG. 5E

Suggested blocks overlay
Selecting the plus sign displays a pop-over with a limited set of blocks. These blocks are system's suggestion for what might logically follow in the flow sequence. This simplifies the decision for users and keeps them focused on the canvas. Selecting the end path option truncates the connector and caps off the previous block with a distinguishing red 'book end'.

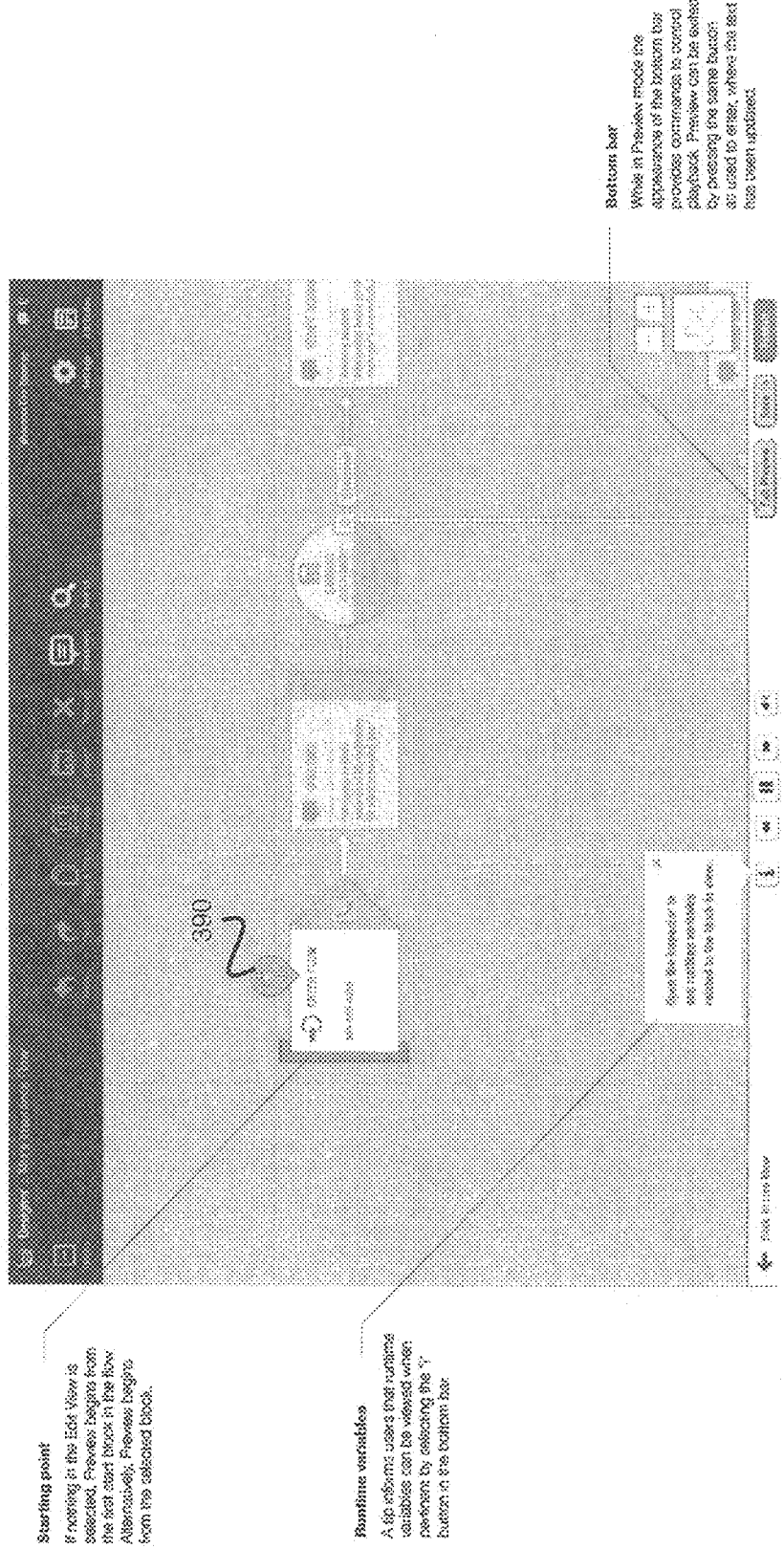

Medium zoom on traffic view
Additional block content is revealed as the user zooms in. Block faces display more information about the content of the block. For example, Message blocks show a snippet of the prompt.

FLOW DESIGNER FOR CONTACT CENTERS

CROSS-REFERENCE TO RELATED APPLICATION

The present application claims priority to and the benefit of U.S. Provisional Patent Application No. 62/003,525, filed May 27, 2014, entitled "FLOW DESIGNER FOR CONTACT CENTERS," the entire content of which is incorporated herein by reference. This application is further related to U.S. patent application Ser. No. 14/723,428, entitled "SYSTEM AND METHOD FOR EXECUTING INTERACTION FLOW FOR CONTACT CENTERS," filed on even date herewith, the entire content of which is incorporated herein by reference. The present application is further related to U.S. patent application Ser. No. 14/723,431, entitled "SYSTEM AND METHOD FOR MANAGING INTERACTION FLOW FOR CONTACT CENTERS," filed on even date herewith, the entire content of which is incorporated herein by references.

BACKGROUND

It is desirable to aid companies to deploy their contact center operations as efficiently and successfully as possible. However, one of the items that may take time to implement for a new contact center is the designing of applications. Applications may be used by the contact center to route different types of communications (also referred to as interactions) flowing in and out of the contact center.

It is desirable to have a system and method for generating applications efficiently without requiring skilled technicians or customized coding that are difficult to generate, deploy, and modify.

Additionally, once a contact center is deployed, it may be useful for a contact center administrator to monitor the contact center, for example, to observe the performance of the contact center agents, services levels, call flows, and the like, particularly in real-time. Accordingly, what is also desired is a system and method for monitoring contact centers efficiently in real-time.

The above information disclosed in this Background section is only for enhancement of understanding of the background of the invention and therefore it may contain information that does not constitute prior art.

BRIEF DESCRIPTION OF THE DRAWINGS

The present patent or application file contains at least one drawing executed in color. Copies of this patent or patent application publication with color drawings will be provided by the Office upon request and payment of the necessary fee.

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIGS. 4A and 4B are block diagrams of basic building blocks used for designing an interaction flow, according to some embodiments of the present invention;

FIGS. 5A-5I are screen shots of an interface for enabling design of an interaction flow, according to some embodiments of the present invention;

FIGS. 9A-9F are screen shots illustrating a tool bar for playback, simulation, and creation of an interaction flow design, according to some embodiments of the present invention;

SUMMARY

Figure 1:
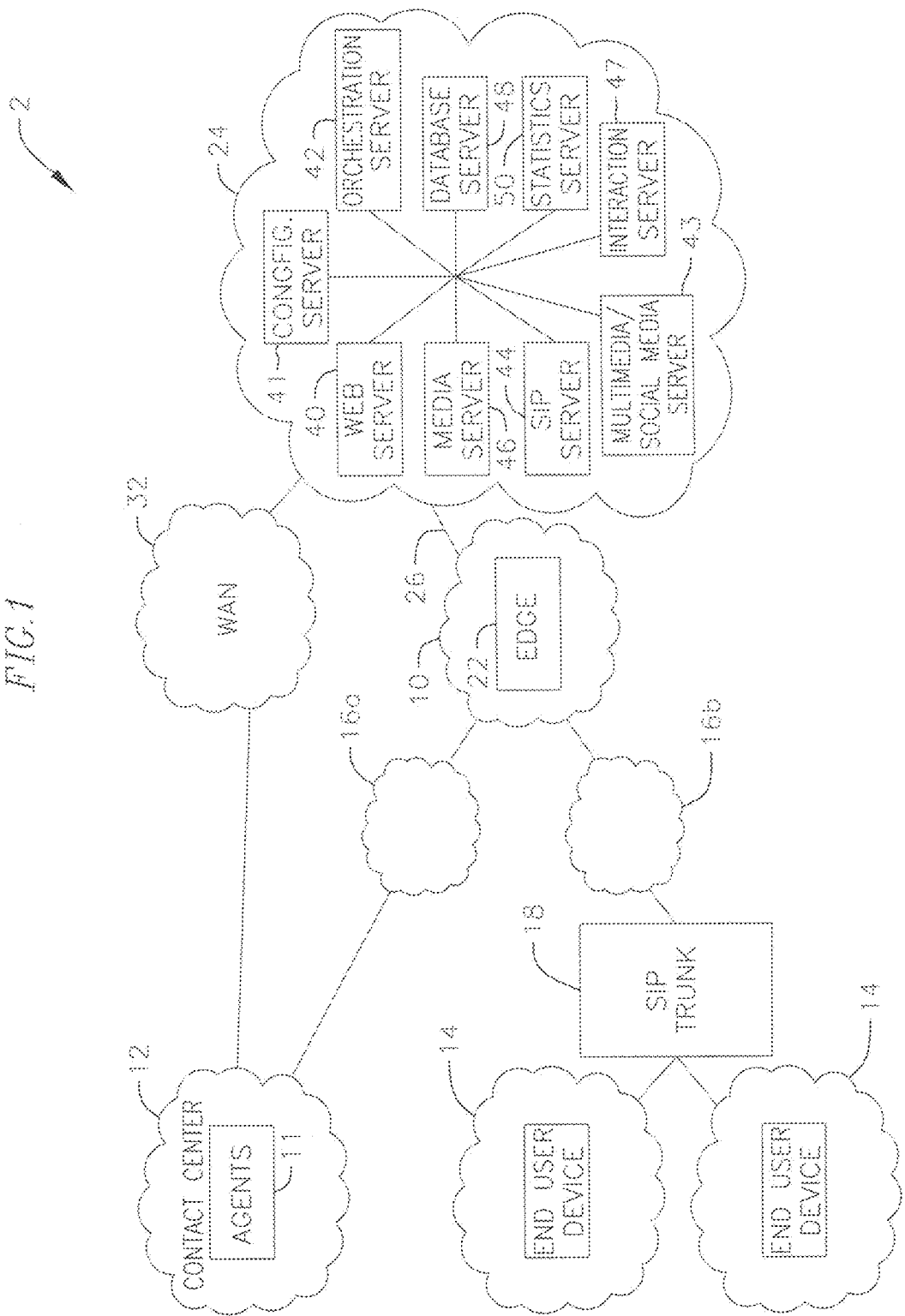
FIG. 1 is a schematic block diagram of an interaction system for dynamic configuration, reconfiguration, routing, and monitoring of communications or interactions, according to some embodiments of the present invention.

Example embodiments of the present invention are directed toward systems and methods for designing and executing an interaction flow, for example, in the context of a contact center environment.

According to some embodiments of the present invention, in a system for managing an interaction flow for a contact center, the system includes: a processor; and a memory coupled to the processor, wherein the memory has stored thereon, instructions that, when executed by the processor, cause the processor to: display on a graphical display, an interaction flow canvas and an interaction block selection tool; receive a user input to add a first interaction block to the interaction flow canvas; generate a first interaction instruction corresponding to the first interaction block; receive a user input to add a second interaction block to the interaction flow canvas, wherein the first interaction instruction comprises an instruction for proceeding to the second interaction block after a criterion of the first interaction block is satisfied.

According to some embodiments, the instructions further cause the processor to modify the first interaction instruction after receiving the user input to add the second interaction block to generate an outgoing instruction.

According to some embodiments, the instructions further cause the processor to: generate a first flow path and a second flow path originating from the first interaction block; and join the first flow path and the second flow path at the second interaction block.

According to some embodiments, the first interaction instruction comprises an instruction to split the flow into the first flow path and the second flow path, wherein the first flow path and the second flow path comprise a first communication channel block and a second communication channel block, respectively.

According to some embodiments, the instructions further cause the processor to generate a second interaction instruction corresponding to the second interaction block, the second interaction instructions comprising an instruction to wait until an action at the first flow path and an action at the second flow path are both completed before proceeding to a subsequent block in the interaction flow.

According to some embodiments, the instructions further cause the processor to generate the first interaction instruction according to a predefined parameter of the first interaction block.

According to some embodiments, the instructions further cause the processor to: display a channel selection option for selecting a communication channel corresponding to the first interaction block; detect a selection of the channel selection option; detect a selection of an alternative communication channel within the channel selection option; and modify the first interaction instruction according to the alternative communication channel.

According to some embodiments, the instructions further cause the processor to display a recommendation for the second interaction block in response to receiving the user input to add the first interaction block to the interaction flow canvas.

According to some embodiments, the instructions further cause the processor to display a plurality of channel options corresponding to the first interaction block.

According to some embodiments, the instructions further cause the processor to: detect a selection of one of the plurality of channel options; and automatically display an attribute of the first interaction block in response to detecting the selection of the one of the plurality of channel options.

According to some embodiments, the instructions further cause the processor to display an indication of a suggested location for positioning the first interaction block in response to receiving the user input to add the first interaction block to the interaction flow canvas.

According to some embodiments, the instructions further cause the processor to: detect a selection of the first interaction block after the first interaction block is positioned on the canvas; and display a view of the first interaction block and an adjacent interaction block in response to detecting the selection of the first interaction block.

According to some embodiments, the instructions further cause the processor to: invoke a routing strategy associated with the interaction flow; and display a graphical representation of a volume of traffic corresponding to connections of the interaction flow.

According to some embodiments of the present invention, in a method for managing an interaction flow for a contact center, the method includes: displaying, by a processor, on a graphical display, an interaction flow canvas and an interaction block selection tool; receiving, by the processor, a user input to add a first interaction block to the interaction flow canvas; generating, by the processor, a first interaction instruction corresponding to the first interaction block; receiving, by the processor, a user input to add a second interaction block to the interaction flow canvas, wherein the first interaction instruction comprises an instruction for proceeding to the second interaction block after a criterion of the first interaction block is satisfied.

According to some embodiments, the method further includes modifying, by the processor, the first interaction instruction after receiving the user input to add the second interaction block to generate an outgoing instruction.

According to some embodiments, the method further includes generating, by the processor, a first flow path and a second flow path originating from the first interaction block; and joining, by the processor, the first flow path and the second flow path at the second interaction block.

According to some embodiments, the first interaction instruction comprises an instruction to split the flow into the first flow path and the second flow path, wherein the first flow path and the second flow path comprise a first communication channel block and a second communication channel block, respectively.

According to some embodiments, the method further includes generating, by the processor, a second interaction instruction corresponding to the second interaction block, the second interaction instructions comprising an instruction to wait until an action at the first flow path and an action at the second flow path are both completed before proceeding to a subsequent block in the interaction flow.

According to some embodiments, the method further includes displaying, by the processor, a recommendation for the second interaction block in response to receiving the user input to add the first interaction block to the interaction flow canvas.

According to some embodiments, the method further includes invoking, by the processor, a routing strategy associated with the interaction flow; and displaying, by the processor, a graphical representation of a volume of traffic corresponding to connections of the interaction flow.

DETAILED DESCRIPTION

In general terms, embodiments of the present invention are directed to a system and method for providing contact center services for different business enterprises that allow such enterprises to rapidly configure, test, and deploy their contact center operations without the need of highly skilled IT personnel or extensive pre-acquired knowledge of best practices for call center operations or setup. According to one embodiment, the system provides an integrated design tool that allows a user to design a multi-channel, multi-modal interaction flow (also referred to as routing strategy) in a single, integrated process. The interaction flow/routing strategy is associated with computer program instructions that handle and route an interaction to contact center resources.

According to one embodiment, the design tool provides an intuitive graphical user interface that helps simplify the process of designing the routing strategy for the contact center, and provides an intuitive configuration experience for the contact center administrator. In this regard, the interface may provide a set of basic building blocks that even non-IT personnel may manipulate to build the contact center's routing strategy. By selecting and organizing the building blocks via the interface, the contact center administrator is provided with a pictorial view of the logic behind the routing strategy (routing strategy diagram) so as to allow the administrator to easily discern the end-customer experience as the customer interacts according to the flow, even if the customer switches interaction from one media channel to another, or even if multiple media channels are invoked concurrently during the interaction. An interaction is not limited to telephony calls (including VoIP calls), but includes other types of interactions utilizing other media channels including, but not limited to, web-based chats, emails, SMS messages, Mobile Web communication, or any other real-time or non-real time media communication conventional in the art. The VoIP communication may be controlled by any signaling protocol configured to control communication sessions over the Internet, such as, for example, session initiation protocol (SIP), H.323, and the like.

According to one embodiment, the integrated design process across different media channels and the associated graphical user interface helps the flow building process to be simple and streamlined.

According to one embodiment, the routing strategy diagram generated via the integrated flow design is used for real-time monitoring of efficacy (or lack of efficacy) of the corresponding routing strategy. For example, real-time call or communication (e.g., communications or interactions occurring in a non-voice communication channel) conditions may be monitored and portions of the routing strategy diagram that are affected by the monitored call conditions may be visually highlighted. Statistical analysis may also be performed based on the detected call conditions. The use of the routing strategy diagram for monitoring interaction flows allows details and conditions of the contact center to be efficiently communicated to, and understood by, the contact center administrator. The existing flow routing strategy may be reconfigured in response to the monitoring and statistical information without the need of highly skilled IT personnel or extensive pre-acquired knowledge of best practices for call center operations or set up.

According to one embodiment, the system also provides a library of different routing strategy templates that span across a multitude of different routing strategies from which a particular business entity may, during a configuration process, pick and choose depending on its needs. The templates may be used as building blocks for rapidly configuring and deploying the contact center. The templates may give access to other sub-templates based on the level of customization or complexity that is desired to meet the business objectives of the contact center. Templates are designed to group a section of an interaction flow based on specific tasks, or channels, or any other business drivers. In this manner, even non-IT personnel may quickly configure and deploy a contact center operation that meets the contact center's needs. As the contact center's needs change, different routing strategies or configuration parameters may be selected and deployed for the contact center without requiring reprogramming or redeployment of customized software that may otherwise be generated for the contact center.

According to one embodiment, the configuration of routing strategy for a contact center using templates includes displaying a plurality of routing templates for user selection. According to one embodiment, each of the routing templates is associated with metadata defining one or more parameters of the corresponding routing template. A contact center administrator selects one of the displayed templates and further identifies an entry point (e.g. a telephone number for voice, or short code for SMS, or email address for an email channel) to the contact center to which the selected routing template applies. The parameters defined for the selected template are displayed, according to one example, for prompting user input. The administrator provides input values for the displayed parameters. According to one embodiment, the user input values are saved in association with the corresponding parameters and further in association with the identified entry point. The saved user input values are then retrieved for routing a particular interaction arriving at the entry point.

One or more aspects of embodiments of the present invention provide an intuitive and integrated interface that enables business enterprises to efficiently and effectively monitor (in real-time and historically) and operate a contact center. According to one embodiment, a contact center dashboard is provided, integrating the controls and displays for monitoring, operating, and configuring a contact center. Through the contact center dashboard, administrators may monitor the status (or health) of the contact center and (re)configure the contact center (including routing strategies and agent accounts or groups), and agents may perform their assigned tasks and monitor the contact center and their performance.

FIG. 1 is a schematic block diagram of an interaction system 2 for dynamic configuration, reconfiguration, routing, and monitoring of communications or interactions for contact centers (or tenants) 12 according to one embodiment of the invention. The system includes a communications network 10 (e.g., a transit network) that, according to one embodiment, is dedicated to facilitate interactions between resources (e.g. agents 11) of various contact centers 12, and end users 14 (or callers or customers).

According to one embodiment, the dedicated communications network 10 includes an edge device 22 such as, for example, a session border controller (SBC)/Media Gateway, for controlling signaling and media streams involved in setting up, conducting, and tearing down voice conversations or other media communications. Any gateway conventional in the art may be used to implement the edge device 22. In this regard, the session border controller includes a processor executing software instructions and interacting with other system components to control voice or other media communications. The gateway also includes an addressable memory for storing software instructions to be executed by the processor. The memory is implemented using a standard memory device, such as a random access memory (RAM).

The dedicated communications network 10 is coupled to one or more private networks 16a, 16b (collectively referenced as 16). The private networks 16 may be managed by one or more telecommunications companies that provide quality of service guarantees for VoIP calls traversing the private networks according to provider policies and limits of service ordered by its customers. According to one embodiment, the private networks 16 implement MPLS (Multi-Protocol Label Switching) for transmitting the VoIP communication. Although MPLS is used as an example, a person of skill in the art should recognize that any other mechanism in addition or in lieu of MPLS may be used for ensuring quality of service guarantees, bit rates, and bandwidth for calls traversing the private networks. Due to the quality of service guarantees provided by the private networks 16, consistent call quality and security can generally be expected for those calls while traversing the private networks.

End users 14 utilize end user devices (e.g. VoIP phones, computers, smart phones, tablets, etc.) to access the private network 16b for VoIP communication via SIP trunk equipment 18. Although the SIP trunk equipment 18 is used according to one embodiment for accessing the private network 16b, a person of skill in the art should recognize that any other device for allowing the end user devices to access to the private network 16b for VoIP communication or other types of communication (e.g. email, chat, web-based communication, etc.) may be used in addition or in lieu of the SIP trunk. According to one embodiment, access to the private network 16b may also be via WebRTC, Skype, or via other networking systems (e.g. IP Multimedia Subsystem (IMS), public land mobile network (PLMN), or the like).

According to one embodiment, the remote computing environment 24 is a cloud computing environment that allows the sharing of resources and the provision of services over a network. In other embodiments, the remote computing environment provides resources used by a managed services provider (MSP) to provide services to various contact centers. Although the computing environment 24 is referred to as a remote computing environment, a person of skill in the art should recognize that the computing environment may be co-located or merged with the dedicated communications network 10. In that case, the computing environment 24 is not remote to the dedicated communications network. In other embodiments, the computing environment 24 is co-located or merged with or any other network environment conventional in the art.

According to one embodiment, instead of hosting all contact center applications at servers located in the dedicated communications network, all or a portion of the applications are hosted by a server system in the remote computing environment 24. The contact center applications may then be provided to multiple tenants 12 as a software as a service (SaaS). Of course, the applications may also be hosted locally at the premise of the contact center 12, or in any other location including the dedicated communications network 10, without departing from the spirit and scope of the present invention. The contact center applications include but are not limited to applications that provide VoIP signaling, voice and other media treatments (e.g. interactive media response applications), multi-party calls (e.g. conference calls), and the like.

In the embodiment where cloud servers are utilized, the system in FIG. 1 may be implemented as a hybrid cloud system where infrastructure and applications for handling calls to and from a contact center are distributed between the dedicated communications network 10 (controlled by a private enterprise) and cloud servers in the remote computing environment 24 (controlled by a public service provider/operator). In some embodiments, the system of FIG. 1 may be implemented in such a way that the infrastructure and applications are both controlled by a public service provider/operator. Also, in some embodiments, one or more of the contact center applications on the cloud servers dedicated to particular tenants are not shared across various tenants. Of course a mix of shared and dedicated contact center applications may be deployed.

A person of skill in the art should recognize that the system may also be implemented using solely a public or private cloud environment. Also, instead of engaging in VoIP communication with applications in the remote computing environment via the private networks 16 and the dedicated communications network 10, the VoIP communication or other types communication (e.g. email, chat, web-based communication, etc.) may be conducted over a wide area network 32 such as, for example, the public Internet. In other embodiments, no cloud technology is used at all.

When an interaction is directed to the contact center, or the contact center invokes an outbound campaign, all or a portion of the interaction is serviced by one or more contact center applications in the remote computing environment 24. According to one embodiment, the contact center applications for a particular tenant may be transitioned/moved from one remote computing environment 24 to another, in the same or different region, in a seamless manner. The assignment of the applications to tenants may be dynamically controlled based on demand and availability of the applications. The contact center applications may also be shared amongst different contact centers.

According to one embodiment, tenants 12 engage in communication with the remote computing environment 24 over the wide area network 32 such as, for example, the Internet. According to one embodiment, different tenant user interfaces are provided by a web server 40 in the remote computing environment 24. An administrator or agent (e.g., operating within or on behalf of the contact center 12) may access the web server 40 for engaging in administrative tasks such as, for example, generating a routing application via the integrated design tool, as will be described in more detail below.

According to one embodiment, the remote computing environment 24 also includes, without limitation, a configuration server 41, an orchestration server 42, a multimedia/social media server 43, a SIP server 44, a media server 46, and an interaction server 47. According to one embodiment, the servers 40-47 are implemented as software components deployed on a single instance of a virtual server/machine. The single instance of the virtual server/machine may be implemented via standard hardware components such as, for example, one or more processors, disks, memories, and the like. Of course, as a person of skill in the art should understand, each contact center may also be allocated by several virtual machines, each of them providing an execution environment for certain applications. More than one virtual machine may also be used for backup purposes (e.g. high availability and disaster recovery purposes). The one or more virtual machines are deployed on physical servers, which may be dedicated to specific contact centers or shared among various contact centers. Although the servers 40-47 are assumed to be separate functional units, a person of skill in the art should recognize that the functionality of two or more servers may be combined or integrated into a single server, or further subdivided into additional or alternative server components without departing from the spirit of the invention. In addition, a person of skill in the art should recognize that the remote computing environment is scalable and may include a considerable number of virtual machines sharing a set of database servers 48 managing a set of mass storage devices. Thus, the particular implementation of the server system in the computing environment or remote computing environment 24 is solely for illustration purposes, and does not preclude other arrangements or components that will be evident to a person of skill in the art.

According to one embodiment, the SIP server 44 is configured to receive signaling messages (e.g. SIP INVITE messages) from the edge device 22, media server 46, and the like, for controlling the setting up or termination of a communication session.

The multimedia/social media server 24 is configured to engage in or facilitate media interactions other than voice interactions with the end user devices (e.g., operated by contact center agents 11 and/or customers 14) and/or web servers 40. The media interactions may be related, for example, to email, vmail (voice mail through email), chat, video, text-messaging, web, social media, co-browsing, and the like. The web servers 40 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

The media server 46 is configured to identify parameters (e.g. available media ports on the media server) for establishing voice conversations between agents 11 and customers 14 (or contacts or end users), and provide those parameters to the SIP server for delivering to the edge device, customers 14, and agents 11. The media server 64 is also configured to deliver media to customers 14 and/or agents 11 via the edge device 22. For example, the media server 64 may be invoked to provide initial greeting messages to a calling customer 14, and for obtaining basic customer information (e.g. identification information, reason for the call, etc.). Also, if the customer 14 or agent 11 is placed on hold, the media server 46 may be invoked to play music for the holding customer or agent 11. In another example, if a conversation between a customer 14 and agent 11 is to be recorded, the call may traverse the media server so that the customer 14 and agent 11 engage in a three way conversation with the media server 46, and the media server 46 may record the conversation and store it in one or more database servers 48.

The orchestration server 42 is configured to work with the SIP and media servers 46 for orchestrating the handling of interactions based on a routing strategy associated with a particular contact center. Depending on the type of routing strategy generated for a particular route point of the contact center (e.g. a particular dialed number) using the integrated flow design tool, and depending on the specific values of parameters set for the routing strategy, different options, media treatments, and routing is performed for the interaction. The routing may involve invoking different media channels as determined by the generated flow. For example, the flow may call for multi-modal interaction where two or more media channels are invoked in parallel. In this regard, the orchestration server 42 is configured to transmit message (e.g. SIP messages) to different servers including the SIP server 44, chat server, email server, and the like, depending on the type of media channel that is invoked. Although the orchestration server 42 is depicted as being separate from the media server 46, a person of skill in the art should recognize that the functionalities of the orchestration server may be merged into the media server 46, or any of the other servers such as the SIP server 44.

The configuration server 41 includes a configuration engine for automatically configuring and/or reconfiguring a contact center. For example, the configuration server 41 may be configured to automatically allocate or reallocate particular resources in the remote computing environment 24 based on detected needs of the contact center.

According to some example embodiments of the invention, in addition to real-time interactions, deferrable (also referred to as back-office or offline) interactions/activities may also be routed to the contact center agents or contact center resources (such as an IVR system, or automated chatbot). Such deferrable activities may include, for example, responding to emails, responding to letters, attending training seminars, or any other activity that does not entail real time communication with a customer. In this regard, an interaction (iXn) server 47 interacts with the orchestration server 42 for selecting an appropriate agent or contact center resource to handle the activity. Additionally, the interaction server 47 may operate in some embodiments to facilitate real-time interactions, for example, by monitoring interactions and creating and/or updating an interaction object (including information or data stored in memory corresponding to the interaction such as an interaction ID, a session ID, a customer ID, and other interaction data such as customer information, interaction topics, and any other information exchanged during the course of an interaction about the customer or the interaction itself).

According to one embodiment, one or more database servers 48 store various user-selectable templates for guiding a contact center administrator in configuring and deploying a contact center and/or applications used by the contact center. The templates may also be routing templates where each template provides a routing strategy for routing calls or interactions. The templates together span a multitude of industry verticals for which a contact center may be desired (e.g. finance, retail, medical, etc.). As the administrator picks and chooses the desired template(s) and provides values for the parameters identified by the template(s), those values are stored in the mass storage device in association with the selected template(s) and an identifier for the particular contact center (e.g. contact center telephone number). The database servers 48 further store for each customer contact center, a profile record which identifies profile and configuration information for the customer contact center. The database server 48 may be included in the remote computing environment 24.

The remote computing environment 24 may further include a statistics server 50. The statistics server 50, according to one embodiment, may gather, store, and/or analyze data regarding the contact center, agents 11 and end users 14. For example, the data of the statistics server 50 may include data regarding agent availability, agent skills, average call time, average hold time, total talk time, after work time, average speed of answer, service level, maximum abandonment rate, patience rate, and the like.

According to one embodiment of the invention, various third party developer devices are also coupled to the remote computing environment 24 over the Internet. The third party developer devices may be invoked to generate new business logic and upload a template and associated metadata defining the routing strategy to the remote computing environment. Once uploaded, the new templates may be made available for use by different contact centers. In this manner, different entities may be involved in extending the routing capabilities offered by existing templates.

Figure 2:
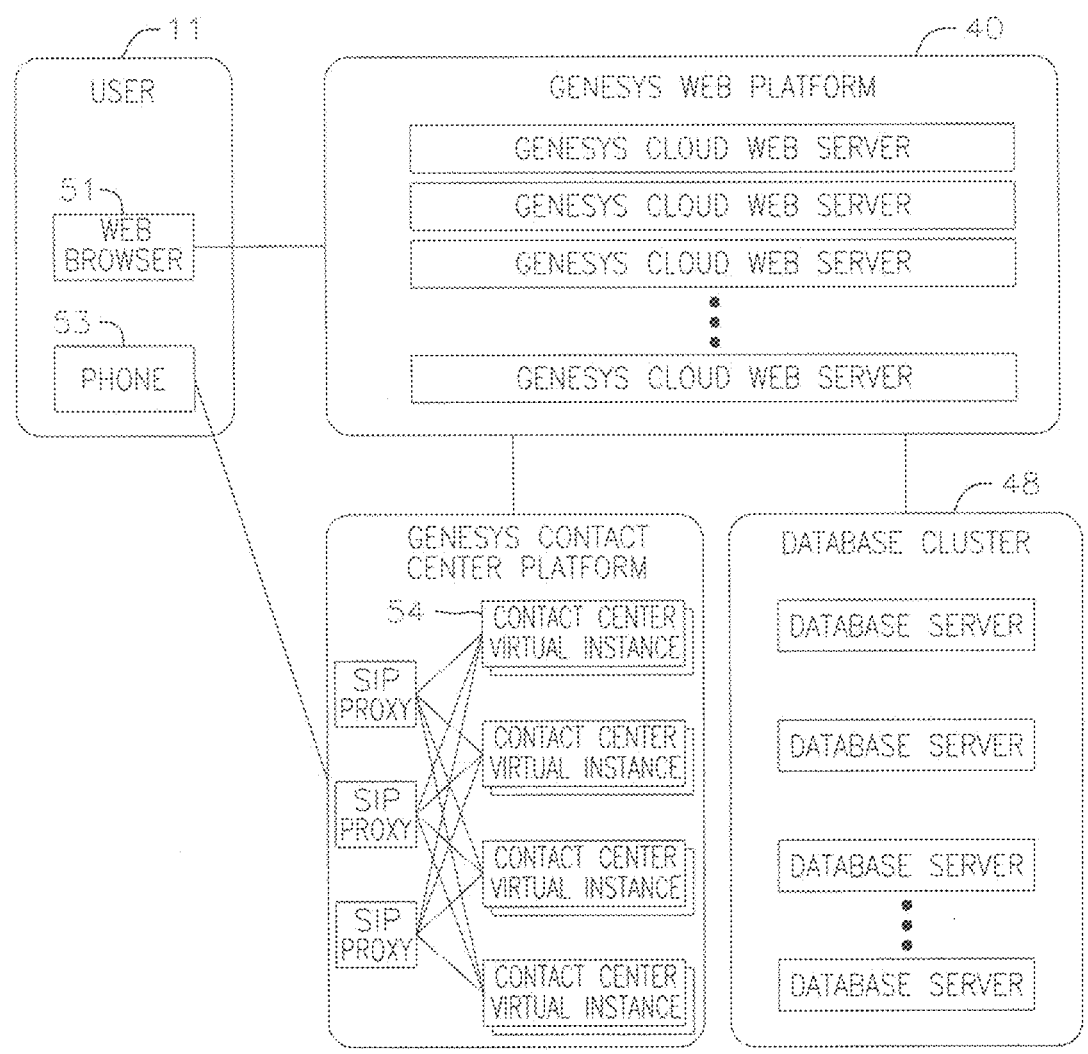
FIG. 2 is a more detailed schematic block diagram of portions of the system of FIG. 1, according to some embodiments of the present invention.

FIG. 2 is a more detailed schematic block diagram of portions of the system of FIG. 1 according to one embodiment of the invention. As illustrated in FIG. 2, the agent 11 or administrator for a contact center 12 (hereinafter collectively referred to as contact center worker) has access to a computer having a web browser 51, and a phone 53 capable of VoIP communication. The web browser may be invoked to access the web server 40 for remotely conducting administrative tasks for the contact center and/or other call center agent activities, including design of applications using the integrated flow design tool. The web server 40 may also be accessed for monitoring performance of the contact center in real-time, and/or for conducting other activities typical for a call center agent. According to one embodiment, the flow design tool and other functionalities of the web server are enabled via computer program instructions that are stored in memory and that are executed by a microprocessor.

The web server 40 is coupled to one or more servers which are deployed in a virtual machine 54 allocated for a particular contact center. A separate virtual machine may be allocated for each contact center. The servers deployed in the virtual machines may be, without limitation, the orchestration, SIP, media servers, data server, and statistics server described with reference to FIG. 1, which are invoked for providing contact center services such as, for example, inbound voice routing, email routing, social media routing, and for administrative functions such as, for example, real time reporting, historical reporting, contact center configuration, and the like. According to one embodiment, the virtual machines share the database servers 48 for storing data relevant to contact center operations.

According to one embodiment, the integrated flow design tool hosted by the web server 40 provides a visual editing canvas for an author to design and edit a multi-channel, multi-modal flow without having to switch design programs, generate independent flows for each channel that is involved, and/or the like. According to one embodiment, the design tool allows the author to drag and drop basic building blocks onto the canvas, identify the media channel invoked by the block, and rearrange the building blocks as needed to design the structure of the flow.

Figure 3:
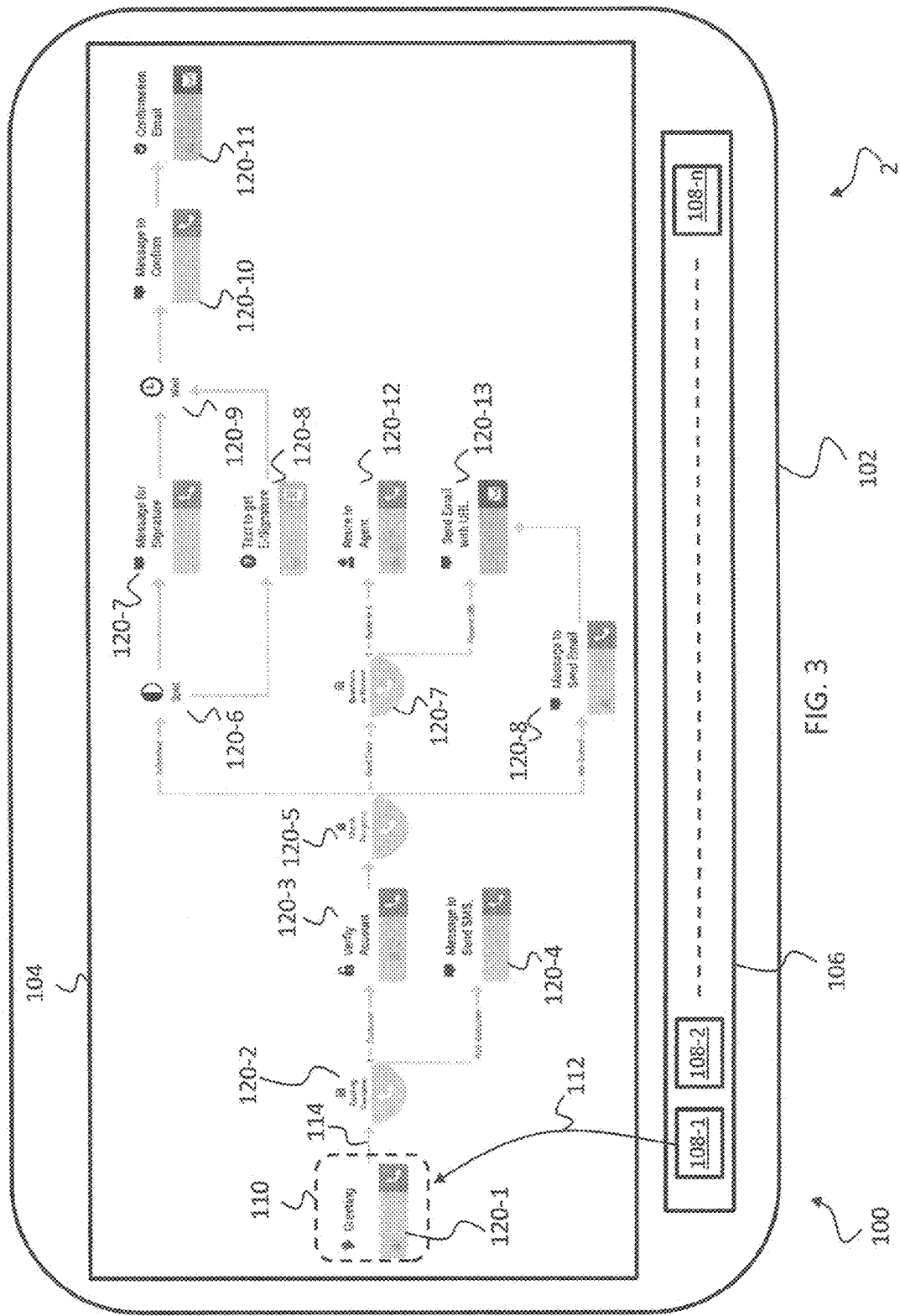
FIG. 3 is a screen shot of an interface for a visual editing of a canvas including basic building blocks defining an example multi-channel, multi-modal interaction flow, according to some embodiments of the present invention.

FIG. 3 is a screen shot of an interface 100 for a visual editing canvas including basic building blocks defining an example multi-channel, multi-modal interaction flow according to one embodiment of the invention. According to some embodiments of the present invention, the interface may be displayed as a graphical user interface (GUI) on an electronic device 102 operated by an administrator or agent working within or on behalf of a contact center (e.g., the agent 11). The electronic device 102 may be in electronic communication with the components of the remote computing environment 24, for example, by way of the wide area network 32. To this end, the electronic device 102 may include any suitable electronic device or computer system such as a personal computer (PC), a hand-held personal computer (HPC), a tablet or touch screen computer system, and the like. The electronic device 102 includes a processor and a memory coupled to the processor that has instructions stored therein that cause the processor to execute the functionality of the interface 100 to facilitate the creation of a multi-channel, multi-modal interaction flow, as will be discussed in more detail below.

As illustrated in FIG. 3, the electronic device 102 is configured to display the interface 100 on a display of the electronic device. The interface 100 includes a canvas 104 which is a graphical workspace for designing the multi-channel, multi-modal interact flow according to embodiments of the present invention. The interface further includes a component menu or interaction block selection tool 106, which graphically displays a plurality of components or blocks 108-1 through 108-n (collectively referred to, herein, as blocks 108) that can be moved to or placed on the canvas 104 to be incorporated into the interaction flow. According to some embodiments of the present invention, the user operating the electronic device 102 may drag the blocks 108 into the area of the canvas 104 (e.g., by clicking or selecting a block 108 within the menu 106 and dragging the selected block to a location within the canvas 104).

The number and functionality of the blocks 108 may vary according to the design and function of the interface 100, and the business rules of the contact center. For example, the blocks 108 may include a menu block, at which a caller or customer would be presented with a choice of one or more selections for proceeding to a next block within the interaction flow. The blocks 108 may further include a message block, at which a predetermined or predefined message is presented to the caller or customer, for example, by way of an audible or graphical signal delivered to a device operated by the caller or customer. The blocks 108 may also include a message delivery block for sending a message to an address or inbox associated with the caller or customer, for example, a voicemail or email message delivered to the customer's voicemail or email inbox. The blocks 108 may also include a routing block, at which the interaction or communication is routed to a live agent of the contact center. Additionally, the blocks 108 may include a question block, in which a predetermined or predefined question is presented to the caller or customer in an appropriate communication channel or medium. The blocks 108 may further include a split block and a wait block, as will be discussed in more detail below, in which the interaction may be split into multiple communication channels or mediums, and the flow waits until certain predetermined information is obtained before merging the flow back to a single communication channel or medium or proceeding forward in the flow. The blocks 108 may also include a transfer block, at which the interaction may be routed to another contact point, communication channel, or entity associated with the communication center.

Although the above-described blocks may be included as part of the interface 100, the present invention is not limited thereto, and additional functional blocks may be included as part of the blocks 108 within the interface 100 according to some embodiments of the present invention.

As depicted in FIG. 3, the interface 100 enables an agent 11 to design an interaction flow using a graphical illustration of the various steps or operations within the interaction flow. For example, the agent 11 may select a block 108 (e.g., block 108-1), and add the selected block 108 to the canvas 104, for example, by dragging the block 108 to a location (e.g., location 110) within the canvas 104 along a path 112. The agent 11 may continue to add blocks 108 to the canvas 104 until the design or progression of the flow is completed. As each block 108 is added to the canvas 104, the relationship between the different blocks may be defined by the agent 11 to illustrate the progression of the flow design from one block to the next. For example, the interface 100 may include a tool to include a connection or arrow 114 between two different blocks to illustrate that once the criteria or functionality of the first block has been established, the flow proceeds to the next block connected to the first block by the connection or arrow 114.

For example, FIG. 3 illustrates an example flow design within the canvas 104, in which the flow starts with a telephony communication with an end customer. Depending on the status of the customer's account, the flow may generate media to be transmitted over other communication mediums, such as, for example, text messages or emails. The interaction with the customer via the other communication channels is included in the same flow as the telephony interaction.

As each of the blocks 108 is incorporated into the canvas 104, the interaction system 2 (or another component or system operating as part of the interaction system 2) renders a set of instructions or rules (e.g., in the form of a state chart extensible markup language (SCXML) or voice extensible markup language (VXML) instruction) corresponding to the block. As additional blocks 108 are added to the canvas 104, the interaction system 2 may modify the instructions corresponding to previously incorporated blocks to indicate the interrelationship between the blocks. For example, when a block 108 is added, the interaction system 2 may generate instructions indicating the parent block identification (e.g., the previous block 108 that leads to the newly added block 108), the block identification(s) of subsequent blocks 108 (e.g., the blocks 108 immediately following the newly added block 108 within the flow), the properties of the newly added block 108 (e.g., the configuration properties, the communication channel, the information to be delivered or exchanged, etc.), and any other relevant data or information about the block or the flow design according to the design and function of the interaction system 2. According to some embodiments, the interaction system 2 may generate and store in memory one or more data files of the instructions for each block.

For example, as illustrated in FIG. 3, the designer of the interaction flow (e.g., the agent 11) may include a plurality of blocks 120-1 through 120-n, selected from among the blocks 108-1 through 108-n, into the interaction flow within the canvas 104, for generating the corresponding routing strategy or instructions corresponding to the routing strategy. Starting with block 120-1, the interaction flow may include a greeting message, and once the greeting message is completed, the flow may proceed to the block 120-2 as dictated by the connection 114.

In this example, the block 120-2 is a choice block, described in more detail below, in which the caller or customer is presented with various choices to determine whether or not the caller is an existing customer or a new customer. If the caller or customer indicates that they are an existing customer, the interaction flow proceeds to block 120-3, at which point the caller's or customer's account is verified. On the other hand, if the caller indicates that they are not an existing customer, the interaction flow proceeds to block 120-4, at which point a message may be delivered to the caller to register the caller as a customer, for example, by delivering a message to a device associated with the caller to send an SMS text message to confirm identifying information of the caller, at which point the flow may end.

Returning to block 120-3, once the caller's account has been verified (e.g., by receiving predefined or pre-stored identifying information from the caller about their account), the flow may proceed to block 120-5, at which point the orchestration server 42 (or another component of the interaction system 2) may determine the progress or status of the caller's account. For example, assume for the purposes of illustration that the routing strategy for the particular flow design illustrated in FIG. 3 relates to a caller who is attempting to obtain a mortgage, and the interaction system 2 is operating as part of a contact center for a financial or lending institution such as a bank. At block 120-5, the orchestration server 42 (or another component of the interaction system 2) may determine that the loan application documents have been previously submitted by the caller, and the orchestration server 42 (or another component of the interaction system 2) may proceed to block 120-6. If, however, the interaction system 2 determines that the appropriate application documents have not yet been submitted by the caller, the orchestration server 42 (or another component of the interaction system 2) may proceed to block 120-7. Finally, if the orchestration server 42 (or another component of the interaction system 2) determines that the caller has not yet started reviewing or has not received the application documents, the orchestration server 42 (or another component of the interaction system 2) may proceed to block 120-7.

At block 120-6, the routing strategy indicates that the interaction with the customer is to be conducted in (or split into) two independent communication channels in order to, for example, obtain executed or signed documents from the caller. The first communication channel may be, for example, a voice communication channel, and the second channel may be, for example, a text-based communication channel. In the example of FIG. 3, the routing strategy invokes the sending of a text message 120-8 over the text-based communication channel to prompt the customer to submit an electronic signature. Concurrently with the sending of the text-based communication, the routing strategy causes playing of an audio message 120-7 over the voice communication channel to alert the customer that the text-based message (e.g. SMS message or email) has been sent. The routing strategy then proceeds to the wait block 120-9 to wait for conditions surrounding each split path to be satisfied. For example, the condition may be that an e-signature is received from the customer.

According to some embodiments, information exchanged in each of the split paths may be maintained as contextual information by the interaction system 2 such that if information that is relevant at one block in one of the paths is obtained at another block in another path, the interaction system 2 may utilize the information to satisfy the criteria of the block in which the information was not obtained. For example, if at block 120-7, the interaction system 2 obtains information that is required at block 120-8, then the interaction system 2 may proceed to block 120-10 without waiting for the information to be obtained again at block 120-8. Thus, according to embodiments of the present invention, the interaction system 2 may enable contextual information obtained at various blocks 108 to be shared at different blocks 108, even if the blocks 108 operate in different communication channels or mediums, thereby reducing instances in which a caller or customer must provide the same information or engage in similar interactions multiple times during the course of an interaction flow.

According to some embodiments, only once the appropriate information is exchanged in each path, and the relevant information is obtained or delivered by the interaction system 2, the interaction system 2 may proceed to block 120-10 to deliver a confirmation message to the caller that the information has been received. The interaction system 2 may further deliver a message to the caller by way of a second communication medium or channel at block 120-11, at which point the flow may end.

Thus, according to embodiments of the present invention, when a split block is added to a flow design, the designer or agent 11 may define the channels that will be supported in parallel. Each channel has its own flow path and when a block is hit in each flow path, the interaction system 2 may update the overall context or information exchanged or obtained in that flow path and share that information with blocks in the other flow paths (e.g., by providing the information as input to blocks in the other flow paths). Parallel channels after a split block may execute independent of each other just like a normal flow and codes and/or instructions are rendered as explained above. The interaction system 2 may wait until all the channels defined in Split block hit the Wait block before proceeding to a subsequent block in the flow design. Because the interaction system 2 is aware of latest context for each channel, the interaction system 2 may proceed to the wait block if certain tasks are executed or information is exchanged through other parallel channels or flow design branches.

Returning to block 120-7, the interaction system 2 may determine whether or not the caller should be routed to an agent at block 120-12 to discuss obtaining additional information or documents from the caller, or whether or not a message should be delivered to the caller at block 120-13 (e.g., via a separate communication channel such as e-mail with an embedded URL to access documents electronically) to resend the documents to the caller.

At block 120-8, the interaction system 2 may deliver a message to the caller notifying the caller that a message will be delivered to the caller via a second communication channel or medium (e.g., via text or electronic mail) that includes access to the appropriate documents. The interaction system 2 may then proceed to block 120-13 to send the documents to the caller by way of the second communication channel.

As each block is added to the flow design within the canvas 104, the interaction system 2 may update the contextual information for each block, such as the connections or relationships between the blocks 108 (e.g., information about the previous and subsequent blocks), and the setting parameters of each block (e.g., the information to be transmitted to or received from the caller, the communication channel or medium, etc.). Such contextual information may be generated as discrete instructions or data files for each block, and/or may be maintained as part of a master or overall instruction set corresponding to the entire flow design.

Once the flow design is finalized and the corresponding instructions are generated, the interaction system 2 may operate to manage, monitor, and control incoming and outgoing communications according to the generated instructions, in conjunction with the various components of the interaction system 2 discussed above.

Of course, embodiments of the present invention are not limited to the specific flow design outlined above. Rather, the disclosure of FIG. 3 is intended only to illustrate aspects of the present invention by way of example. Additionally, embodiments of the present invention are not limited to incoming voice calls or communications, and may be applied to both incoming and outgoing communications and incorporate various communication channels or mediums as will be discussed in more detail below.

FIGS. 4A and 4B are block diagrams of the basic building blocks (e.g., the blocks 108 in FIG. 3) used for designing an interaction flow according to one embodiment of the invention. The basic building blocks may be categorized as two basic types: 1) action blocks 140; and 2) decision/choice blocks 142. Action blocks 140 are invoked for providing a discrete action, such as, for example, playing a particular outgoing message during the flow. Choice blocks 142 are invoked for creating decision-based branches in the flow, such as, for example, a customer selection that causes the branching to occur. According to one embodiment, visual indicators allow action blocks to be quickly differentiated from choice blocks. For example, action blocks 140 may be represented in one geometric shape (e.g., square), while choice blocks 142 may be represented in a different geometric shape (e.g. circle).

According to one embodiment, each block may also include a channel indicator 144, 146 for visually indicating the communication channel to which the block relates. As depicted in FIG. 4B, hovering over the channel indicator may bring up (e.g., display) a menu 148, 150 of available communication channels that are available for the block. The available channels may include, for example, telephony, email, and text.

According to one embodiment, the channel utilized by a particular block may be dynamically changed by a user by simply hovering over the channel indicator 144, 146 and selecting one of the available communication channels from the channel menu 148, 150. Selection of one of the displayed channels automatically switches a currently selected communication channel to the newly selected communication channel. According to one embodiment, an attribute panel corresponding to the selected channel may be displayed by the interface 100 to allow the user to configure the options of the selected channel. As a person of skill in the art should appreciate, the ability of the user to change communication channels for a particular flow without having to recreate blocks, switch to different programs, or the like, allows the flow design process, to be streamlined and simplified.

Figure 4C:
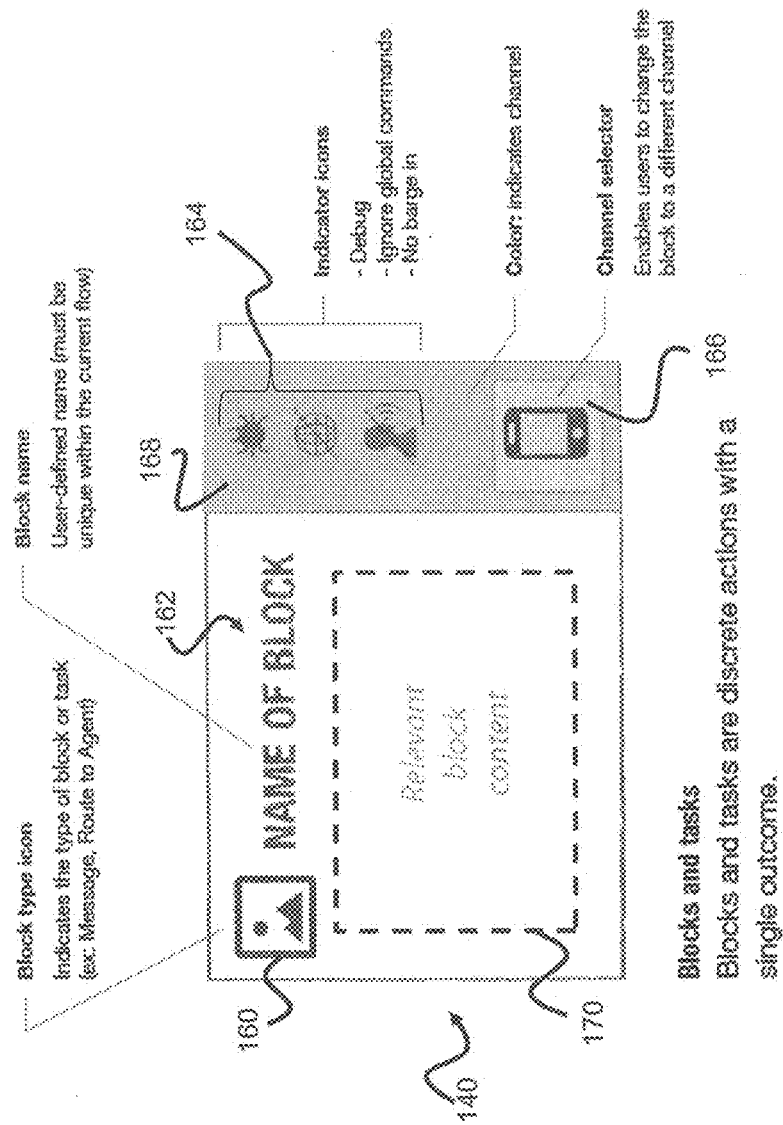
FIG. 4C is a block diagram illustrating further detail of an action block, according to some embodiments of the present invention.

FIG. 4C illustrates further detail of the action block 140 according to some embodiments of the present invention. Each action block 140 may be incorporated into the flow design canvas 104 to perform a discrete action with a single outcome. For example, at each action block 140 information may be delivered to or collected from a caller or customer, a communication may be routed to an agent, or any other suitable action may be performed according to the design and function of the interaction system 2. As shown in FIG. 4C, the action block 140 may include various characteristics or fields that are adjustable or can be modified according to the design of the flow, and other characteristics or fields that may be predefined according to the design of the interface 100. For example, each of the action blocks 140 may include an icon or symbol 160 indicating the type of block or task to be performed at the block. For example, the icon 160 may indicate that the block 140 is a message block at which the interaction system 2 will deliver a message to the customer or caller, or the icon 160 may indicate that the block 140 is a routing block at which the interaction system 2 will route the communication to a live agent. Embodiments of the present invention, however, are not limited to the icons discussed above, and the icons may include any suitable icon or symbol to reflect the action or function of the design of the interface 100.

According to some embodiments, the action block 140 may further include a name field or data 162, reflecting the name or a description of the function of the action block 140. In some embodiments, the name field 162 may be configured to be edited by the designer of the flow to reflect the design preferences of the designer, or to reflect a unique operation or function within the flow design. In some embodiments, the action block 140 may additionally include one or more setting parameter or indicator icons 164, to enable the designer of the flow to designate various settings or parameters of the block. According to some embodiments, the setting parameters 164 may be initial or default attributes of the blocks, or may be settings that are specific to the selected block. For example, the setting parameters 164 may include a debug parameter that enables sending additional log information to the interaction system when an interaction arrives at the block. The setting parameters 164 may further include a setting to ignore global commands, which may disable any global commands for the overall interaction flow design for the selected block (e.g., pressing 0 or saying "agent" to be transferred to an agent may be disabled in the block when the setting is turned on). The setting parameters 164 may also include a "barge-in" feature or setting, to enable users to respond to a question, prompt, or message without waiting to hear or receive the entire question, prompt, or message.

According to some embodiments, the action block 140 may include a channel selector icon or button 166. The agent or designer of the flow may hover over or select the channel selector button 166 to display a sub-menu (e.g., like the menu 148 shown in FIG. 4B) to select one or more communication channels or mediums (e.g., telephony or voice, SMS text messaging, chat, email, etc.) corresponding to the particular action block 140. According to some embodiments, the interaction system 2 may enable the designer to configure the action block 140 to enable multiple optional communication channels or mediums such that the functionality of the action block 140 may be conducted within any or all of a plurality of communication channels. Additionally the action block 140 may include other channel indicators such as a color 168 to indicate the channel(s) selected at the channel selector button 166. The action block 140 may further include a description or content field 170, in which the designer may include relevant description or content associated with the block.

Figure 4D:
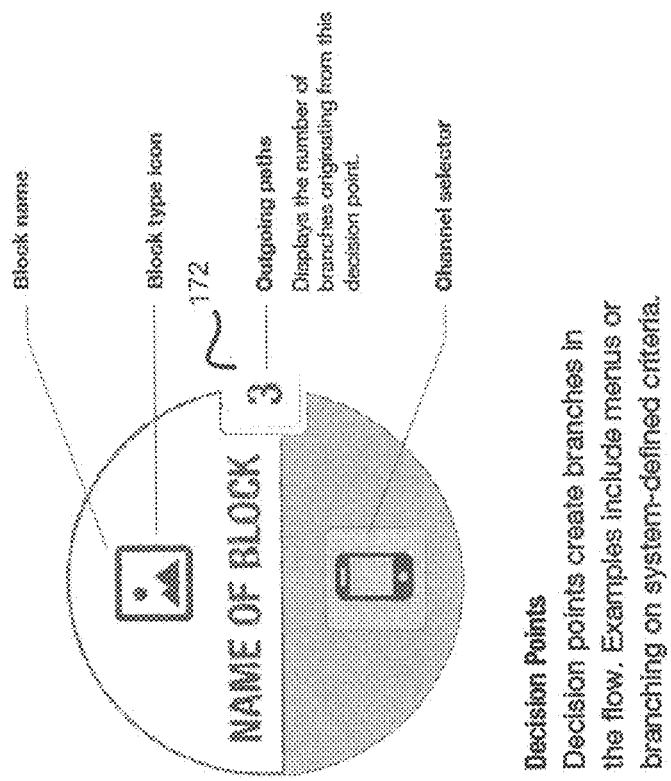
FIG. 4D is a block diagram illustrating further detail of a choice block, according to some embodiments of the present invention.

FIG. 4D illustrates further detail of the choice block 142 shown in FIGS. 4A and 4B. Each choice block 142 may be a decision point in the flow that creates a branch or a split in the flow depending on the outcome of the decision. For example, at the choice block 142, the interaction system 2 may determine among various choices the status of the customer or caller, and choose an appropriate branch or path for proceeding along the flow. Some aspects of the choice block 142 may be similar to those of the action block 140. For example, the choice block 142 may include a block icon, a block name, a channel selection button, a description field, etc., and repetitive description thereof will be omitted. Additionally, the choice block 142 may include an outgoing path indicator 172 representing the number of outgoing paths from the present choice block 142. For example, the choice block 120-5 in FIG. 3 has three outgoing paths depending on the determination of the progress of the caller's account. According to some embodiments, each block (including action blocks) may include an outgoing path indicator representing the number of outgoing paths. Additionally, according to some embodiments, some or all of the choice and action blocks may include an incoming path indicator, representing the number of incoming paths to the blocks.

Figure 4E:
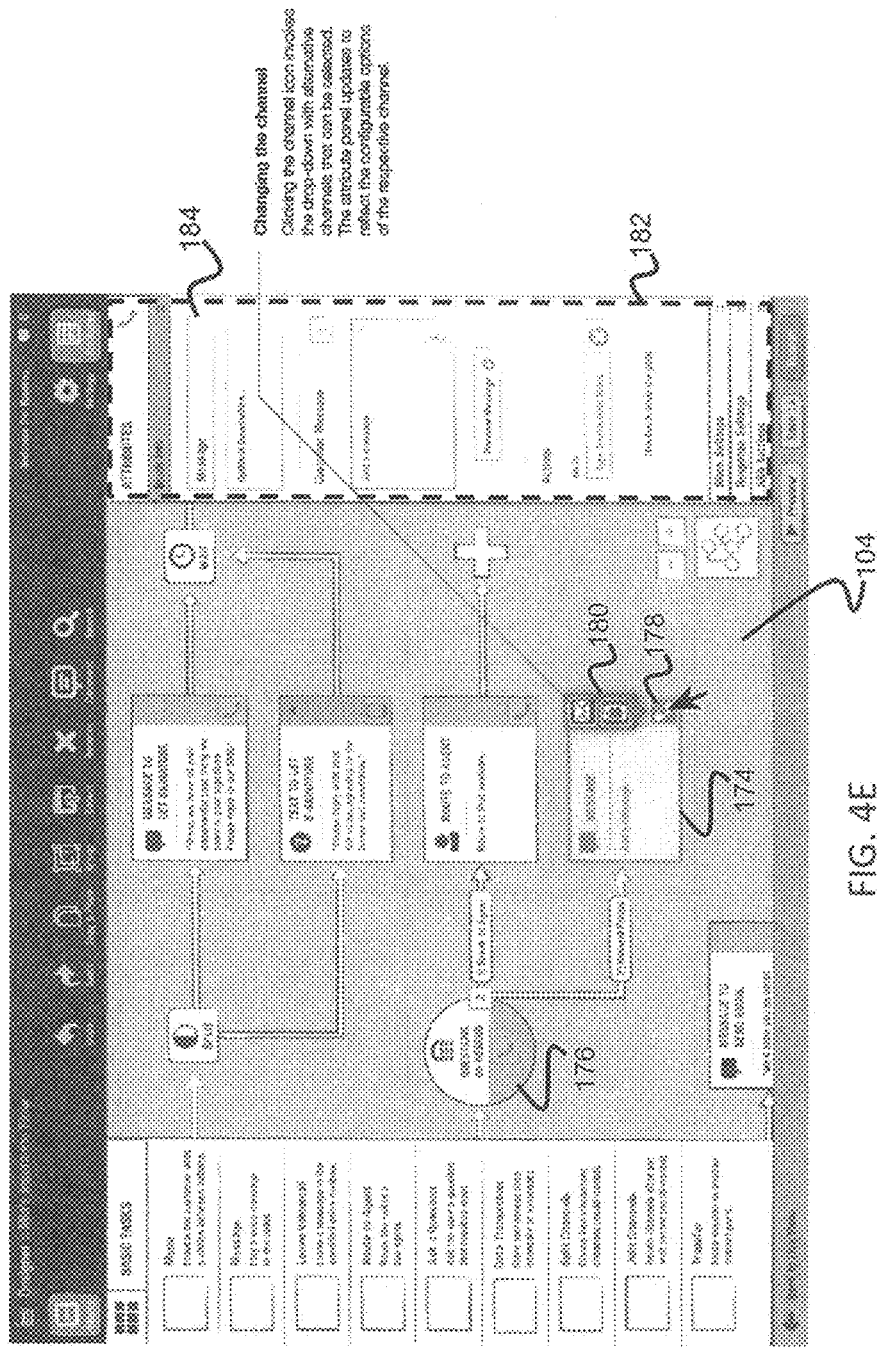
FIG. 4E is a screen shot of an interface for modifying the channel of a block, according to some embodiments of the present invention.

FIG. 4E shows further detail of an example of modifying the channel of a block, according to aspects of embodiments of the present invention. As shown in FIG. 4E, when a block 174 (e.g., one of the blocks 108 or the block 140 illustrated above) is added to the canvas 104, the block 174 may default to the channel of the incoming or previous block 176. For example, the previous or incoming block 176 may be set to operate with a voice or telephony communication channel, and when the block 174 is added to the canvas, the block 174 may default to the voice or telephony communication channel as indicated by the icon or button 178. When the designer or agent 11 hovers over or selects the button 178, however, the interface 100 of the interaction system 2 may display a menu 180 for modifying or changing the channel or medium to an alternative channel. Depending on the selected channel, certain attributes of the block 174 may be automatically modified according to the selected channel. The interface 100 may also include an attributes menu 182 for viewing and configuring/modifying the attributes of the block 174. For example, attributes menu 182 may include various fields for the designer or agent 11 to adjust the parameters, settings, or attributes of the block 174. For example, the attributes menu 182 may include a menu or field 184 for defining or setting the functionality of the block 174, such as exchanging (e.g., delivering and/or receiving) messages with a device associated with the caller or customer, routing to an agent, etc. The attributes menu 182 may also include various fields for providing a description of the block or including messages or information to be exchanged with the caller or customer, or the action(s) to be taken by the interaction system 2 at the block 174. The attributes menu 182 may be displayed within the interface 100 in response to the block 174 being dropped or incorporated into the canvas 104, or in response to the designer or agent 11 selecting the block 174 or the button 178 within the canvas 104.

As shown in FIGS. 3 and 4A-4E, therefore, the designer or agent 11 designing the flow may incorporate various blocks 108 (including, e.g., the action blocks 140 or choice blocks 142) into the canvas 104 to generate the flow design. As discussed above, as each block 108 is incorporated into the canvas 104, the interaction system 2 may generate segments or blocks of instructions (e.g., in the form of VXML or SCXML code) to instruct the interaction system 2 regarding the action to take at each block during an interaction session according to the parameters and settings of each block. The instructions for each block 108 may be stored in memory as individual segments of instructions or as part of a master data file. The instructions for the various blocks selected for the flow form the routing strategy that is to be executed for a particular interaction. The instructions for each block 108 may further be modified or updated as subsequent blocks are added to the canvas 104. Accordingly, the designer or agent 11 of the flow design may be enabled to design a complex interaction flow for dictating and managing the flow of a communication center interaction, without the designer or agent 11 having to manage or even understand the complex programming syntax for generating the computer-readable instructions for implementing the flow. Thus, the interface 100 of the interaction system 2 may provide a more convenient and easier to use interface for generating an interaction flow design.

Figure 5A:
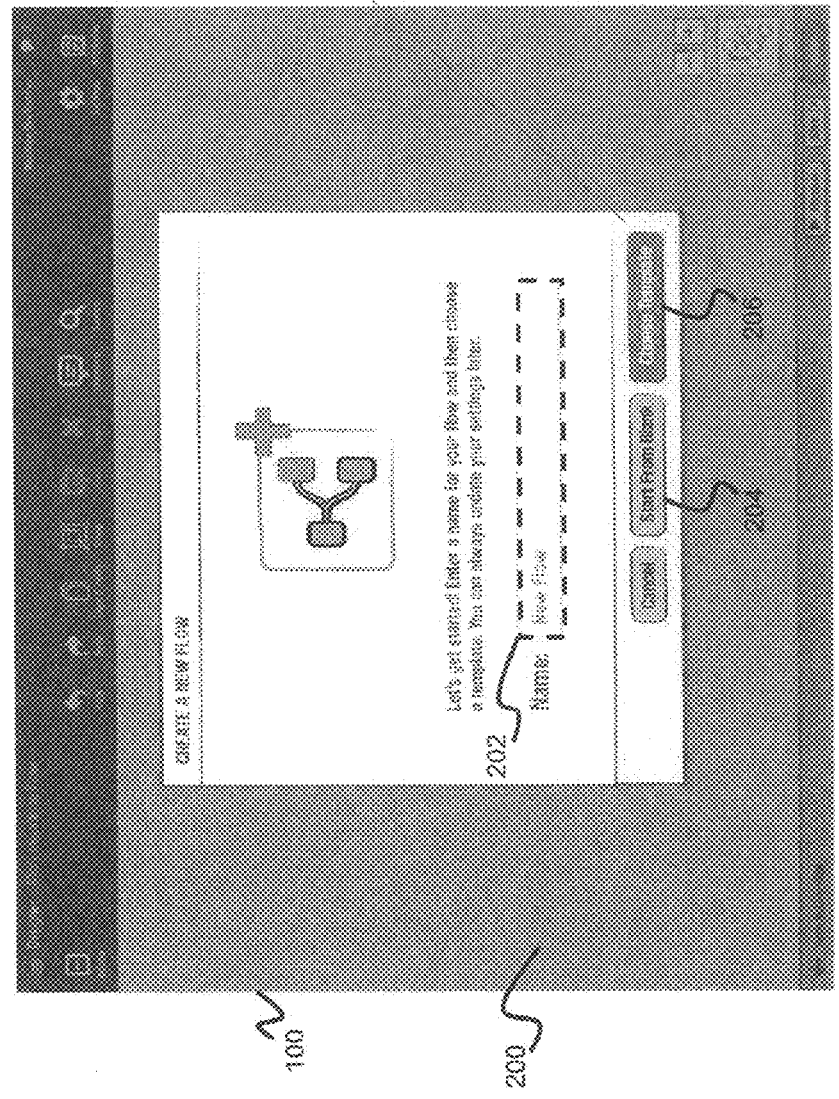
Figure 5C:
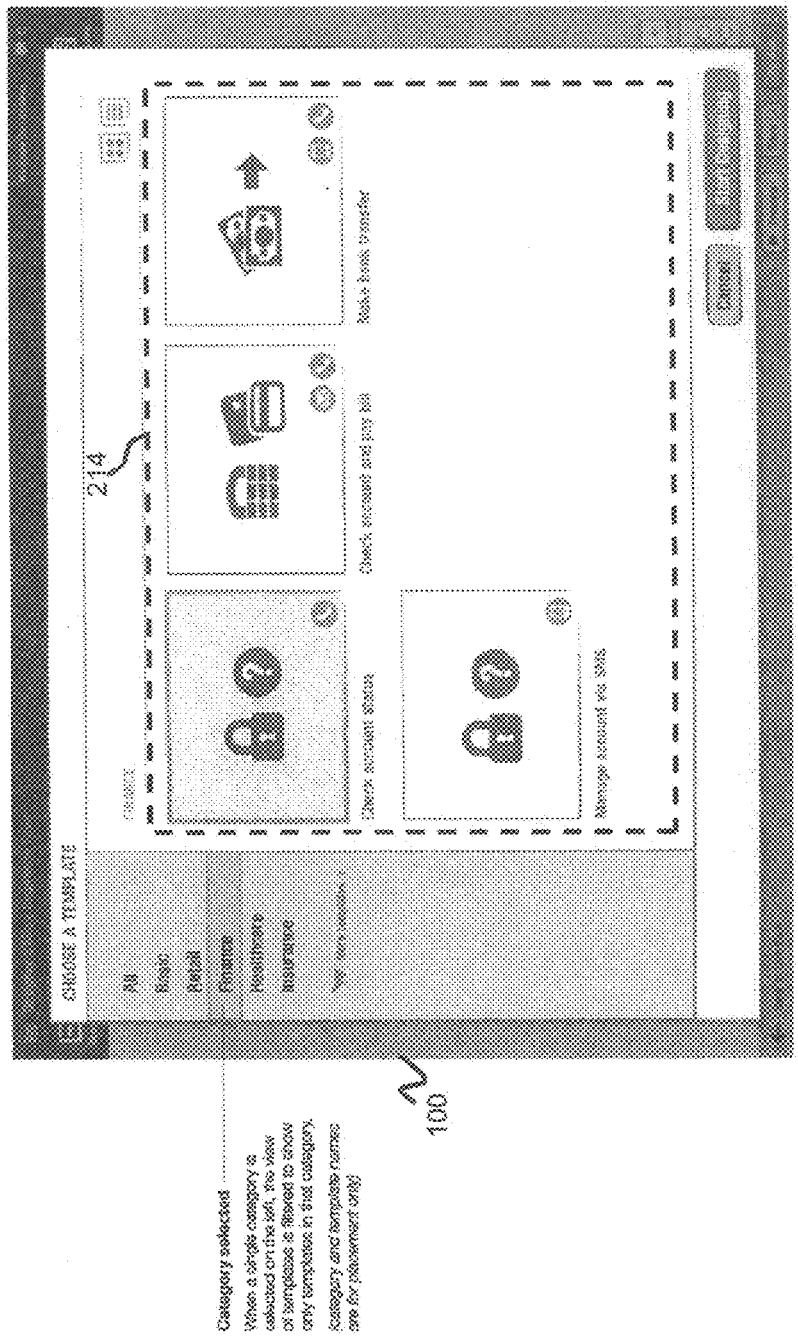
Figure 5D:
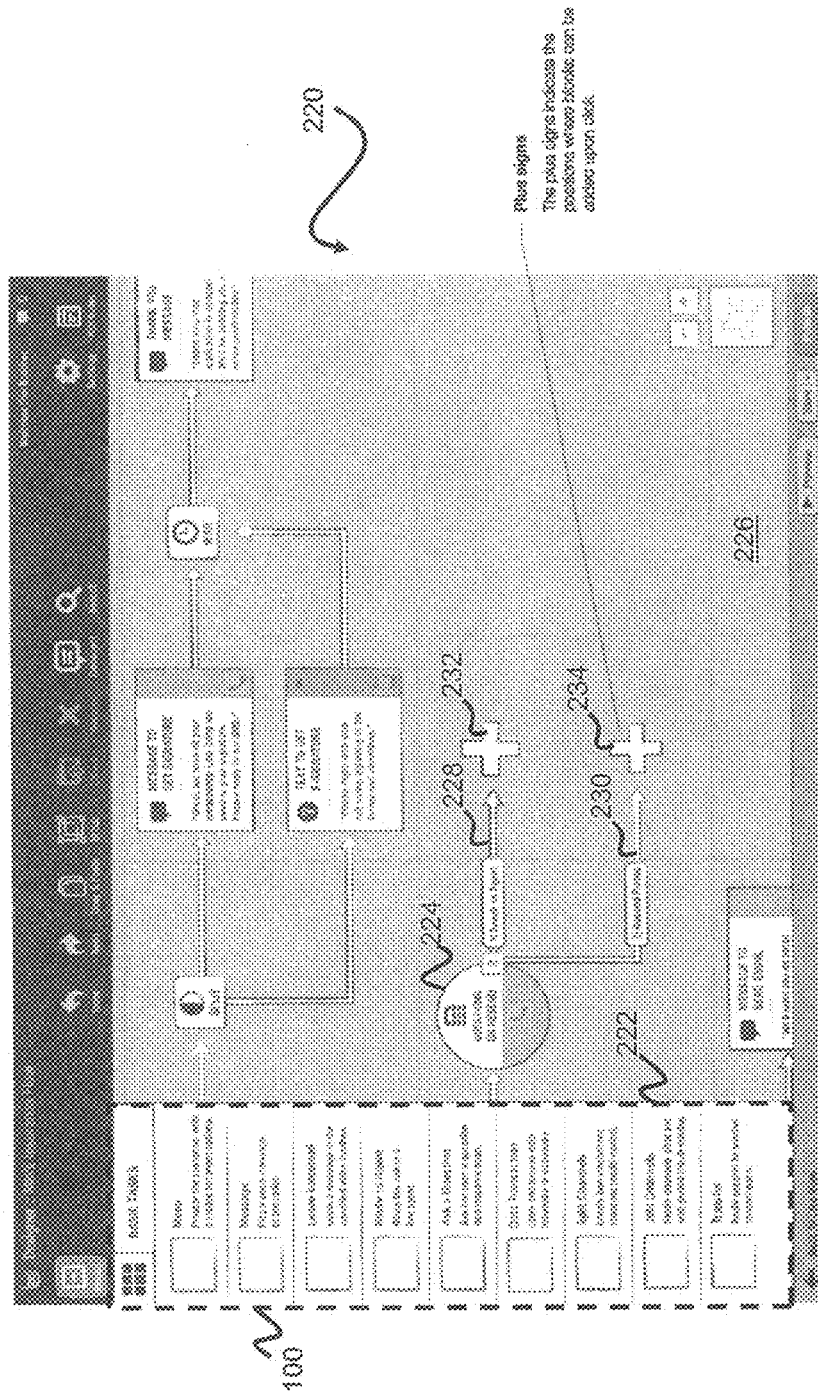
Figure 5F:
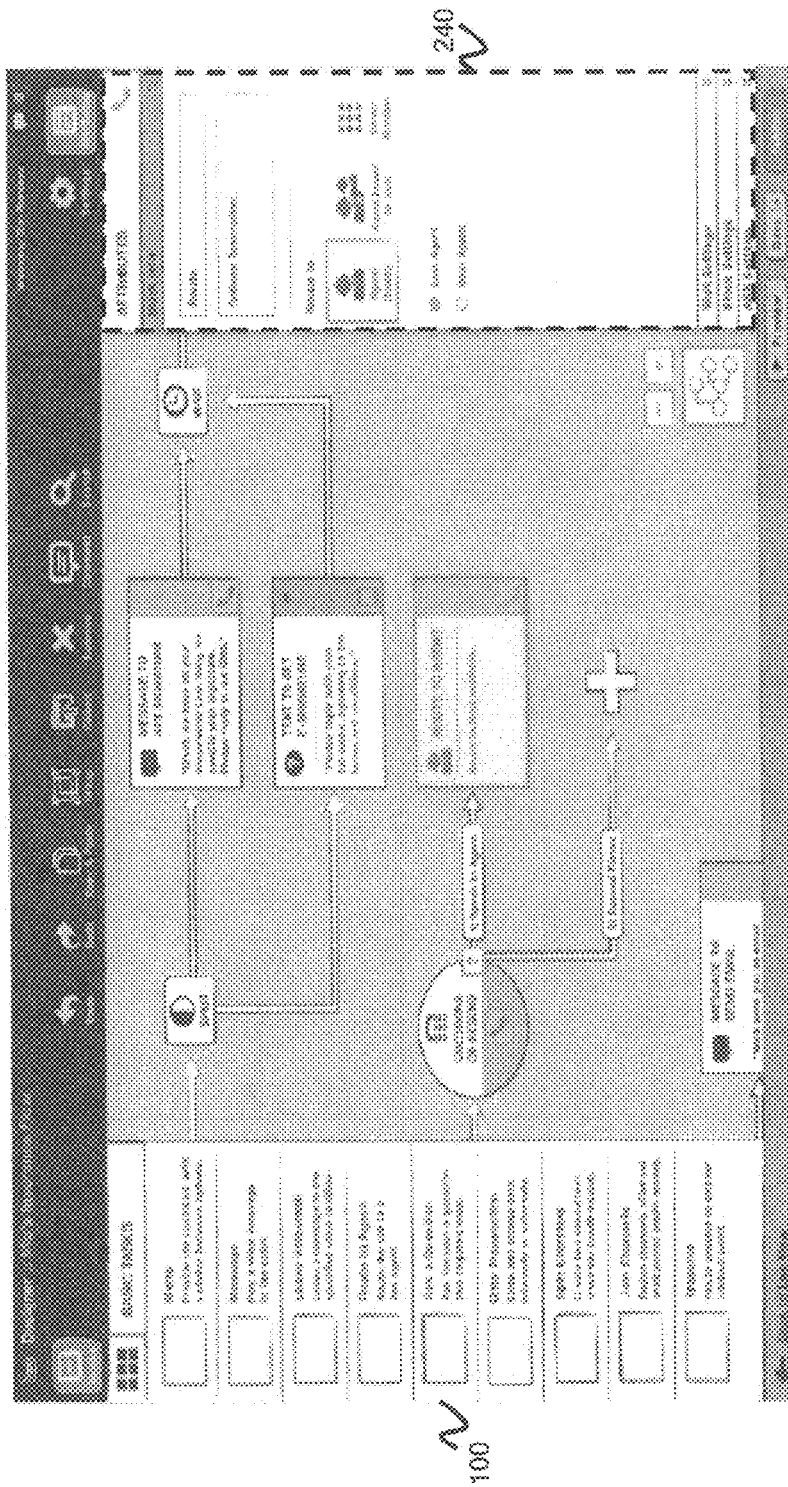
Figure 5G:
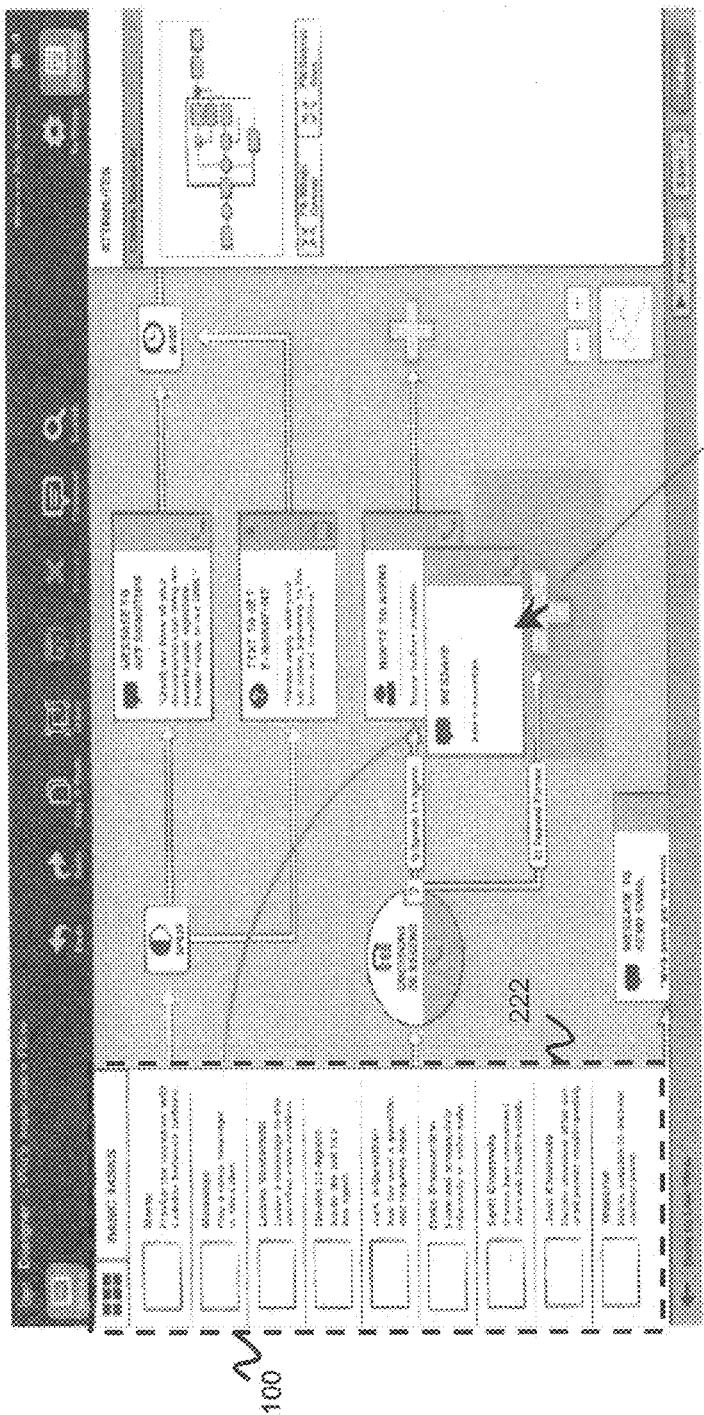
Figure 5H:
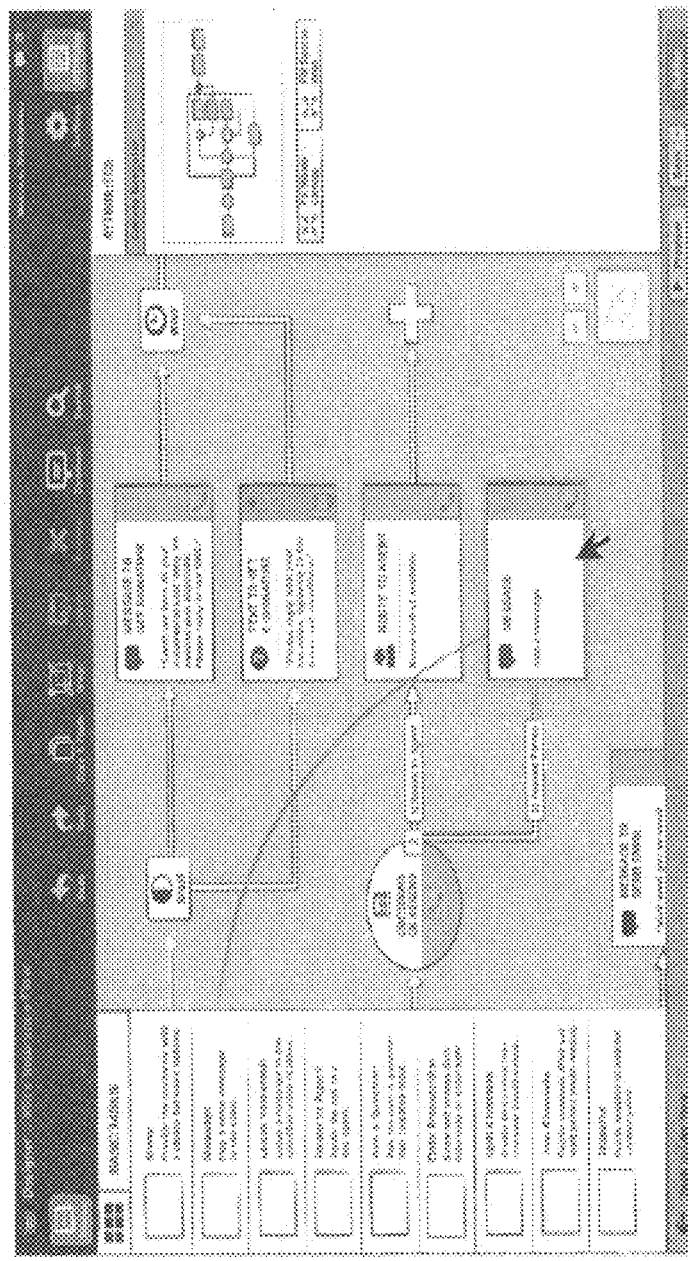
Figure 51:
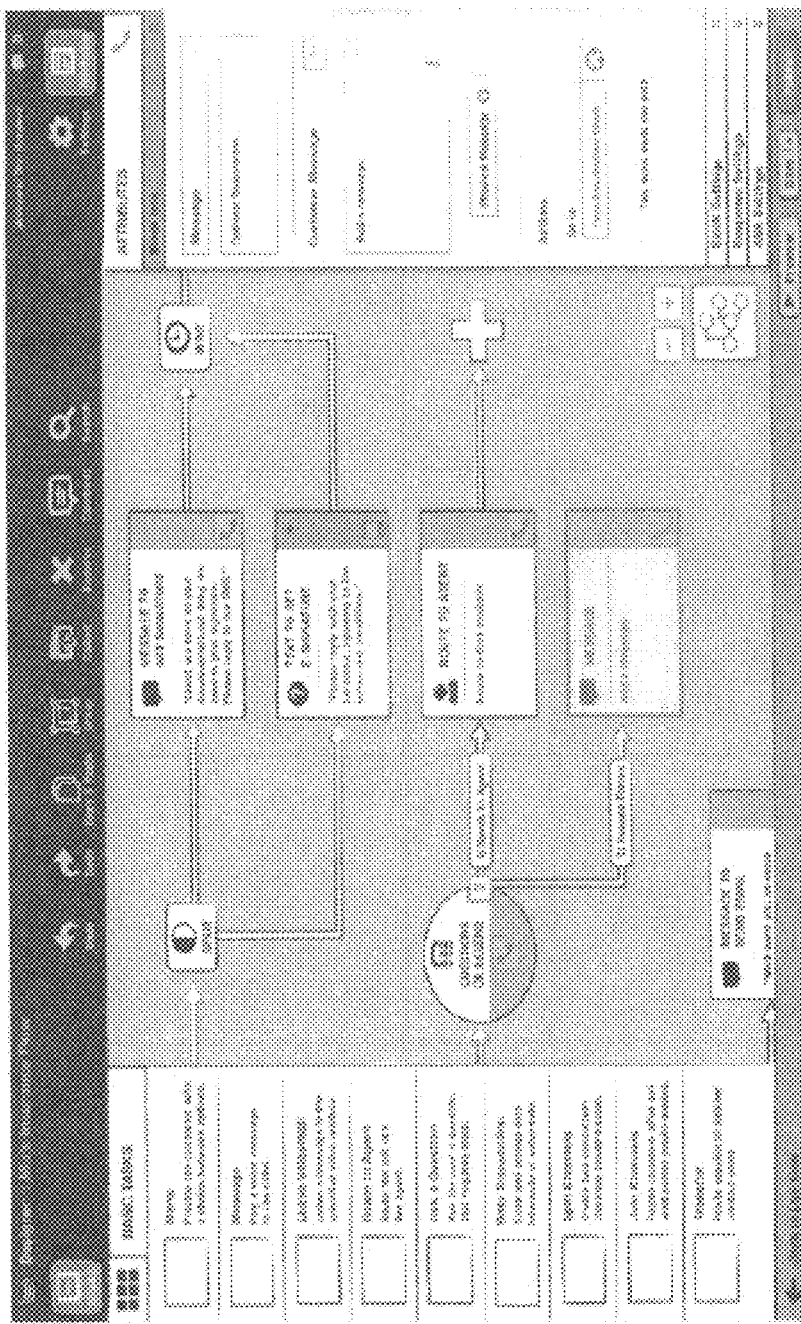

FIGS. 5A-5I are screen shots of the GUI provided by the flow design tool for allowing an author to design a new interaction flow according to one embodiment of the invention. The author may start the design process from a blank canvas, or choose from one of existing templates as depicted in FIGS. 5A and 5C. In either case, the author may select blocks to add to the flow depending on the task that is to be accomplished during the interaction. In this regard, according to some embodiments the design tool or interface 100 may provide a list of basic tasks as will be illustrated in more detail in FIG. 6. The author may drag and drop a desired task from the list, as is depicted in FIG. 5G-5I. Attributes of the selected block may then be configured via an attributes panel.

Starting at FIG. 5A, the interface 100 may include display a flow design creation screen 200. The flow design creation screen 200 may include a name block or name field 202, in which the designer or agent 11 may enter a name for the flow. The flow design creation screen 200 may further include various buttons 204 and 206 for creating a new interaction flow design. For example, the designer or agent 11 may click on or select the button 204 to start from a blank canvas (e.g., the canvas 104), or may click or select the button 206 to start the design from a preconfigured or prearranged template. If the designer or agent 11 selects the button 204, the interface 100 may proceed to the next screen in displaying a blank canvas (e.g., the canvas 104) and the various options for adding blocks to the canvas (e.g., the component menu 106 shown in FIG. 3).

Alternatively, if the designer or agent 11 selects the button 206, the interface 100 may proceed to the next screen by displaying a template selection screen or window 210. As shown in FIGS. 5B and 5C, the template selection screen 210 may include a template category menu 212, in which the designer or agent 11 may select among various predetermined categories of predefined templates, such as a list of all templates, a basic template, or templates geared toward various commercial enterprises such as retail, finance, healthcare, insurance, or any other template category according to the design and function of the interface 100.

Depending on the selected template category, the interface 100 may display a various template options 214 that the designer or agent may choose to start the flow design process, such as a blank canvas (e.g., the canvas 104), or various pre-populated templates such as a template for routing to an agent, a template checking hours of an agent and routing to an agent, a template for creating a voice or IVR menu, a template for creating a multi-lingual voice menu, a template for exchanging questions and answers via SMS text communication, a template for checking the account status of a caller or customer, a template for bill payment, a template for bank transfers, a template for account management, or any other template configurations according to the design and function of the interface 100 and/or the business goals of the contact center. According to some embodiments, the interaction system 2 may provide such templates to various customers of the interaction system 2, and enable customers and partners to share various predesigned interaction flow templates with each other. For example, the interaction system 2 may include a marketplace or electronic storefront operating as part of the interaction system 2, in which users may upload or share interaction flow templates to be used or purchased by other users through the interface 100.

In response to the designer or agent 11 selecting a template (e.g., as shown in FIGS. 5B and 5C), the interface 100 may proceed to a flow design screen 220. The flow design screen 220 may include a component menu or interaction block selection tool 222 (e.g., similar to the component menu 106 in FIG. 3), including a plurality of interaction blocks for adding to the canvas. According to some embodiments, after a block is added, the interface 100 may display one or more symbols following the added block to indicate the positions where additional blocks may be added to the flow design. For example, as illustrated in FIG. 5D, in response to the choice block 224 being added to the flow design canvas 226, the interaction system 100 displays a first interaction flow path 228 and a second interaction flow path 230, which correspond to the various choice options or selections at the choice block 224, respectively. For each path 228 and 230, the interaction system 100 displays a next block symbol (e.g., a plus sign) 232 and 234, respectively, indicating where subsequent blocks should be added to the flow design.

Continuing from FIG. 5D, according to some embodiments, when the designer or agent 11 hovers over or selects (e.g., by touching or clicking) one of the symbols 232 or 234, as shown in FIG. 5E, the interaction system 2, through the interface 100, may display a menu 236 (e.g., in the form of a pop-up or overlaid window) listing one or more suggested blocks for adding to the flow design following the previous block (e.g., the block 224). The interaction system 2 may populate the menu 236 with suggested blocks based on a logical progression of the flow design, based on the parameters of the previous block, based on predetermined business rules or goals, based on an analysis of other flow designs, or any other suitable prediction or suggestion mechanism according to the design of the interaction system 2. For example, if, at the previous block (e.g., the block 224), the flow design dictates that the interaction system 2 will determine whether or not the customer should be routed to an agent, the menu 236 may include a suggested block at which the interaction or communication will be routed to an agent, a message will be delivered to the caller or customer, the interaction will be transferred to another agent, the path of the flow design will terminate, etc.

According to some embodiments of the present invention, the interaction system 2 may include an application server (e.g., operating as part of the computing environment 24, or included within one of the servers 40-50 shown in FIG. 1) hosting a recommendation engine, which may utilize analytics of historical data, behavioral aspects, and suitable machine learning algorithms to predict a next block or a next set of blocks in an interaction flow design. For example, according to some embodiments of the present invention, when a block is added to the flow design canvas, the interaction system 2 may analyze historical data of previous flow designs to identify certain related blocks that frequently follow the newly added block, and may list the most frequent related blocks as part of the menu 236. The interaction system 2 may further include a behavioral analytics component, in which the recommendation engine of the interaction system 2 may predict the next block based on how humans may respond to certain situations, according to a suitable behavioral theory algorithm or scheme known in the art (e.g., planned behavior, reaction adaptation, metacognition). According to some embodiments, the interaction system may further include a machine learning component to predict the next block using a suitable machine learning scheme such as expectation maximization, vector quantization, clustering, and the like, to derive meaning in terms of what the designer or agent 11 is attempting to accomplish with the flow design, in order to predict the next step of the flow design.

Accordingly, the interface 100 may enable the designer or agent 11 to efficiently populate the canvas while reducing the amount of time and effort to consider which blocks should be incorporated into the canvas at each stage.

As shown in FIG. 5F, according to some embodiments, after a block is added to the canvas, the interface 100 may display an attribute or settings configuration panel or window 240 for modifying or establishing the various settings or parameters corresponding to the added block, such as the description of the block, actions to be taken at the block (e.g., route to an agent, deliver a message, exchange data, etc.), and sub-actions or sub-parameters of the block (e.g., how to route to an agent, the desired qualities of the agent, etc.).

As shown in FIG. 5G, rather than adding a block based on suggested blocks as shown in FIG. 5E, the interface 100 may enable the designer or agent 11 to simply drag additional blocks from the component menu 222 onto the canvas. Additionally, according to some embodiments, as blocks are selected from within the component menu 222 and moved onto the canvas, the interface 100 may highlight a location in the flow design as a suggested location for placing the new block. Accordingly, the interface 100 may provide a visual aid to indicate how aspects or elements of the flow design may fit together as the flow is being designed. According to some embodiments, the canvas 104 of the interaction system 100 may be arranged in a grid configuration, such that when a block is moved to the canvas, the interface 100 may highlight a location where the block can be, or should be, positioned. Additionally, according to some embodiments, the interface 100 may prevent the designer or agent 11 from positioning a block outside of the highlighted location or outside of the grid. Accordingly, embodiments of the present invention may provide a mechanism for avoiding confusion or complications by preventing blocks from overlapping each other within the canvas.

According to some embodiments, once a block has been added to a position within the flow design on the canvas, the newly added block may remain selected or highlighted and a corresponding attribute panel (e.g., the window 240 in FIG. 5F) or window may be displayed for configuring the settings, parameters, and attributes of the newly added block.

Figure 6:
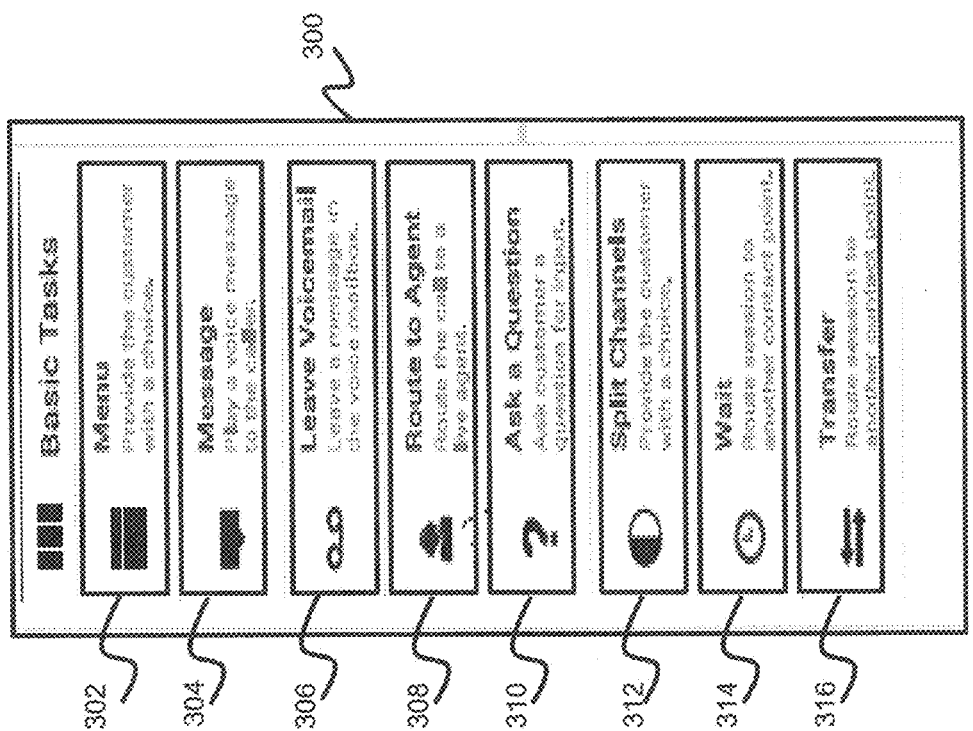
FIG. 6 is a block diagram illustrating further detail of an interaction block selection tool, according to some embodiments of the present invention.

FIG. 6 illustrates further detail of a component menu or interaction block selection tool 300 (e.g., similar to elements 106 and 222) and various example blocks that may be incorporated into a flow design, according to embodiments of the present invention. As shown in FIG. 6, the component menu 300 may include a menu block 302, at which a caller or customer may be presented with various choices or selections for proceeding in the interaction flow, a message block 304, at which a message (e.g., a voice or text-based message) may be delivered to a device associated with a caller or customer, a mail block 306, at which a message (e.g., a voice or text-based message) may be delivered to an inbox or mailbox associated with a caller or customer, a routing block 308, at which an interaction may be routed to an agent of a contact center, a question block 310, at which a caller or customer may be solicited to provide input (e.g., in the form of an answer to a question), a split block 312, at which an interaction may be split into multiple communication channels or mediums to facilitate aspects of the interaction such as exchanging text-based information during a voice interaction, a wait block 314, at which the interaction system 2 may wait for information from various paths to be obtain or criterion to be satisfied before proceeding to a next block in a flow, and a transfer block 316, at which a interaction may be routed to another contact point within a flow or another agent or contact center resource (such as another live agent, a chat bot, or an IVR system).

Embodiments of the present invention are not limited to the blocks discussed above, however, and the component menu 300 may include any other suitable blocks according to the design and function of the interaction system 2 and the business rules or goals of the corresponding contact center. As discussed above, as each of the blocks of the component menu 300 are added to a canvas within the interface 100, the interaction system 2 may generate corresponding instructions or code (e.g., in the form of VXML and/or SCXML code) and may update or modify the code corresponding to previously added blocks. Thus, embodiments of the present invention may provide a convenient interface for generating interaction flow instructions or code by providing a graphical representation of each step or block within a flow design, and the instructions for each block may be automatically generated, modified, and/or updated without the designer or agent needing to be familiar with programming techniques or syntax.

As discussed above, a particular type of bock that may be added to a flow design is a "split channel" block (e.g., the split block 312 in FIG. 6). The "split channel" block allows a single channel operation to be split into multiple channel flows, as is depicted in FIGS. 5G-5I. This multi-modal block may enable leveraging or initializing multiple (e.g., two or more) channels in parallel to provide flexibility to exchange various data in a channel that is convenient to the users. For example, a voice call may be split to provide a text message during the call so that information that is more convenient to exchange in a text-based channel may be exchanged during the interaction. According to one embodiment, a "wait" block (e.g., the wait block 314) may be inserted after a channel is split for receiving response from one of the other channels before proceeding.

When a particular interaction is split into multiple flow paths by way of a split block, the orchestration server 42 (or another component of the interaction system 2 such as the interaction server 47) may monitor the interaction at each of the split paths or sub-interactions, and maintain a master context or a universal set of information for all of the collective paths. For example, for the purposes of illustration, assume that a particular flow design includes a split block, and prior to the split block the interaction is conducted in a voice communication channel such as a telephony communication channel, where an agent is discussing a customer's application for a mortgage. At the split block, the interaction system 2 may split the interaction to obtain additional information from the customer, by initiating a text-based communication with the customer (e.g., via email or a website interface). In this regard, the orchestration server 42 (or another component of the interaction system 2) may signal the multimedia/social media server 43 to send the text-based communication to the customer, and await for the additional information prior to proceeding with the flow.

The two communication or sub-interaction paths may be rejoined to a single path at a wait block, where the orchestration server 42 (or another component of the interaction system 2) may wait until predetermined criterion is satisfied for each path. For example, in the voice channel path, the orchestration server 42 (or another component of the interaction system 2) may require a message be delivered to the customer that an email communication will be delivered to the customer for providing the customer's current home address in an attached form or document. The orchestration server 42 (or another component of the interaction system 2) may also deliver the email communication to the customer in parallel with the attached form or document. The orchestration server 42 (or another component of the interaction system 2) may then wait for the criteria of both communication paths (e.g., the voice message being delivered in the first path, the text-based massage being delivered in the second path, and the home address information being received by the interaction system 2) to be satisfied before proceeding to the next block in the flow design. Upon receiving the voice-based message in the first path, the customer may choose to provide their current home address to the agent with whom they are speaking in the voice channel. Because, the interaction system 2 may be monitoring the information and data exchanged in both paths and channels, and is maintaining master contextual information about the interaction, the interaction system 2 may proceed with joining the split channels back to a single channel and/or proceed to the next block in the flow design, rather than waiting to receive the current home address information from the customer in the text-based communication channel.

Additionally, as discussed above, according to one embodiment, the flow design tool is configured to suggest blocks to be inserted into a flow based on current context. As depicted in FIG. 5D, icons or other graphical depictions (e.g. plus signs) may be displayed on the canvas to indicate where blocks may be added next. According to one embodiment, hovering or selecting the icon causes the design tool to provide a suggested blocks overlay with suggestions of one or more blocks that might logically follow in the flow sequence as is depicted in FIG. 5E.

Figure 7A:
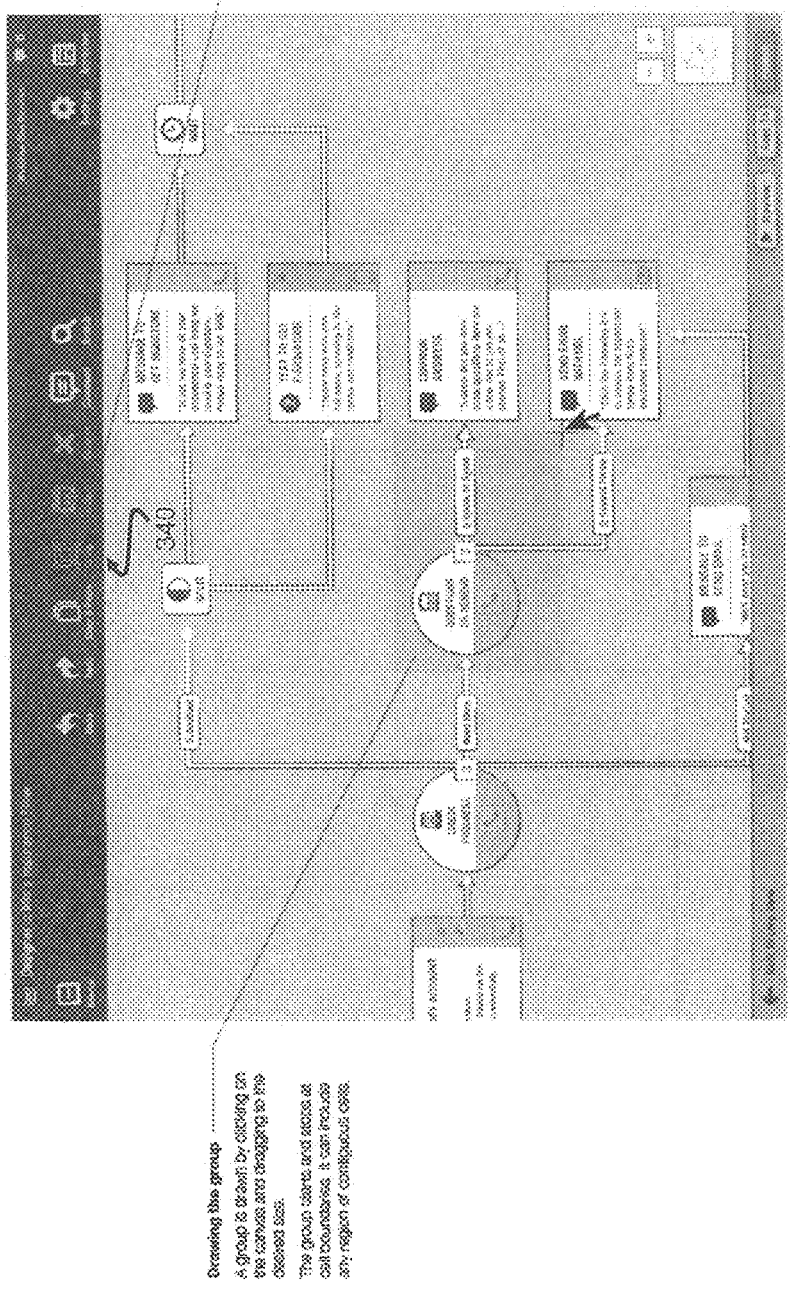
FIGS. 7A-7D are screen shots of an interface for organizing and/or managing an interaction flow design, according to some embodiments of the present invention.
Figure 7B:
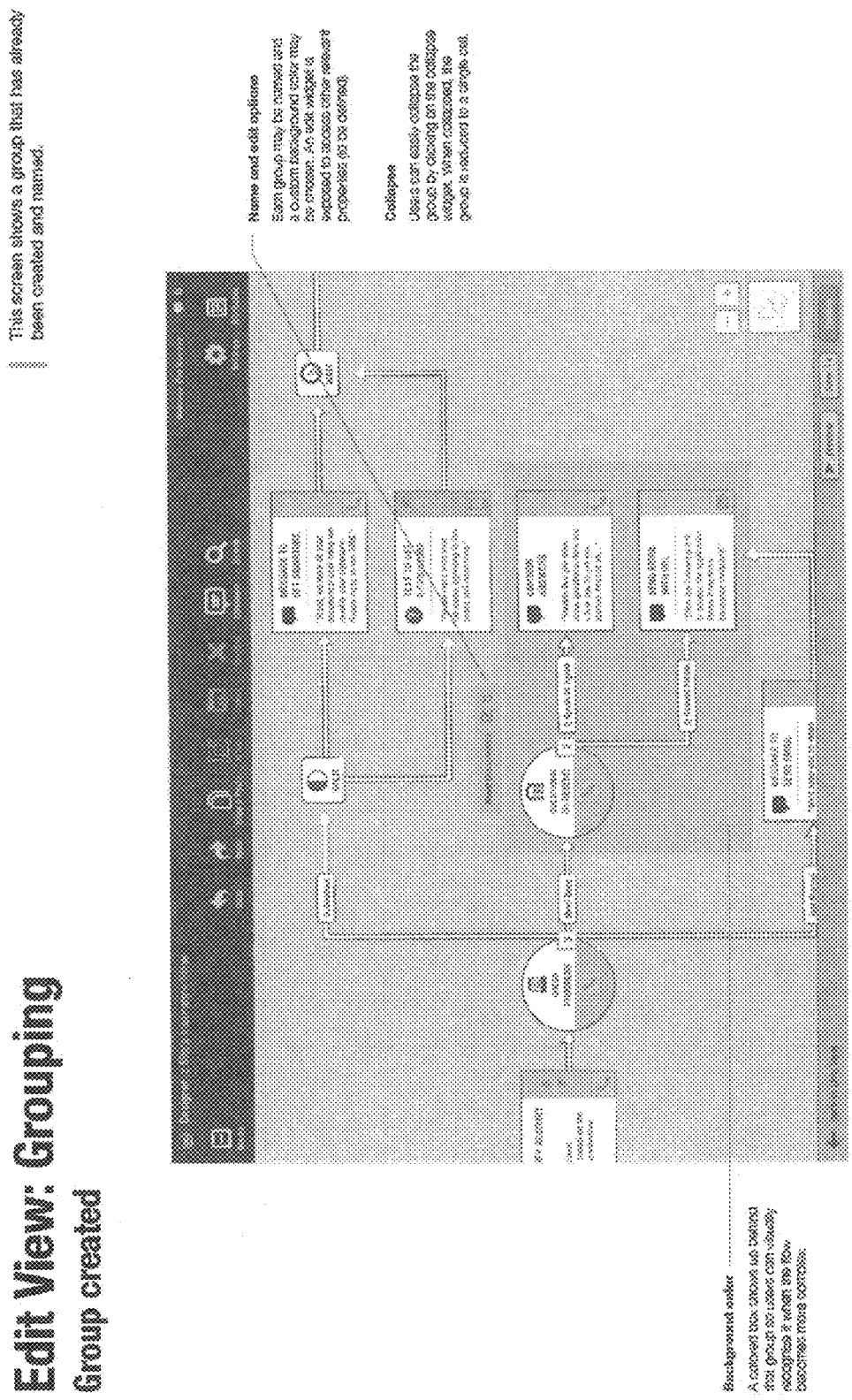
Figure 7C:
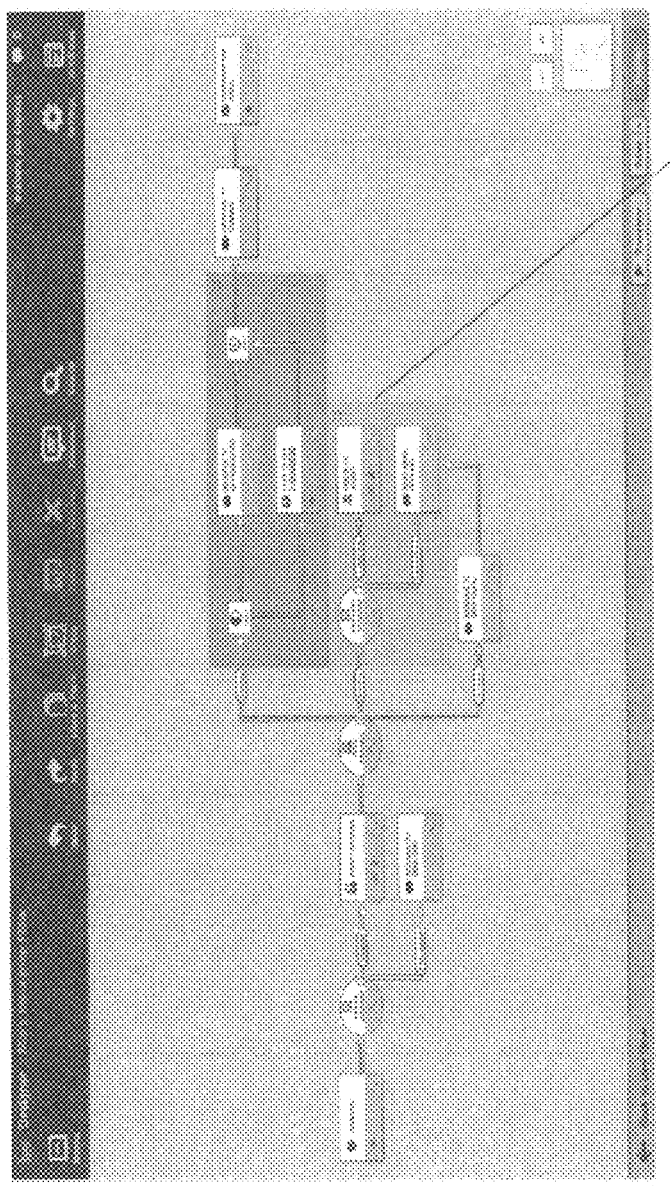
Figure 7D:
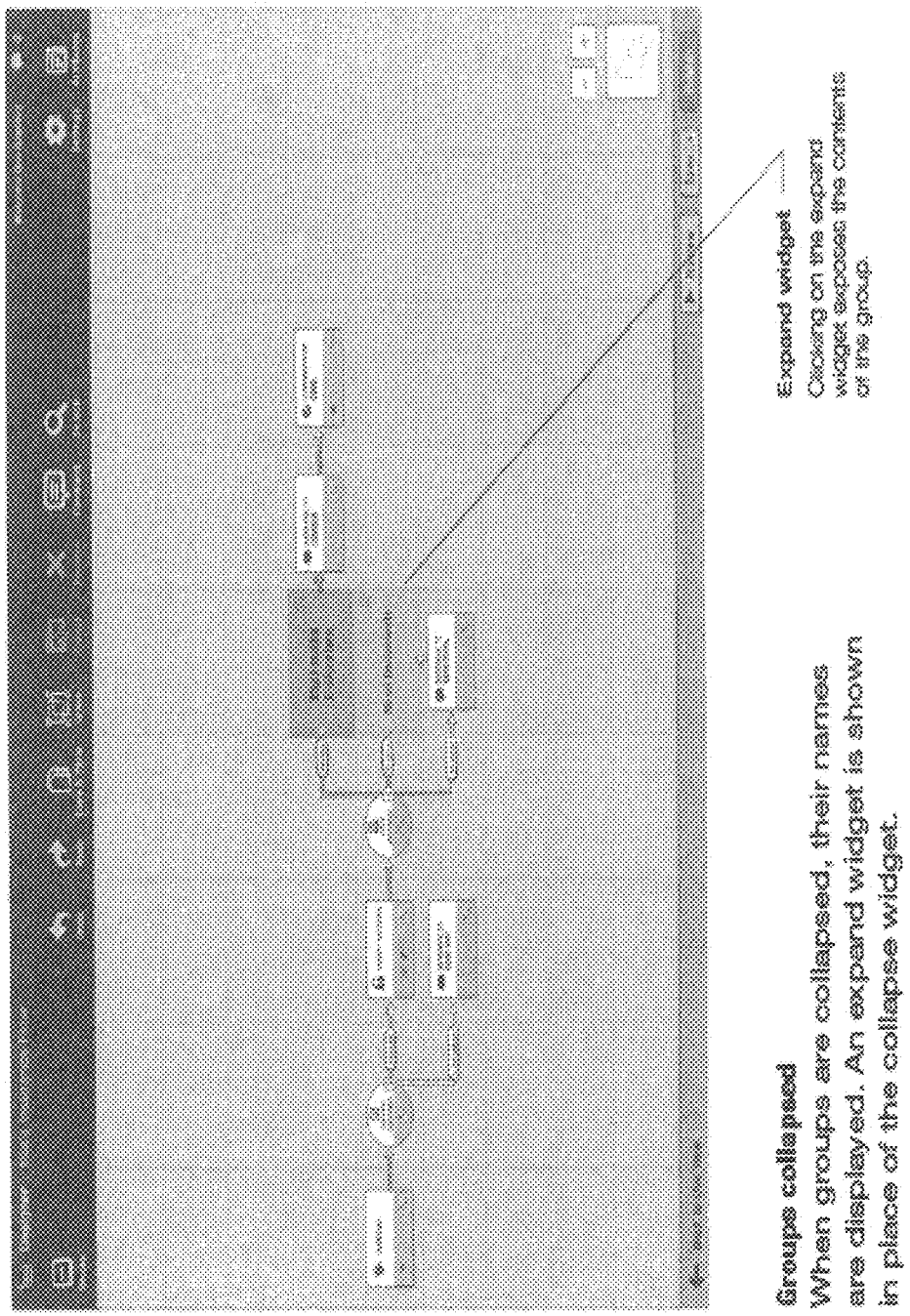

FIGS. 7A-7D are screen shots of the GUI provided by the flow design tool for grouping blocks according to one embodiment of the invention. As shown in FIG. 7A, according to one embodiment, the interface 100 may include a group toolbar item or button 340 which, when selected, allows the designer or agent 11 to select one or more blocks to group together. The selection may be by highlighting an area containing blocks to be grouped. A generated group may be assigned a name representative of the blocks in the group, as illustrated in FIG. 7B. The grouped blocks may be collapsed and depicted on the canvas as a single collapsed block as shown in FIGS. 7C and 7D. Clicking on an expand option exposes the contents (other blocks) in the group. As a person of skill in the art should appreciate, the ability to group and collapse blocks simplifies the flow canvas during the design process.

Figure 8A:
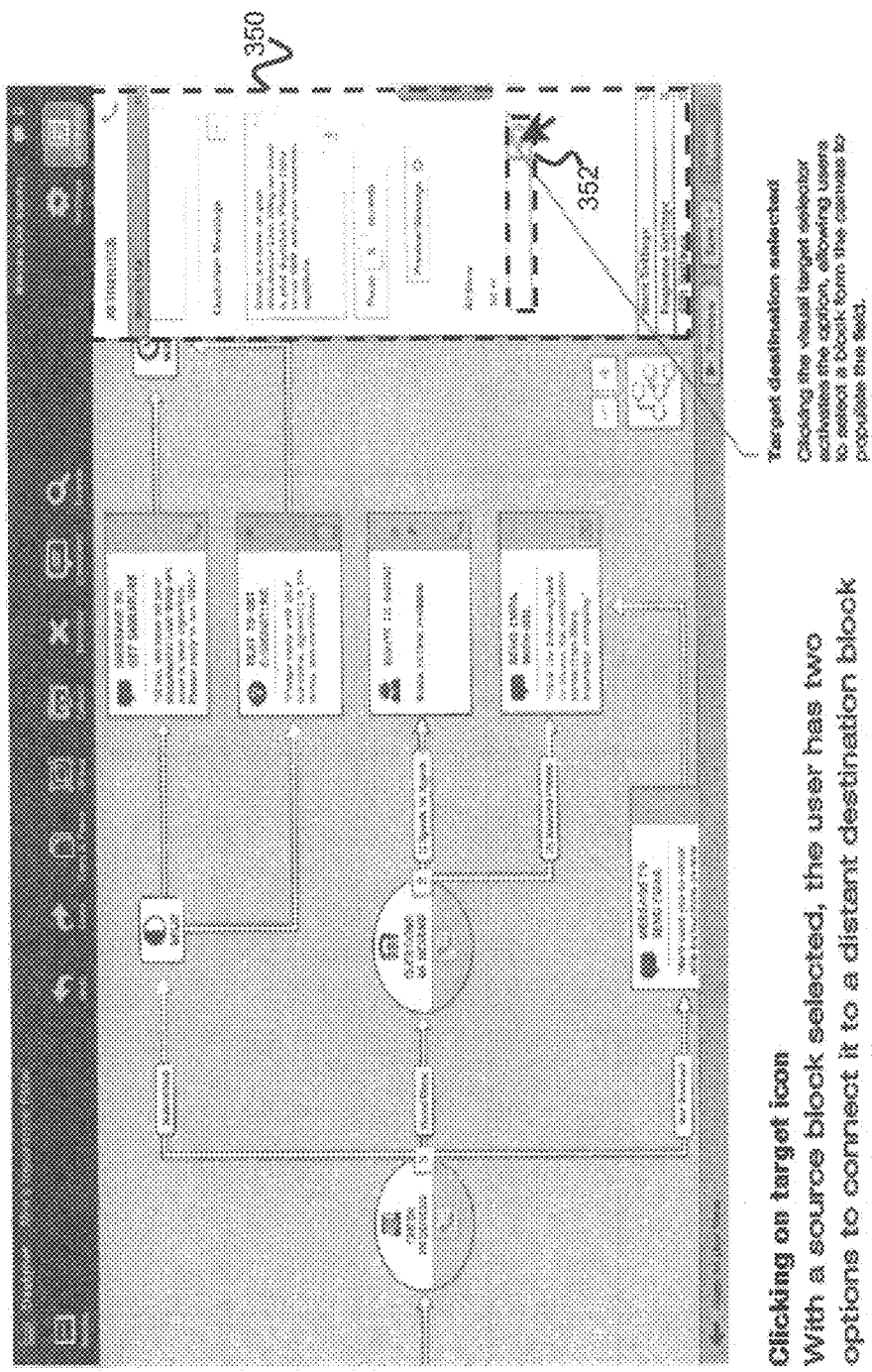
FIGS. 8A-8F are screen shots of an interface for connecting and organizing various blocks in an interaction flow design, according to some embodiments of the present invention.
Figure 8B:
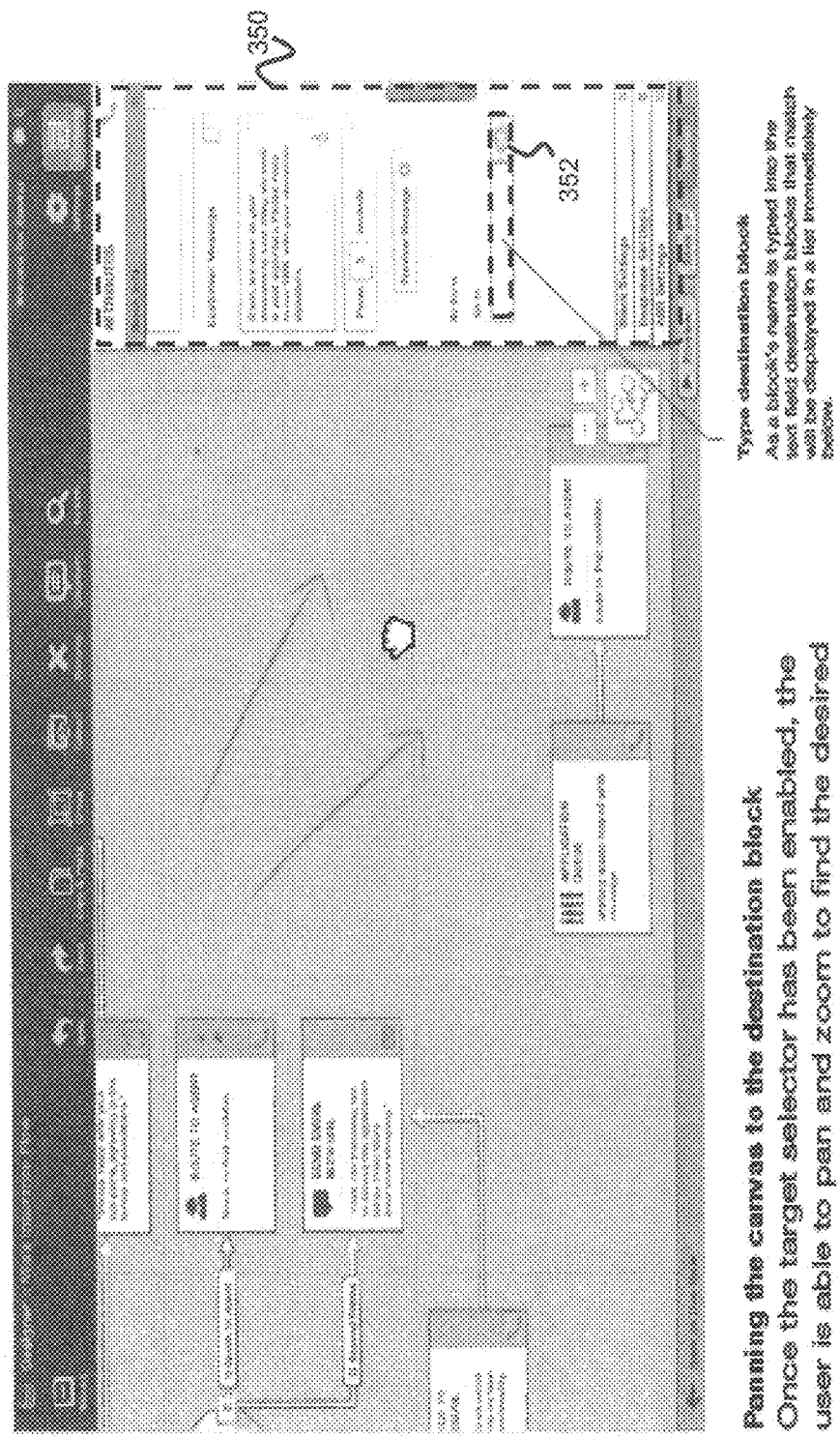
Figure 8C:
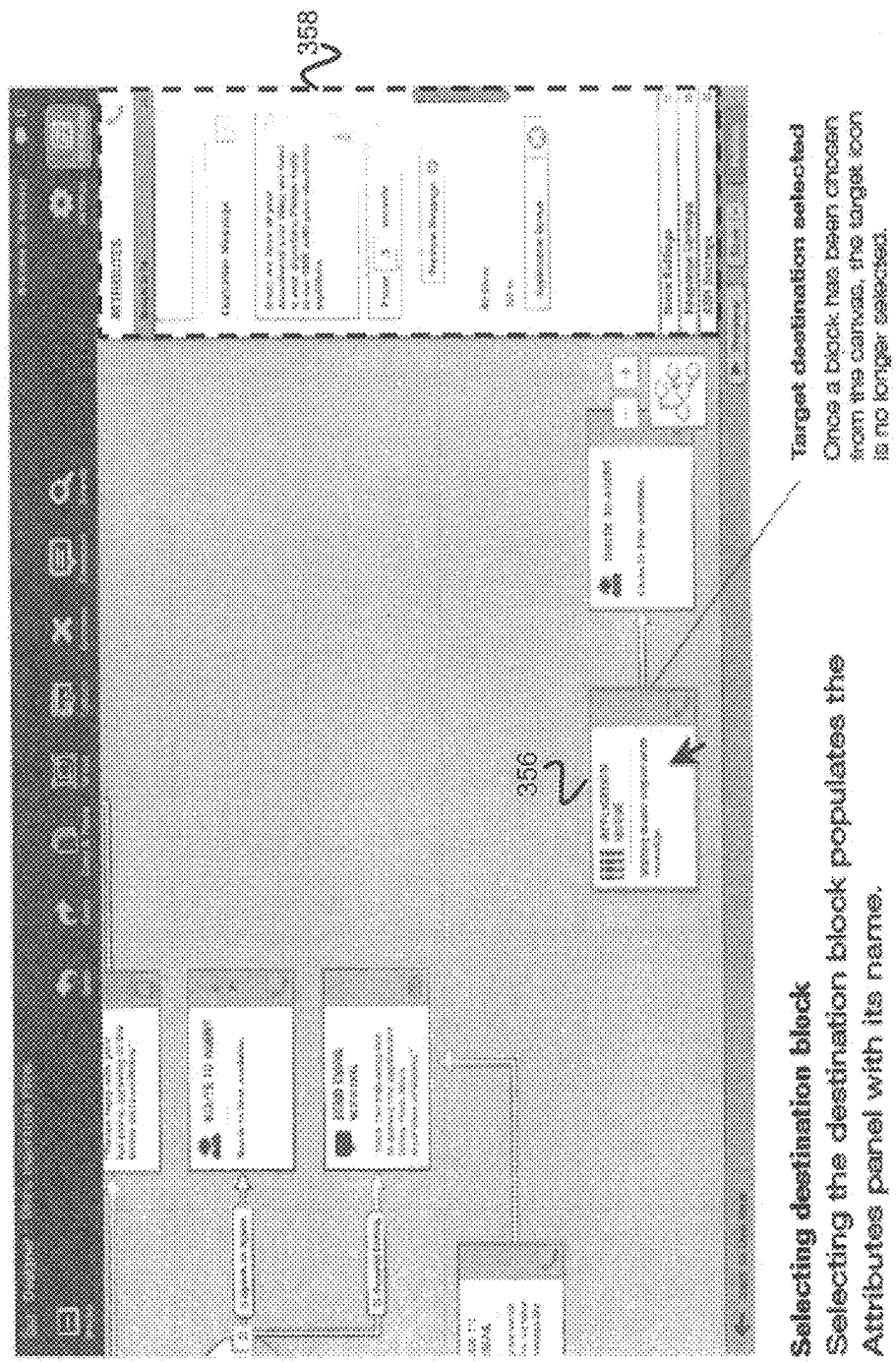
Figure 8D:
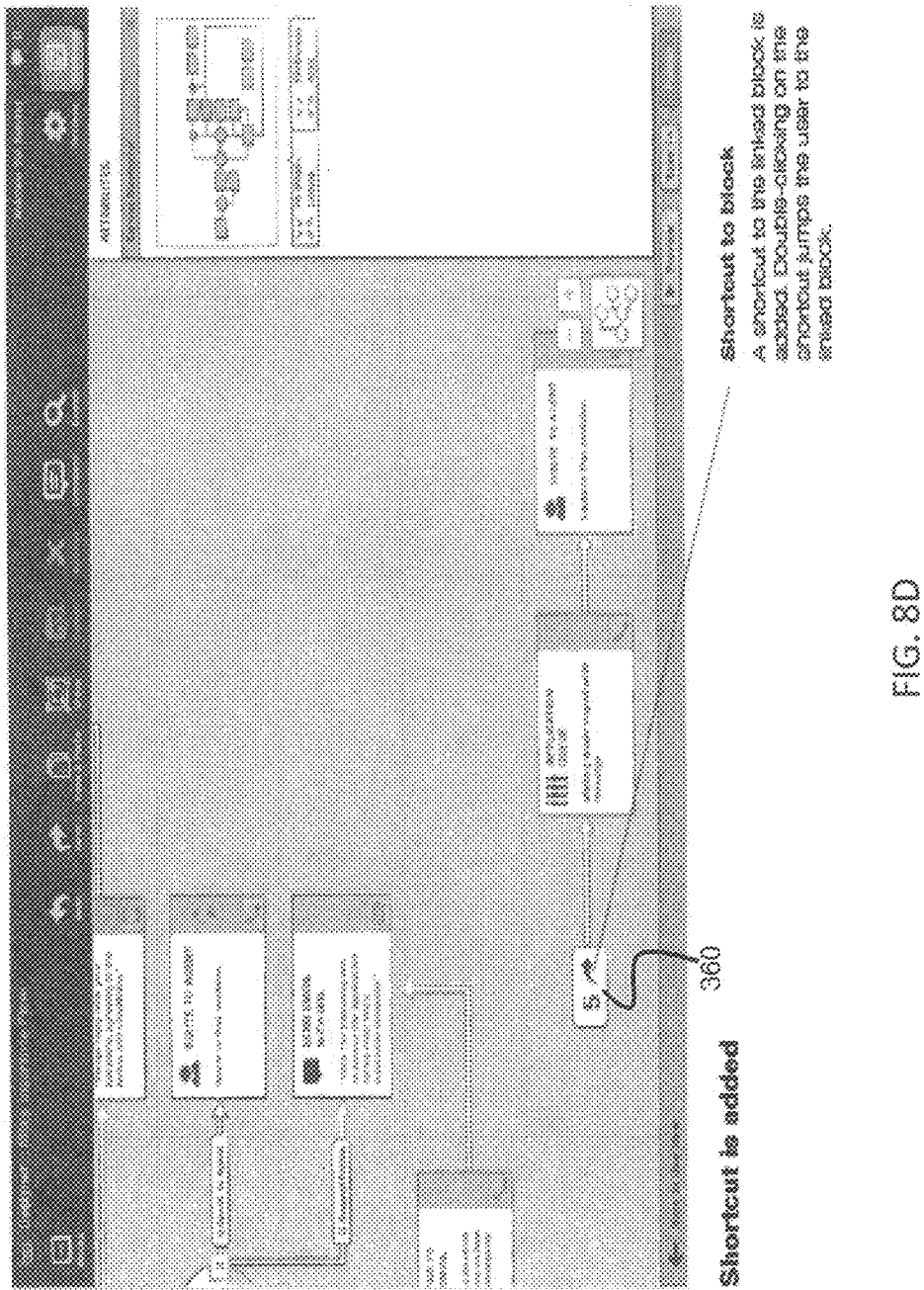
Figure 8E:
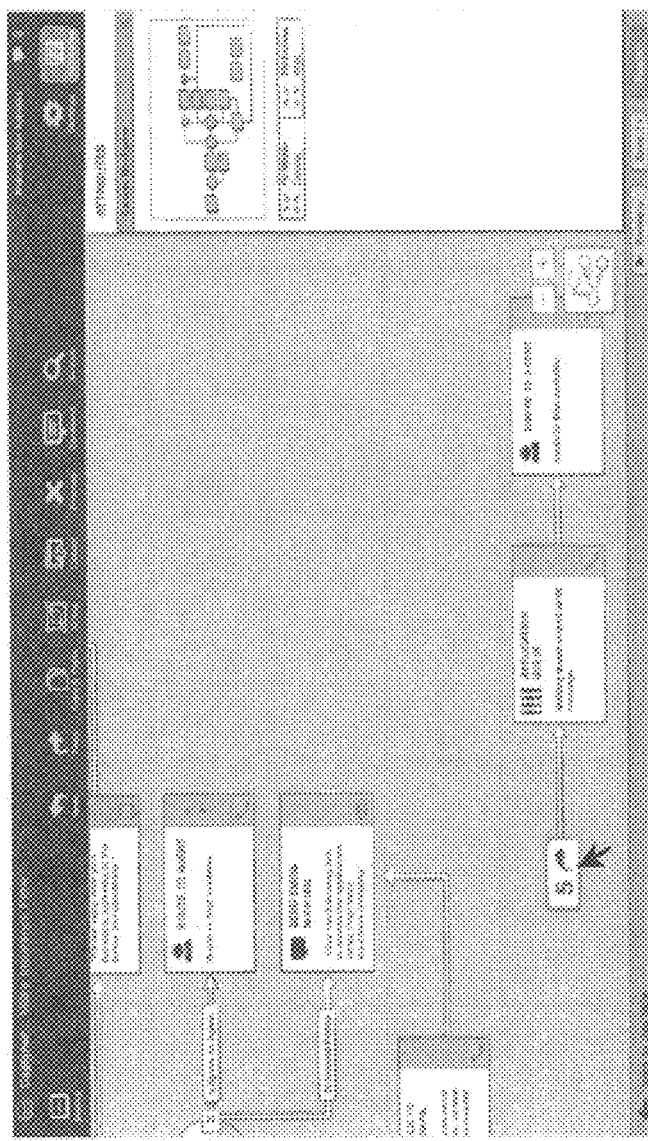
Figure 8F:
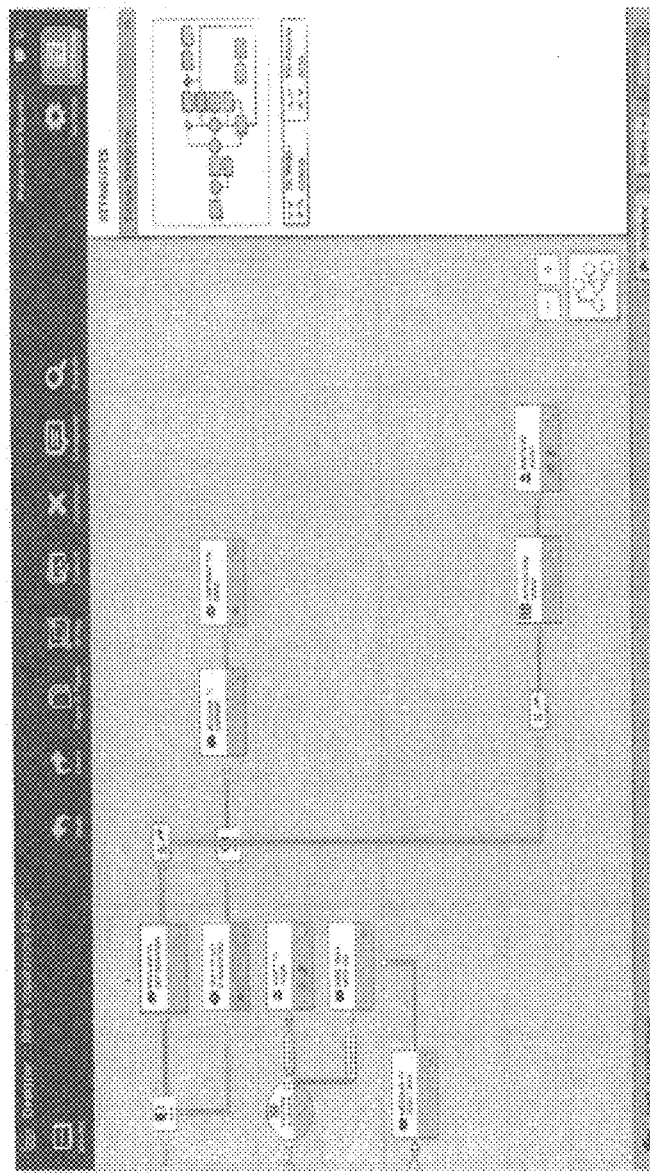

FIG. 8A-8F are screen shots of the GUI provided by the flow design tool for connecting a source block to a distant target block according to one embodiment of the invention. As shown in FIG. 8A, according to one embodiment, the attributes panel 350 for a selected source block includes a search field 352 for allowing the designer or agent 11 to search for a distant target block to which to connect to the selected source block. As shown in FIG. 5B, when a target block name is input into the search field 352, the interface 100 may display a list of matching blocks and/or may enable the designer or agent 11 to pan and zoom the canvas to find the desired target block on the canvas. As shown in FIG. 8C, when a destination block (e.g., the block 356) is selected, the interface 100 may then display an attributes panel 358 corresponding to the selected destination block. When the distant target block is identified, a shortcut icon or button 360 may be added to the canvas to elegantly link the source block to the distant target block without showing a connection line connecting the source to the distant target, as illustrated in FIG. 8D. Double clicking on the shortcut may jumps the author (e.g., by panning and/or zooming the canvas) to the linked block, centering the display on the linked block, as illustrated in FIG. 8E. The entire route from the source block to the distant target block may be visualized if desired, as is depicted in FIG. 8F. The route may be highlighted to stand out from other elements on the canvas.

Figure 9A:
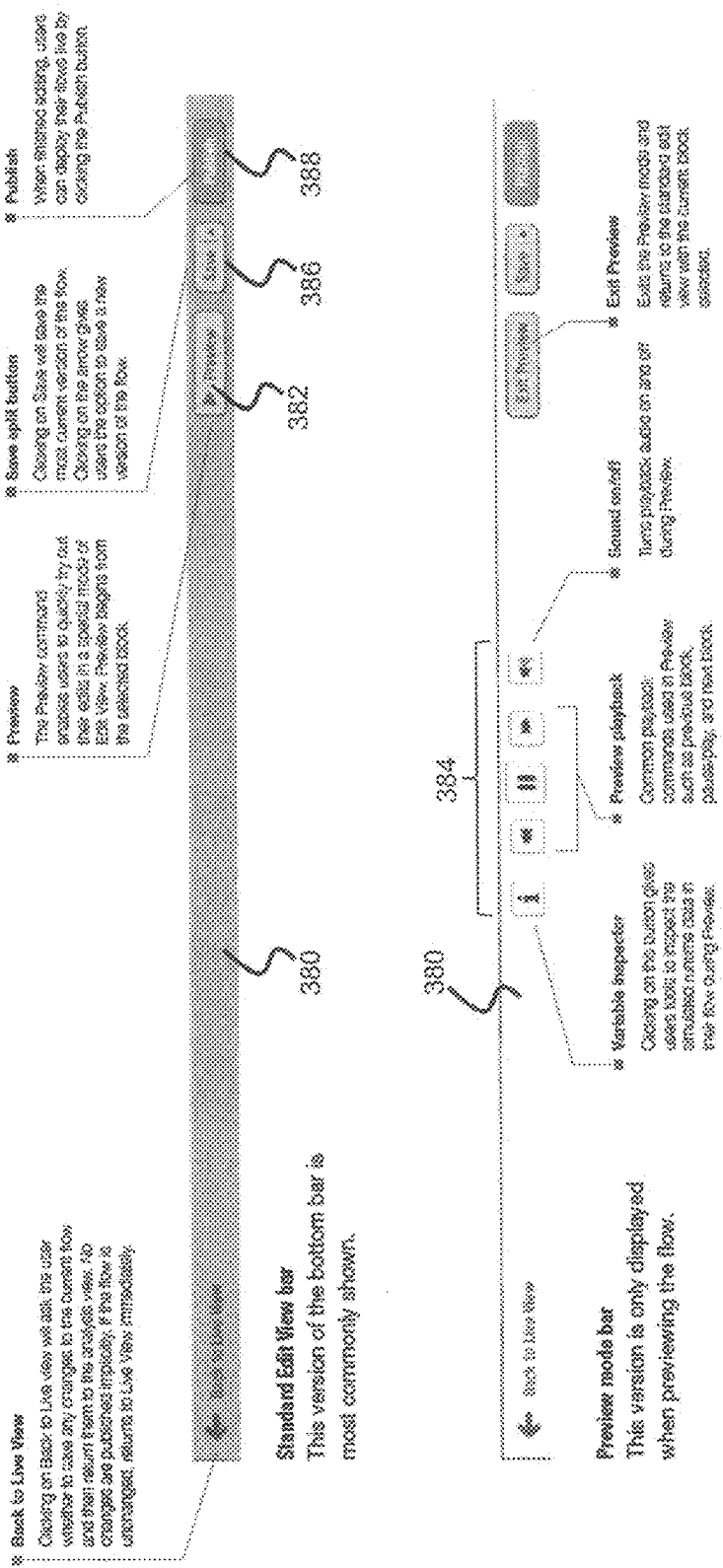

FIG. 9A is a screen shot of a toolbar 380 provided by the flow design tool according to one embodiment of the invention. The toolbar 380 may be displayed as part of the interface 100, and may include various tools or buttons for previewing, trouble shooting, and testing a flow design. For example, according to some embodiments, the toolbar 380 may include a preview command or button 382 which, upon selection (e.g., during a flow generation/edit mode), starts playback or walkthrough of the interaction flow to allow a user to quickly preview the experience that an end-customer would have. The toolbar 380 may include various playback command buttons 384, to enable the user pause, rewind, fast-forward the playback, inspect simulated runtime data in the flow design, and turn audio on and off. During the playback of the flow design, therefore, the designer or agent 11 may walk through or simulate the progression of a flow to detect any potential errors or bugs and to determine whether or not any changes should be made to the flow design. The toolbar 380 may additionally include a save button 386 to enable the designer or agent to save the flow design during the design process. Selection of a save option causes the most current version of the flow to be saved. Selecting on an arrow next to the save option gives the user the option to save a new version of the flow.

The toolbar 380 may further include a publish button 388. When the designer or agent 11 has finished designing and editing a flow design, they may click on the publish button 388 to deploy the flow design (e.g., by generating or finalizing the instructions or code associated with each block, and storing the instructions in memory for execution by the interaction system 2 during future interactions). The publish button 388 may be selected when the author is ready to deploy the created flow. According to one embodiment, the author may specify as part of the publish settings, the regions as well as dates and times applicable for deploying the created flow.

Figure 9D:
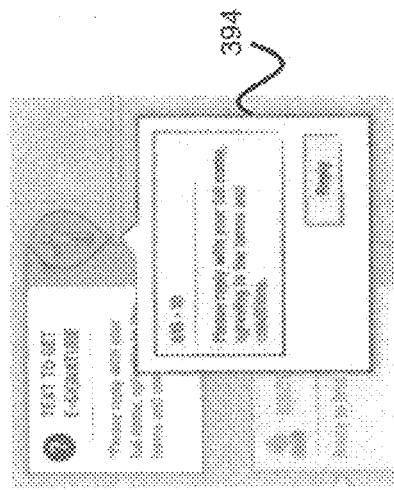
Figure 9C:
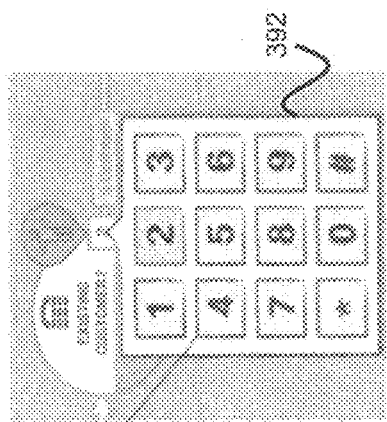

FIG. 9B is a screen shot of an example preview mode within the interface 100 according to one embodiment of the invention. According to one embodiment, a marker (e.g. icon of a person) 390 follows the flow as the flow is played. According to one embodiment, the marker may be dragged to a desired location to quickly jump to another point in the flow. If a portion of the flow requires user input, the playback of the flow pauses until such information is received. The user is prompted for such information in the same manner that the end-customer would be prompted. For example, as shown in FIGS. 9C and 9D, a popup 392, 394 of a user input device (e.g. phone keypad) or a text field for entering data may be displayed in order to allow entry of the necessary information at the active block during the playback session to continue the flow. Accordingly, during the playback session, the interaction system 2 may provide an interface for simulating the experience that customers would have while engaging in the interaction flow, thereby enabling designers of the interaction flow to conveniently and quickly test experience that customers would have across various communication channels or mediums such as voice, chat, email, etc.

Figure 9E:
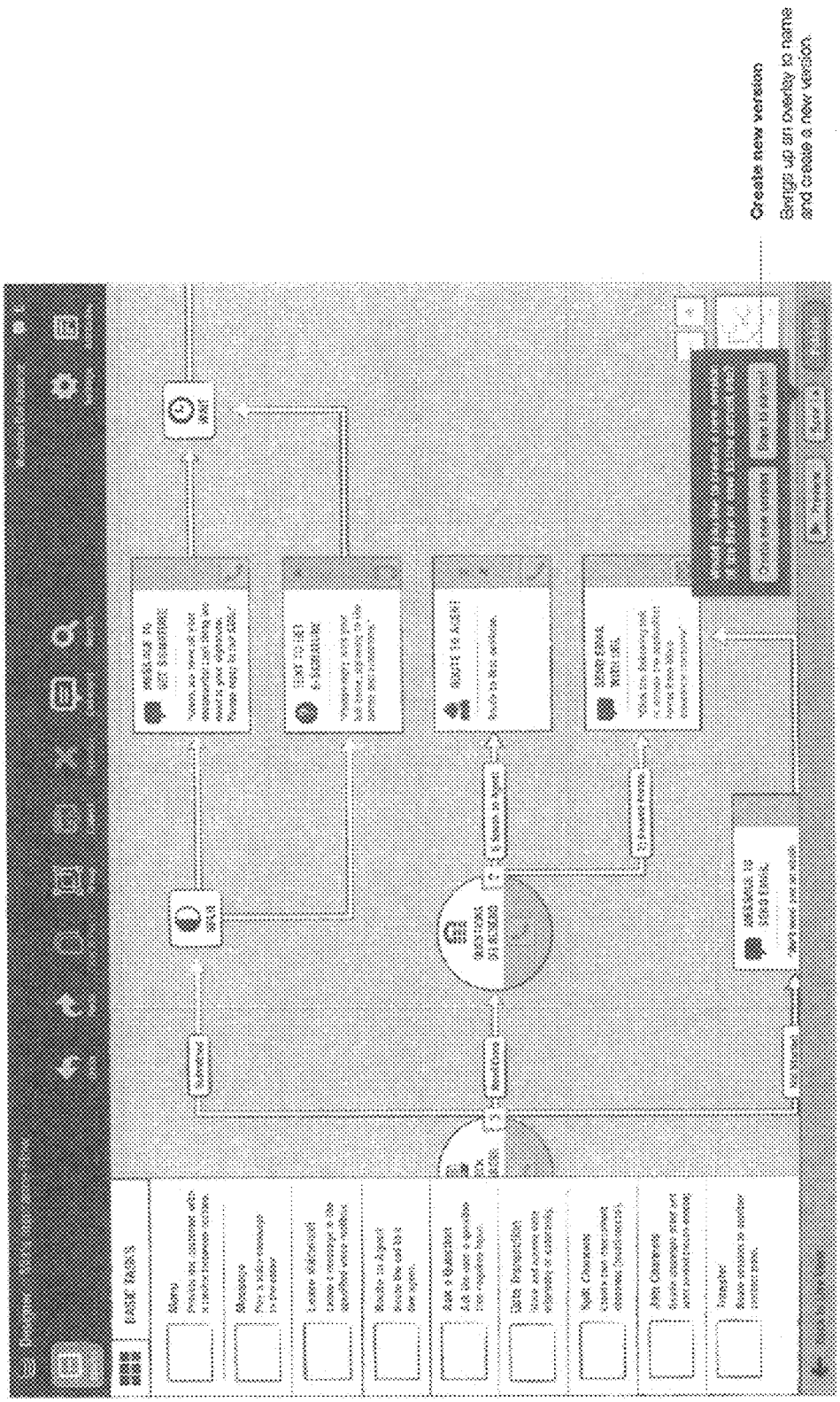

FIG. 9E is a screenshot of an overlay that is displayed within the interface 100 upon selecting the arrow next to the save option or save button 386 in FIG. 9A. The overlay gives the user the option to create a new version of the flow, or save the flow to the current version. According to one embodiment, the ability to store multiple versions of the flow allows the contact center to revert to an earlier version of the flow in the event that the current version is undesirable.

Figure 9F:
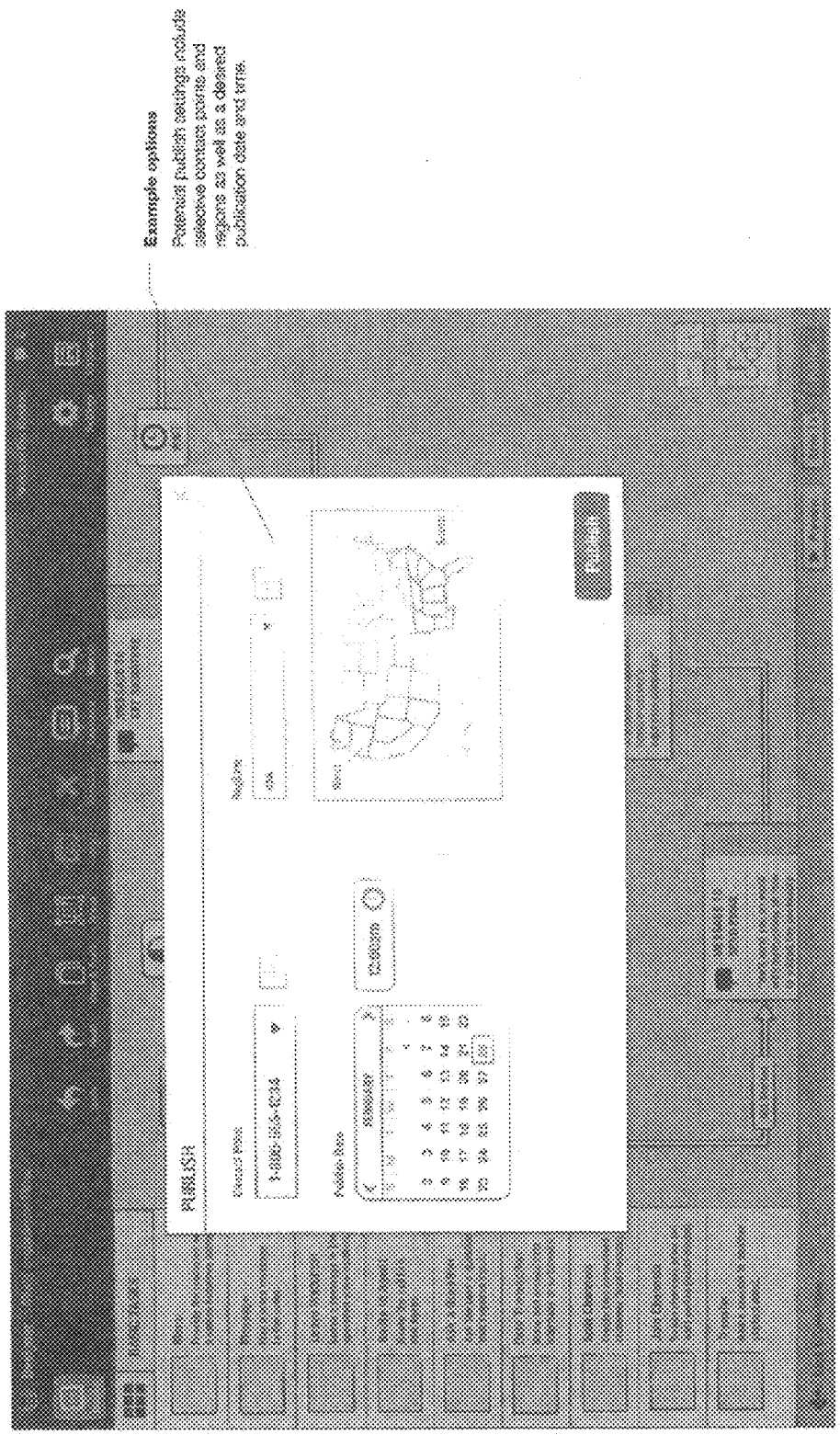

FIG. 9F is a screenshot of the options that may be set upon selection of the publish, option or publish button 388 according to one embodiment of the invention. According to one embodiment, the interaction system 2, (e.g., by way of the web server 40 in FIG. 1) may be configured to check the current flow against rules and regulations of the selected region for determining compliance. If a portion of the flow violates a known rule or regulation for the selected region, an alert may be provided and displayed via the design tool. The portion of the flow that causes the violation may also be highlighted. Thus, according to some embodiments of the present invention, a module or engine may be included within an application server (e.g., one of the components of the computing environment 24). The interaction system 2, by way of the application server, may store in memory various regulations and rules for operating a contact center environment for various countries or geographic locations. The designer or agent 11 may also define their own business rules, and during the design of an interaction flow, the interaction system 2 may validate the parameters of the interaction flow against the stored business rules and the geographically specific rules and regulations to ensure compliance. For example, in certain geographical areas, it may be illegal to record an interaction without notifying every party first. Accordingly, embodiments of the present invention may include a requirement as part of the interaction flow that a customer be notified of a call recording before proceeding through the interaction flow and recording the interaction.

According to one embodiment, when the flow is published, each element of the flow causes a portion of the routing strategy to be generated. This may be done, for example, by using a JSON (JavaScript Object notation) for each block which provides a definition for generating an SCXML code implementing the routing strategy. According to one embodiment, all or some of the parameters defined for a particular block are stored in a separate metadata file associated with the routing strategy. The separate metadata file is retrieved at run-time when the routing strategy is executed in response to an interaction with the contact center. All or some of the parameters may also be stored in the routing strategy as static parameters.

In addition to generating and storing the routing strategy, the layout of the blocks on the canvas is also stored for later retrieval and display. By displaying the flow of the routing strategy, a user may relatively easily visualize the end-customer experience. According to one embodiment, the flow design tool provides an option to view real-time data of the flow that is currently active. Such real-time data may include, for example, real-time information on the active flow, such as, for example, a volume of interactions flowing through each path. The connectors may be depicted in different colors to indicate the volume traversing that particular link.

FIGS. 10A-10D are screenshots of the interface 100 provided by the flow design tool for viewing a live flow according to one embodiment of the invention. According to some embodiments of the present invention, the interaction system 2 may display on an electronic device associated with a contact center information regarding published flows, including, for example, the traffic or volume of interactions flowing through each path of a flow design during operation of the flow design. Selecting a legend at the bottom of the view expands to show additional traffic metrics. Pertinent areas of the flow may also be highlighted.

Figure 10A:
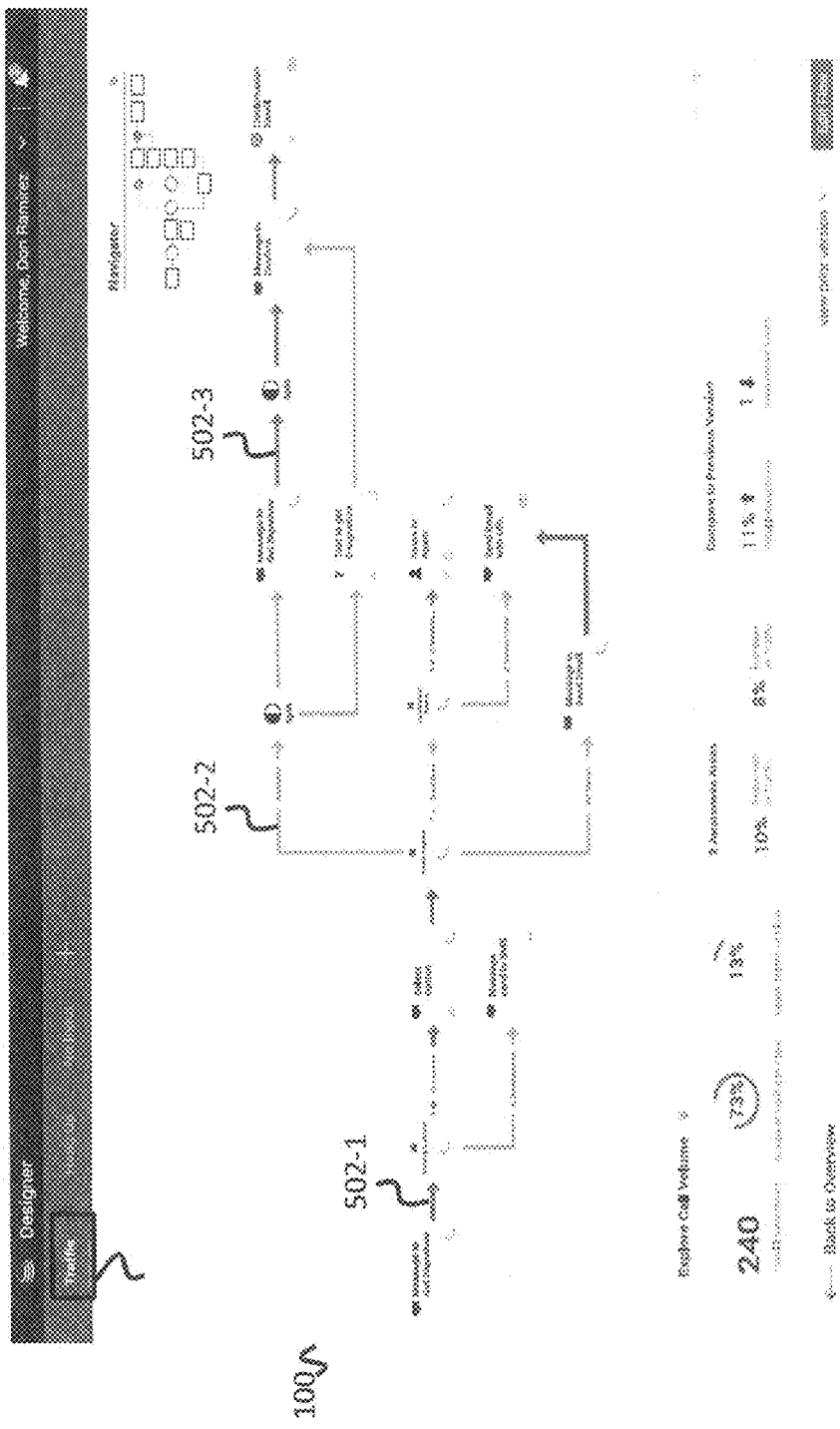
FIGS. 10A-10D are screenshots of an interface for viewing a live or published flow, according to some embodiments of the invention.

For example, as illustrated in FIG. 10A, a supervisor or agent 11 engaging with the interface 100 on an electronic device in communication with the contact center (e.g., the computing environment 24) may select a traffic analysis button 500 to initiate a live view of interaction traffic flowing through each path of a deployed flow design. The interaction system 2 may monitor interactions between customers and various contact center resources as the interactions progress through the flow design to determine the progression of each interaction. In response to the traffic analysis button 500 being selected, the interaction system 2 may display on the interface 100 a graphical representation of the volume of interaction traffic flowing through each path of the flow design. For example, various connections 502-1 through 502-3 between different blocks within the flow paths may have different colors (such as green, orange, and red) to represent differences in the volume of traffic along the corresponding connection.

Figure 10B:
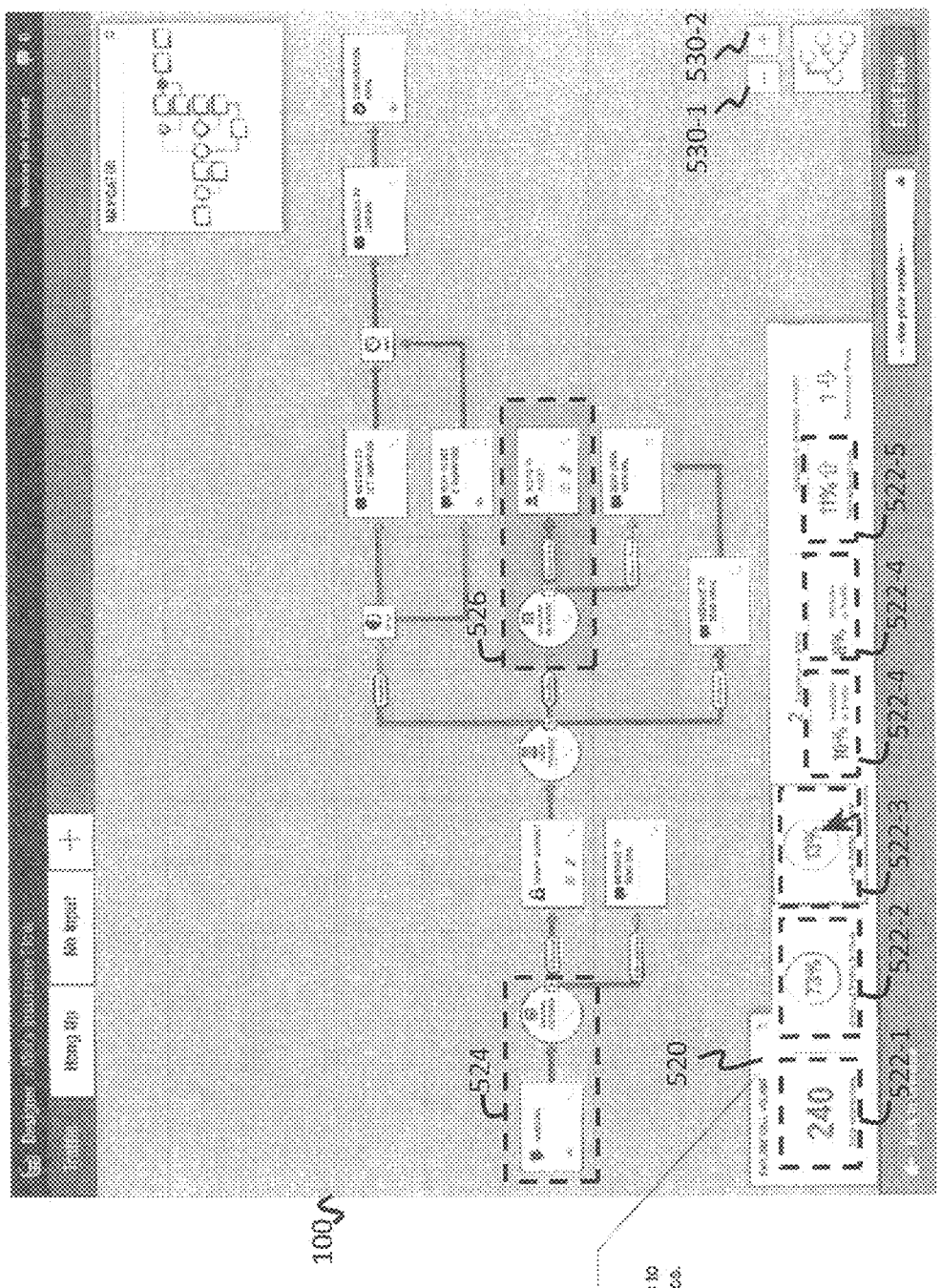

As shown in FIG. 10B, the interface 100 may further include a traffic metrics panel or menu 520 displaying various traffic metric tools 522-1 through 522-5, although the number and functionality of the traffic metric tools may vary according to the design and function of the interaction system 2 and the interface 100, and may include additional or fewer traffic metric tools than is illustrated in FIG. 10B.

The traffic metric tools may include, for example, a traffic metric tool 522-1 displaying information regarding a total number of interactions that have previously progressed along the present flow design. The traffic metric tools may include a traffic metric tool 522-2 displaying information regarding a sub-path within the flow design between adjacent blocks that has the greatest volume of interaction traffic. The traffic metric tools may also include a traffic metric tool 522-3 displaying information regarding a sub-path within the flow design between adjacent blocks that has the lowest volume of interaction traffic.

According to some embodiments, the traffic metric tools may include various alerts, such as a traffic metric tool 522-4 displaying information regarding reductions in traffic along a particular sub-path and a traffic metric tool 522-4 displaying information regarding increases in traffic along a particular sub-path, which may enable the supervisor or agent 11 operating the interface 100 to determine potential issues or changes to the flow design that should be made. According to some embodiments, the traffic metric tools may include a traffic metric tool 522-5 indicating the relative volume (e.g., as a percentage increase or decrease) of interaction traffic within the flow design compared to previous versions of the flow design or similar flow designs.

Additionally, according to some embodiments, the traffic metric tools may include other information about the performance or operation of the interaction flow, such as instances or locations (e.g., at specific branches or blocks of the interaction flow) in which user errors are occurring and the nature or quantity of such errors. The interaction system 2 may additionally display (e.g., within the traffic metrics panel 520 or within the flow design in the canvas 104) instances or locations in which caller or customer hang-ups or disconnections occur, or where callers or customers abandon interactions or calls. Accordingly, embodiments of the present invention may provide a mechanism through which users of the interaction system 2 may evaluate the traffic and performance of the flow design after it is deployed.

According to some embodiments, one or more traffic metric tools may be selectable to provide further information to the supervisor or agent 11 operating the live flow view of the interface 100. For example, according to some embodiments, the supervisor or agent 11 operating the interface 100 may select or click on a traffic metric tool 522-2 to highlight a path 524 within the flow design with the greatest volume of interaction traffic. According to some embodiments, the supervisor or agent 11 operating the interface 100 may select or click on a traffic metric tool 522-3 to highlight a path 526 within the flow design with the lowest volume of interaction traffic.

Figure 10C:
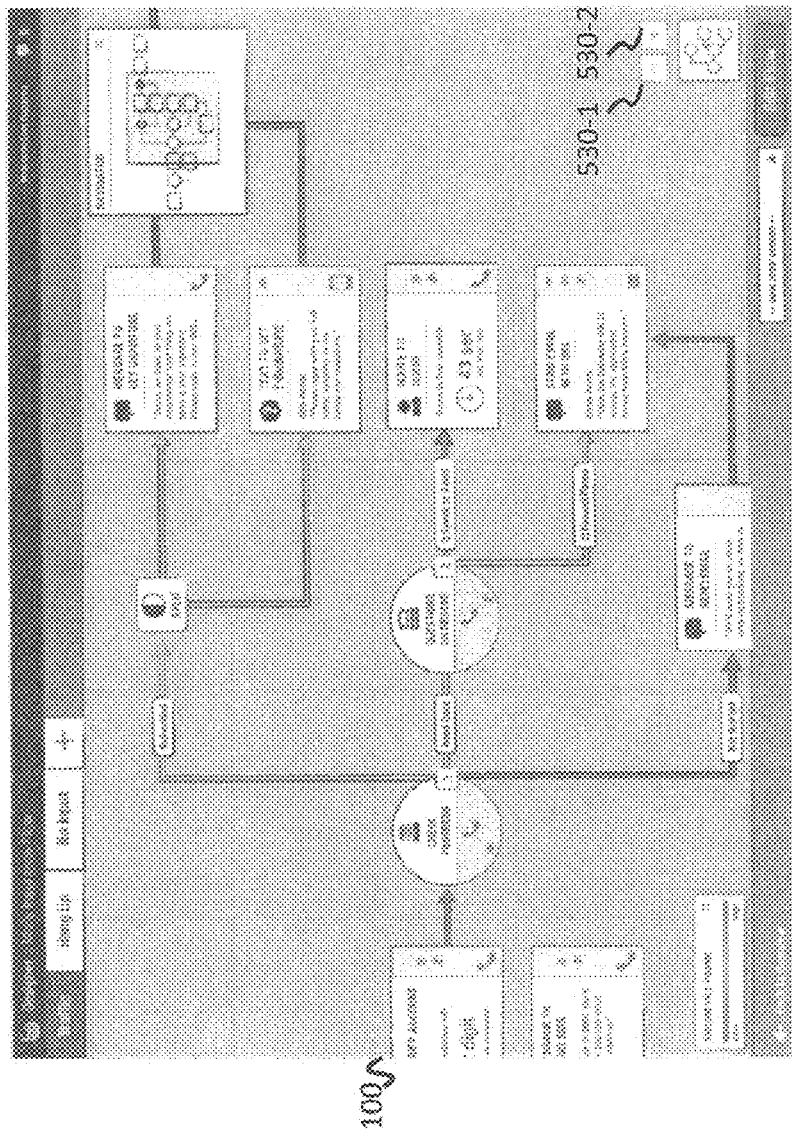

According to some embodiments of the present invention, the interface 100 may include various tools to navigate within the flow design during the live view analysis. For example, according to some embodiments, the supervisor or agent 11 operating the interface 100 may select a location within the canvas and drag the canvas in any direction to move the view of the interaction flow that is displayed on the interface 100. Additionally, the interface 100 may include a zoom-out button 530-1 and a zoom-in button 530-2 to make the view of particular blocks in the interface 100 smaller or larger. As shown in FIG. 10C, for example, in response to the zoom-in button 530-2 being selected, the interface 100 may increase the size of the blocks displayed within the interface 100 (compared to a more zoomed-out view of FIG. 10B). As the blocks are increased in size, the interface 100 may display additional information about the content of each block displayed within the interface 100. For example, information about messages to be delivered to a user device may be displayed within the blocks in a zoomed-in view that was not displayed in a more zoomed-out view.

Figure 10D:
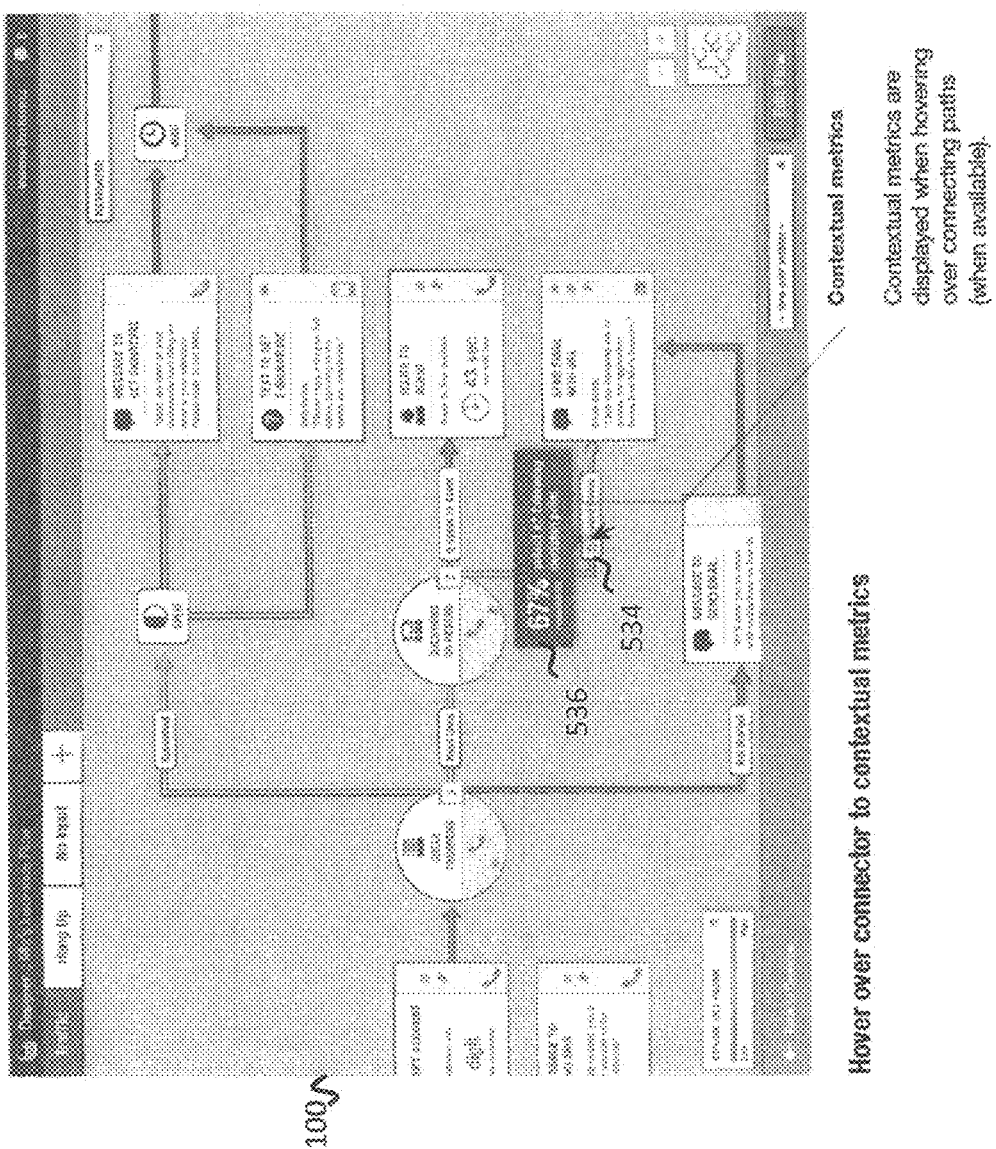

As illustrated in FIG. 10D, according to some embodiments, the interface 100 may display a connector 534 between two adjacent blocks. The supervisor or agent 11 operating the interface 100 may select (e.g., by clicking or hovering over) the connector 534 to display additional contextual metrics about the flow of interactions in the flow design. For example, in response to the user selecting the connector 534, the interface 100 may display an overlay or pop-up window 536 displaying information about the number of interactions flowing through or along the particular connector 534 (e.g., between the two adjacent blocks), such as how many interactions flow through a particular branch of a flow design, errors at a particular stage of a flow design, or people's behavior during interactions. Additionally, according to some embodiments, the interaction system 2 may enable call or interaction recordings along a particular path or connector to be replayed by supervisors or agents of the contact center to facilitate management of the flow design or contact center resources.

Accordingly, embodiments of the present invention provide a convenient interface 100 for monitoring, in real time, the flow of interaction traffic in a flow design to enable a supervisor or agent 11 operating as part of a contact center environment to identify the volume of interaction traffic or potential errors or issues with the flow design once it is deployed.

Figure 11:
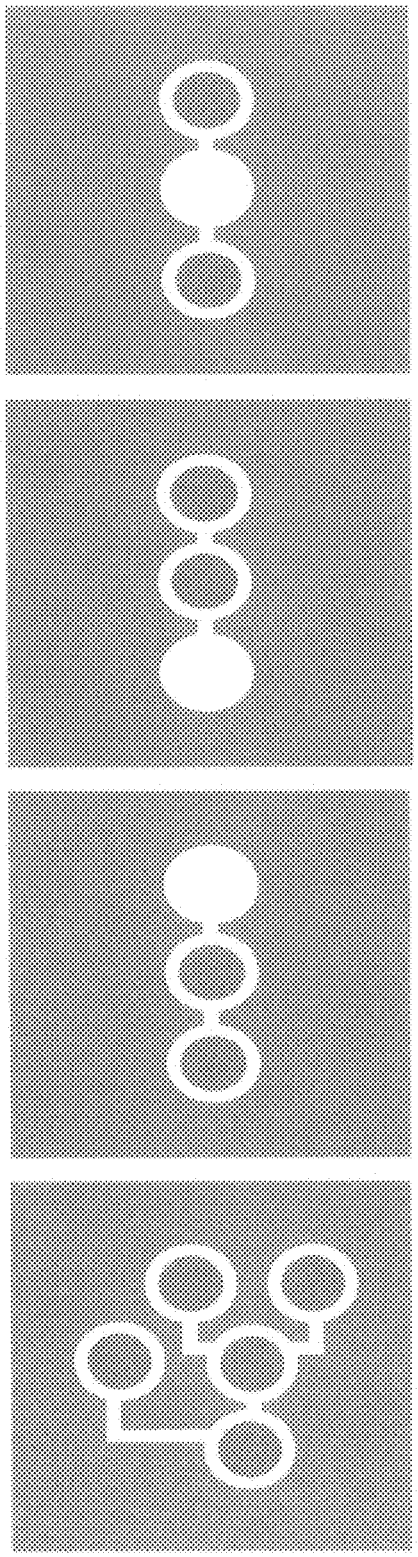
FIG. 11 is a block diagram illustrating various options for viewing and navigating an interaction flow design, according to some embodiments of the present invention.

According to one embodiment, a user may select different options for viewing a flow. Such options may include: 1) all blocks; 2) incoming; 3) outgoing; and 4) spotlight views, as is depicted in FIG. 11. Users can toggle between the various views to meet their specific editing goals. Selection of the "all blocks" view causes the design tool to show all flow elements on the canvas. Selection of the "incoming" view causes the design tool to show the path leading up to the currently selected block. Selection of the "outgoing" view causes the design tool to show all paths originating from the currently selected block, allowing the author to hide the complexity of prior branches that they are not currently working on. Selection of the "spotlight" view focuses the canvas on the currently selected element and its direct connections. As a person of skill in the art should appreciate, the configurable views help maintain ease of editing as flows become more complex. When dealing with a large interaction flow design, it may be difficult for a person designing the interaction flow or a supervisor monitoring interactions within a flow to understand the organization of the flow design. Accordingly, as illustrated in FIG. 11, the interaction system 2 enables the interface 100 to provide a mechanism to focus on relevant portions of a flow design according to their desires. For example, the designer or agent 11 operating the interface 100 may focus only on the path within a flow design leading up to a selected block, the path within a flow design that follows a selected block, the nearby (e.g., immediately adjacent) blocks of a selected block, or all of the blocks of a flow design, thereby enabling the user to direct their attention at a sub-portion of the flow design.

Figure 12A:
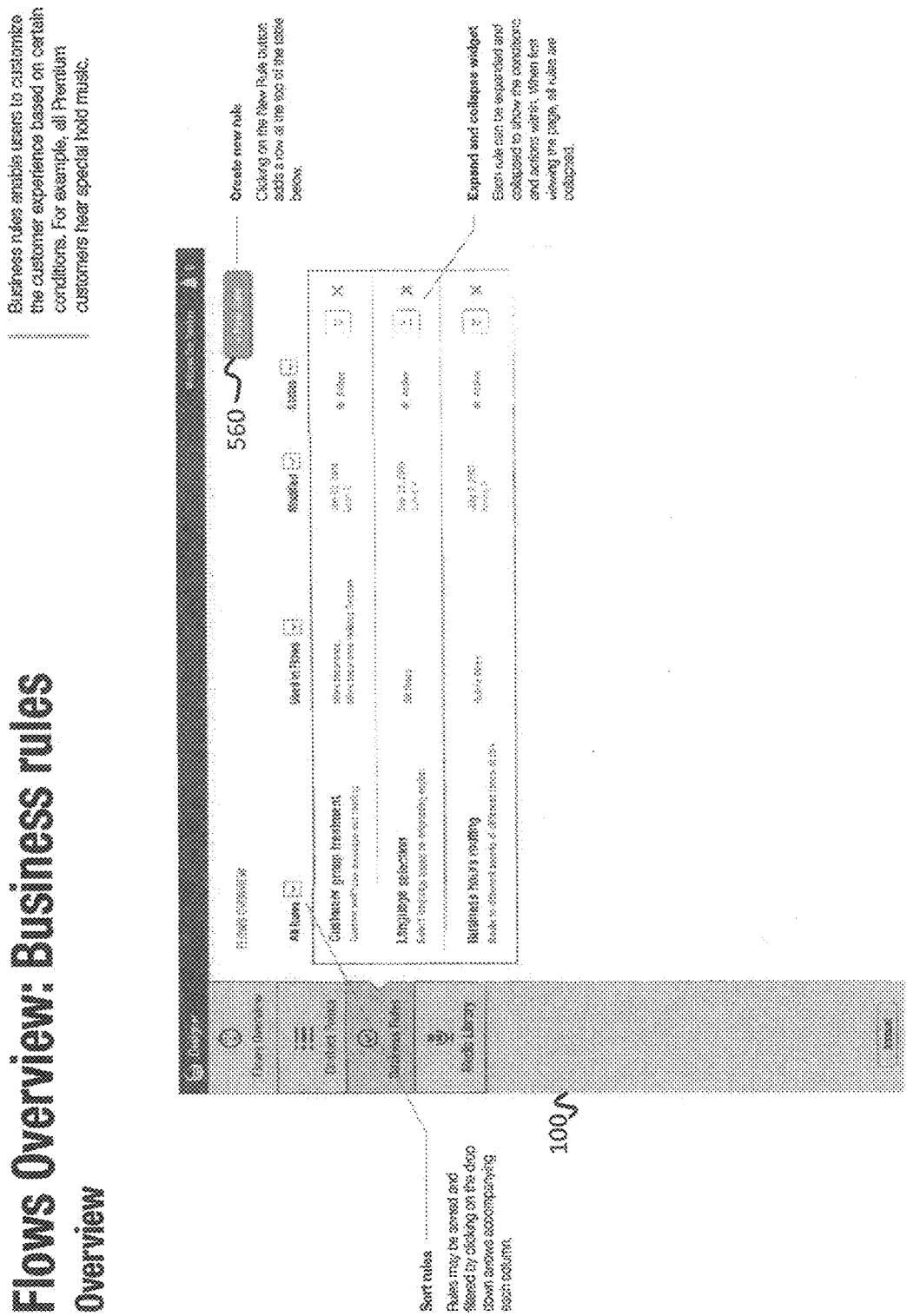
FIGS. 12A-12C are screen shots of an interface for creating and managing business rules for an interaction flow design, according to some embodiments of the present invention.
Figure 12B:
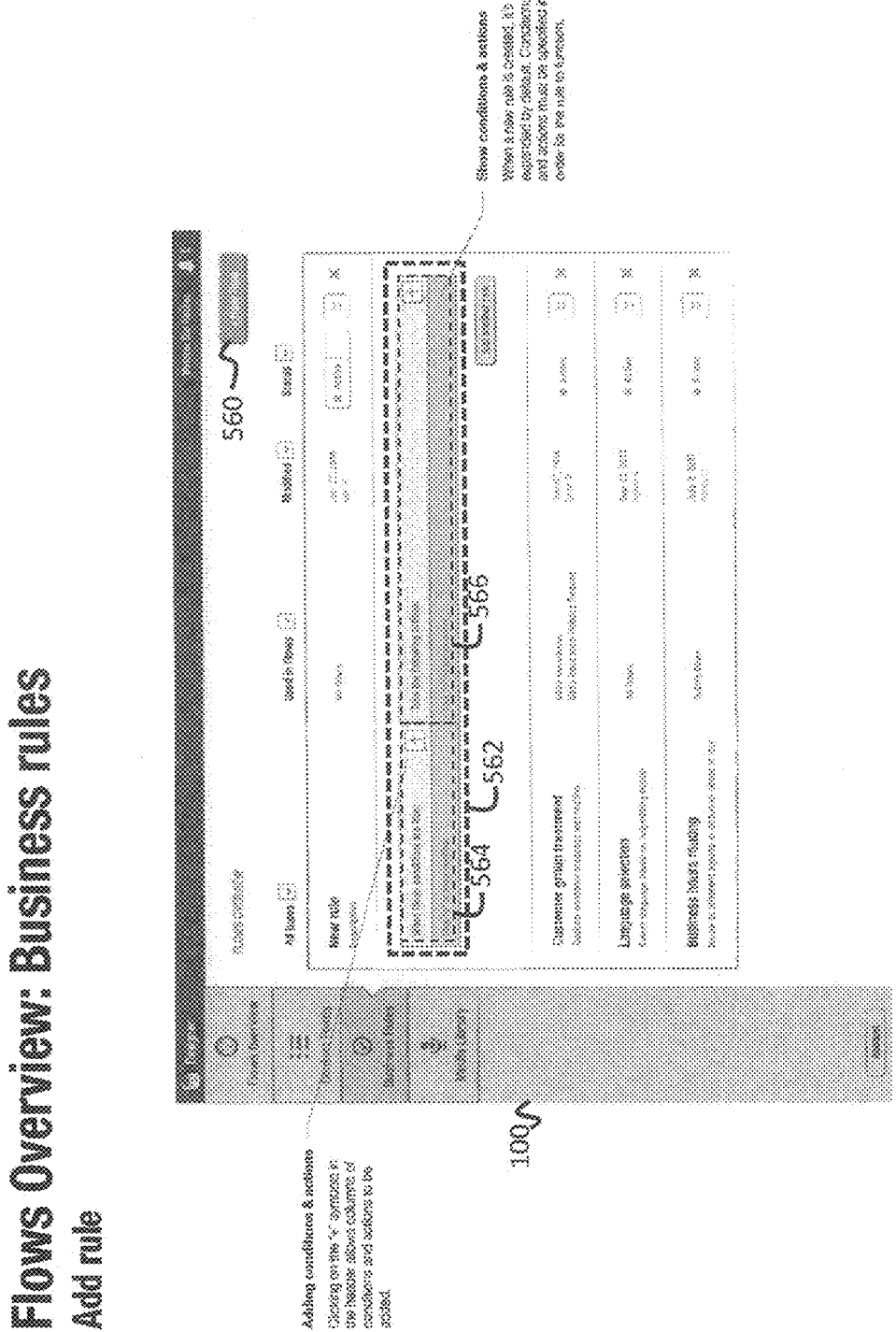
Figure 12C:
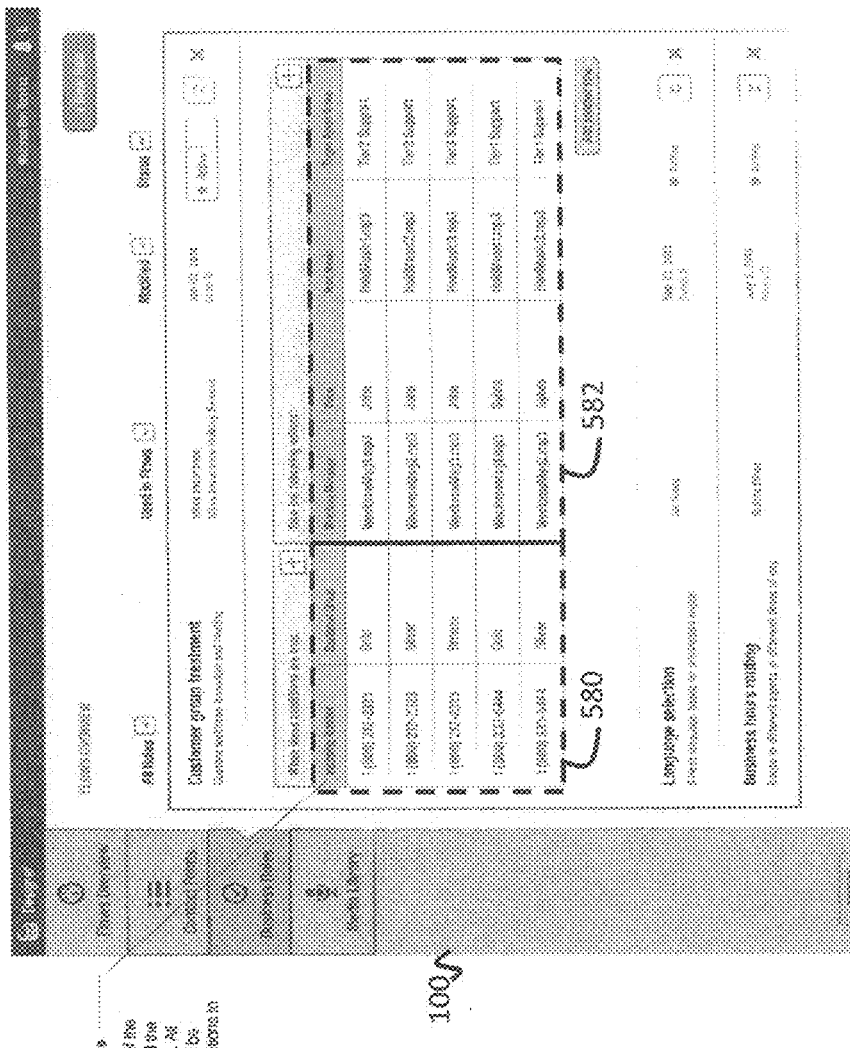

According to one embodiment, certain parameters may be taken out of the flow for making the parameter rule-based. FIGS. 12A-12C are screen shots of the GUI provided by the flow design tool as part of the interface 100 for setting one or more business rules for a flow design according to one embodiment of the invention. The business rule settings enable the designer of a flow design to customize the experience of customers or callers engaging in an interaction as part of an interaction flow according to conditions or criteria defined in the business rules. For example, the designer of a flow design may designate that certain customers (e.g., premium customers) hear certain hold music while on hold at a particular block in an interaction flow.

As illustrated in FIG. 12A, the interface 100 may include a new rule button 560 to initialize or create a new business rule for a given flow design. In response to the new rule button 560 being selected, the interface 100 may display a business rule window 562 including a condition parameter window 564 and an action parameter window 566 for creating or modifying the parameters of a new business rule, as illustrated in FIG. 12B.

As shown in FIG. 12C, the designer or agent 11 of the flow design may proceed with adding conditions 580 and corresponding actions 582 to take upon the conditions being satisfied. For example, according to some embodiments, the designer or agent 11 may include identifying information about customers or callers (such as their telephone number, name, customer group or status, etc.) and corresponding actions to take (e.g., playing specific hold music or messages, or providing varying levels of support corresponding to the predetermined importance of the customer) during an interaction if the conditions are satisfied. During an interaction, the interaction system 2 may monitor the status of an interaction and the one or more conditions of the business rules corresponding to the flow design, and take a corresponding action in response to the criteria of the conditions being met.

Figure 13A:
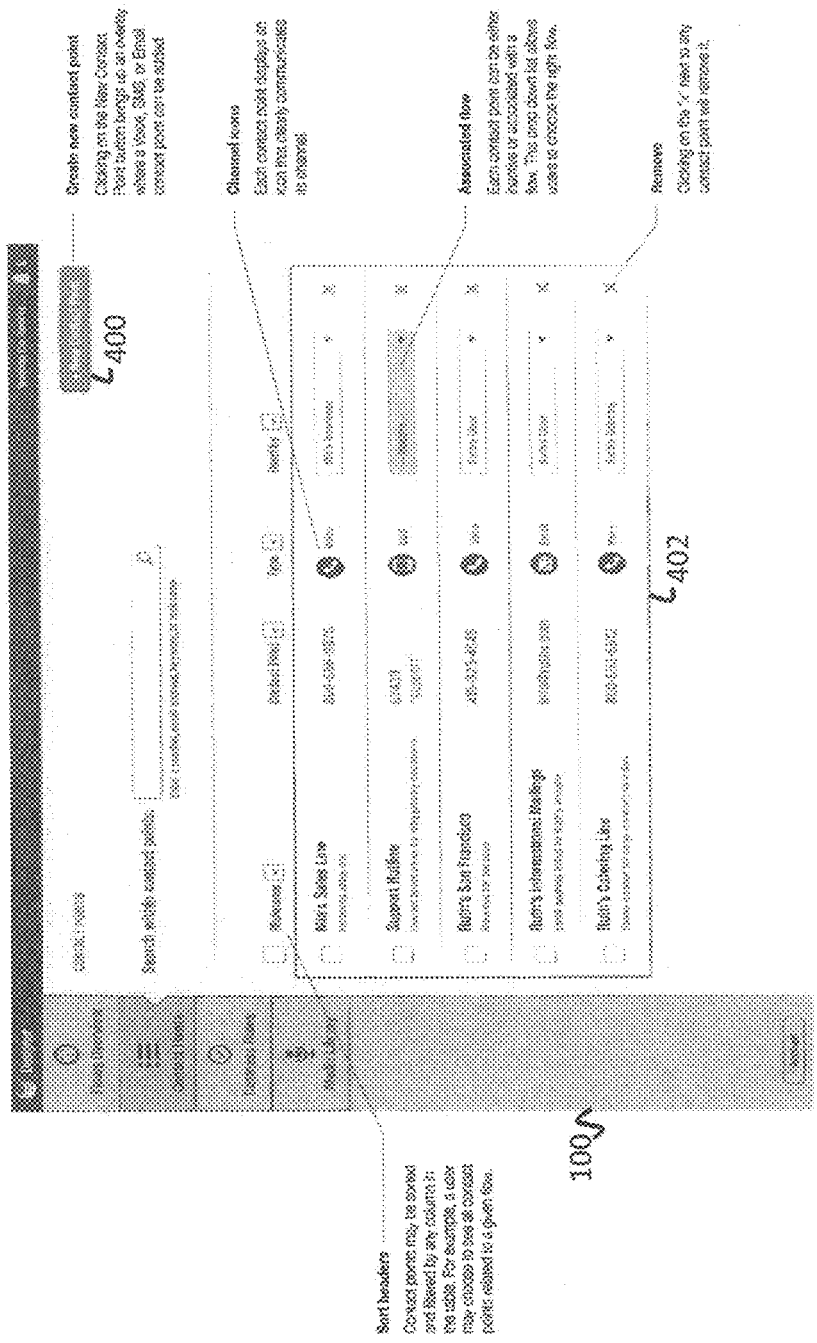
FIGS. 13A-13D are screen shots of an interface for creating contact points for an interaction, according to some embodiments of the present invention.

According to one embodiment, each flow may be associated with one or more contact points. FIG. 13A is a screenshot displaying different contact points associated with different flow according to one embodiment of the invention. For example, as illustrated in FIG. 13A, the interface 100 may display contact points associated with a particular account or flow design. The interface 100 may include a new contact point button 400 for creating a new contact point. In response to the interaction system 2 detecting that the new contact point button 400 is selected, the interface may display an overlay window in which a voice or text-based (e.g., SMS text or email) contact point may be added to the account, described in more detail below.

The interface 100 may further display a list or table 402 of contact points that have been created for a particular flow design or account. The designer or agent 11 interacting with the interface 100 may then configure the settings for each contact point, for example, by defining a name for the contact point, the contact point address (e.g., phone number, short code, email address, etc.), the type of communication channel or medium corresponding to the contact point address (e.g., voice, SMS text, email, etc.), and the flow design associated with the contact point. According to some embodiments, each contact point may be set to be inactive, or may be associated with one or more flow designs.

Figure 13B:
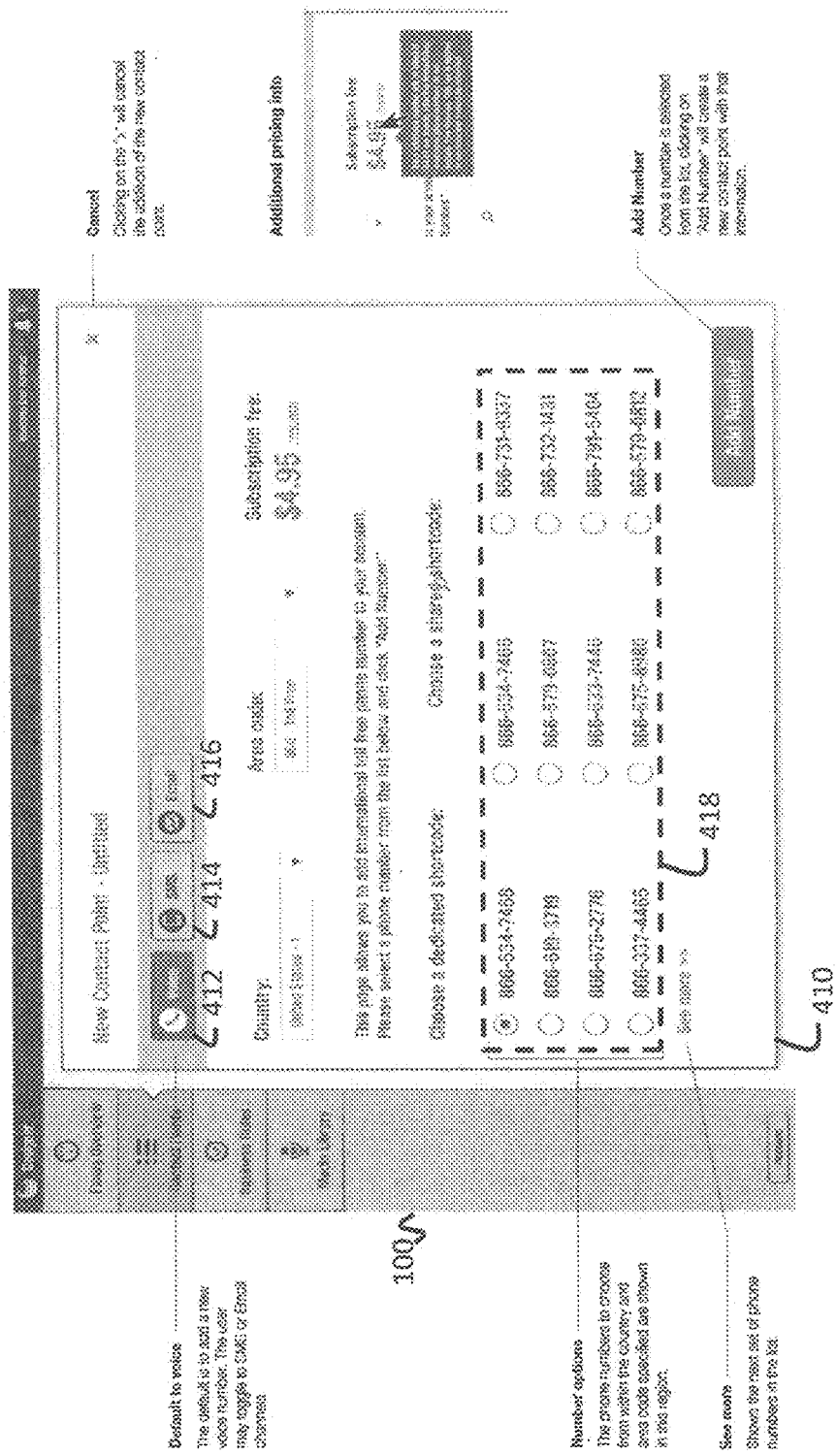
Figure 13C:
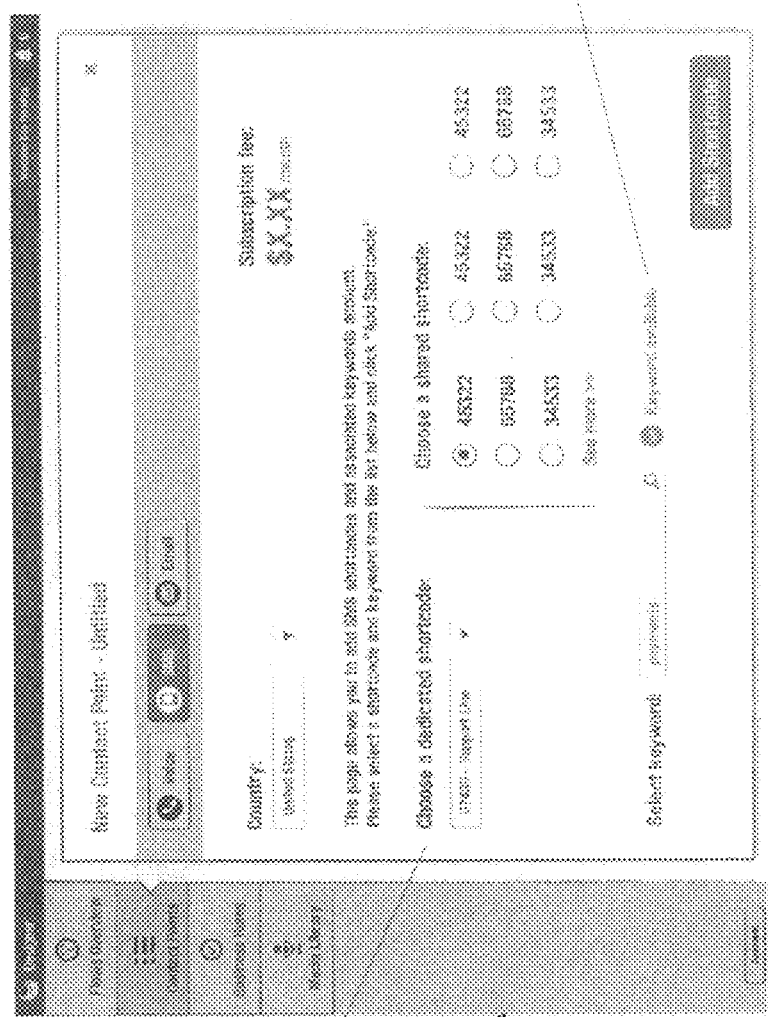
Figure 13D:
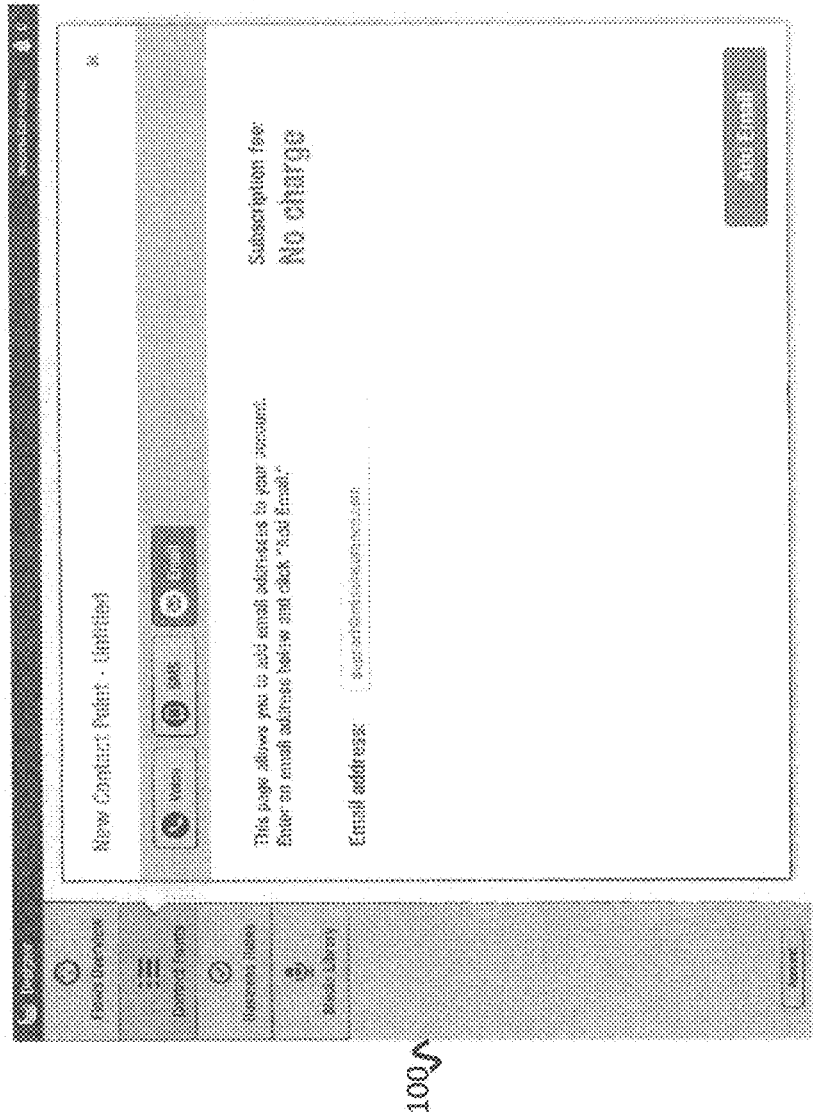

As shown in FIG. 13B, in response to the new contact point button 400 being selected, the interface 100 may display a new contact point window 410. The new contact point window 410 may include a plurality of communication channel buttons 412, 414, and 416 for defining the communication channel corresponding to the new contact point (e.g., voice, SMS text, email, etc.) For example, in response to the communication channel buttons 412, 414, or 416 being selected, the interface 100 may display various options or settings for defining the characteristics of the contact point such as the country or area code of a phone number. According to some embodiments, the interface 100 may further display choices among a plurality of contact point addresses (e.g., phone numbers from a pool of reserved phone numbers, as shown in FIG. 13B, short codes from a pool of reserved short codes, as shown in FIG. 13C, or an email address, as shown in FIG. 13D). The designer or agent 11 may then select from among the contact point choices (or provide an email address in the case of an email communication channel contact point) and assign the selected contact point address to the new contact point.

Thus, according to some embodiments, a contact center may select from a pool of contact points including contact points for voice, SMS, and email. Once a particular contact point is assigned to the contact center or a particular contact point within a contact center, the assigned contact point address becomes unavailable to the other contact centers or contact points. FIGS. 13B-13D are screenshots displaying the adding of contact points for different types of media channels according to one embodiment of the invention.

Figure 14A:
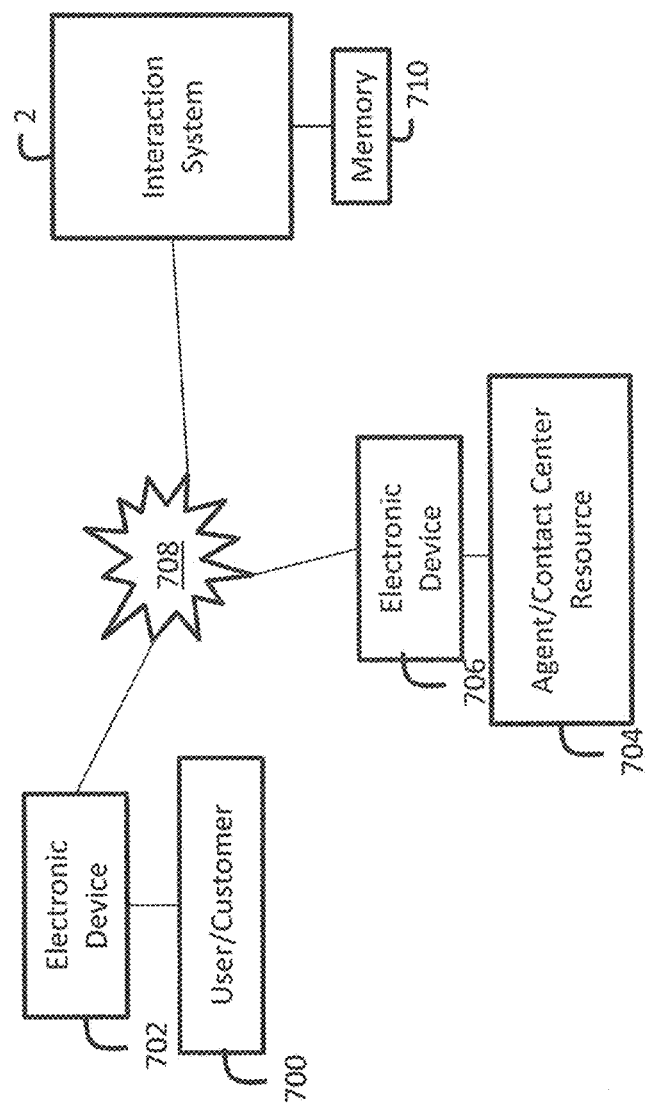
FIG. 14A is a block diagram illustrating various components engaging in an interaction in conjunction with an interaction system, according to embodiments of the present invention.

FIG. 14A is a block diagram illustrating various components engaging in an interaction in conjunction with an interaction system, according to embodiments of the present invention. As shown in FIG. 14A, a user 700 (e.g., end user 14 in FIG. 1) may operate an electronic device 702 for engaging in an interaction with an agent 704 (e.g., agent 11 in FIG. 1) operating an electronic device 706. The electronic device 702 may be in electronic communication with the electronic device 706 over a communication network 708 (e.g., a local area network or a wide area network, such as the wide area network 32 in FIG. 1). The electronic devices 702 and 706 are further in electronic communication with the interaction system 2 by way of the network 708.

According to some embodiments of the present invention, the electronic device 702 and 706 may connect to the communication network 708 using a telephone connection, satellite connection, cable connection, radio frequency communication, or any suitable wired or wireless data communication mechanism. To this end, the electronic devices 702 and 706 may take the form of a personal computer (PC), hand-held personal computer (HPC), television and set-top-box combination, personal digital assistant (PDA), tablet or touch screen computer system, telephone, cellular telephone, smartphone, or any other suitable electronics device capable of engaging in an interaction according to the design of the interaction system 2.

As discussed above, as part of the interaction system 2, agents of a contact center (or users of the interaction system 2 in partnership with the contact center) may design interaction flows using, for example, a graphical user interface that provides a mechanism for automatically generating code for each block or step in an interaction flow using a graphical representation of the block or step. Once a flow design is completed (e.g., by publishing or saving the flow design as discussed above), the interaction system 2 may store the flow design (or instructions corresponding to the various blocks of the flow design) as one or more data files in a memory 710 operating as part of the interaction system 2. The instructions corresponding to the various blocks of the flow design together form the routing strategy that is executed by the orchestration server 42 (or the interaction system 2) for handling an inbound (or outbound) interaction or communication.

During the course of the interaction, the interaction system 2 may monitor the interaction while executing the routing strategy of the corresponding flow design. Additionally, the interaction system 2 may facilitate transmitting and receiving information between the electronic devices 702 and 706 according to the instructions of the interaction flow design. According to some embodiments, the interaction system 2 may facilitate conducting the interaction through multiple communication channels (e.g., voice, SMS text, email, etc.) simultaneously, or switching between multiple communication channels during the course of the interaction.

For example, during the course of a voice interaction, the routing strategy may require or permit initiating a text-based communication channel to facilitate achieving the purpose of the interaction. The orchestration server 42 (or another component of the interaction system 2) may then switch the interaction channel or initiate a second communication channel to run in parallel with the first voice communication channel, and facilitate the exchange of text-based data between the electronic devices 702 and 706. According to some embodiments of the present invention, the orchestration server 42 (or another component of the interaction system 2) may monitor the interaction on each channel and store data obtained on each channel and provide that data as contextual data of the interaction as an input to subsequent or concurrent blocks within the flow design. Thus, the interaction system 2 may maintain master or overall contextual data for an interaction by monitoring the interaction in various communication channels or mediums, thereby reducing instances in which a customer may have to provide the same information in multiple communication channels.

Figure 14B:
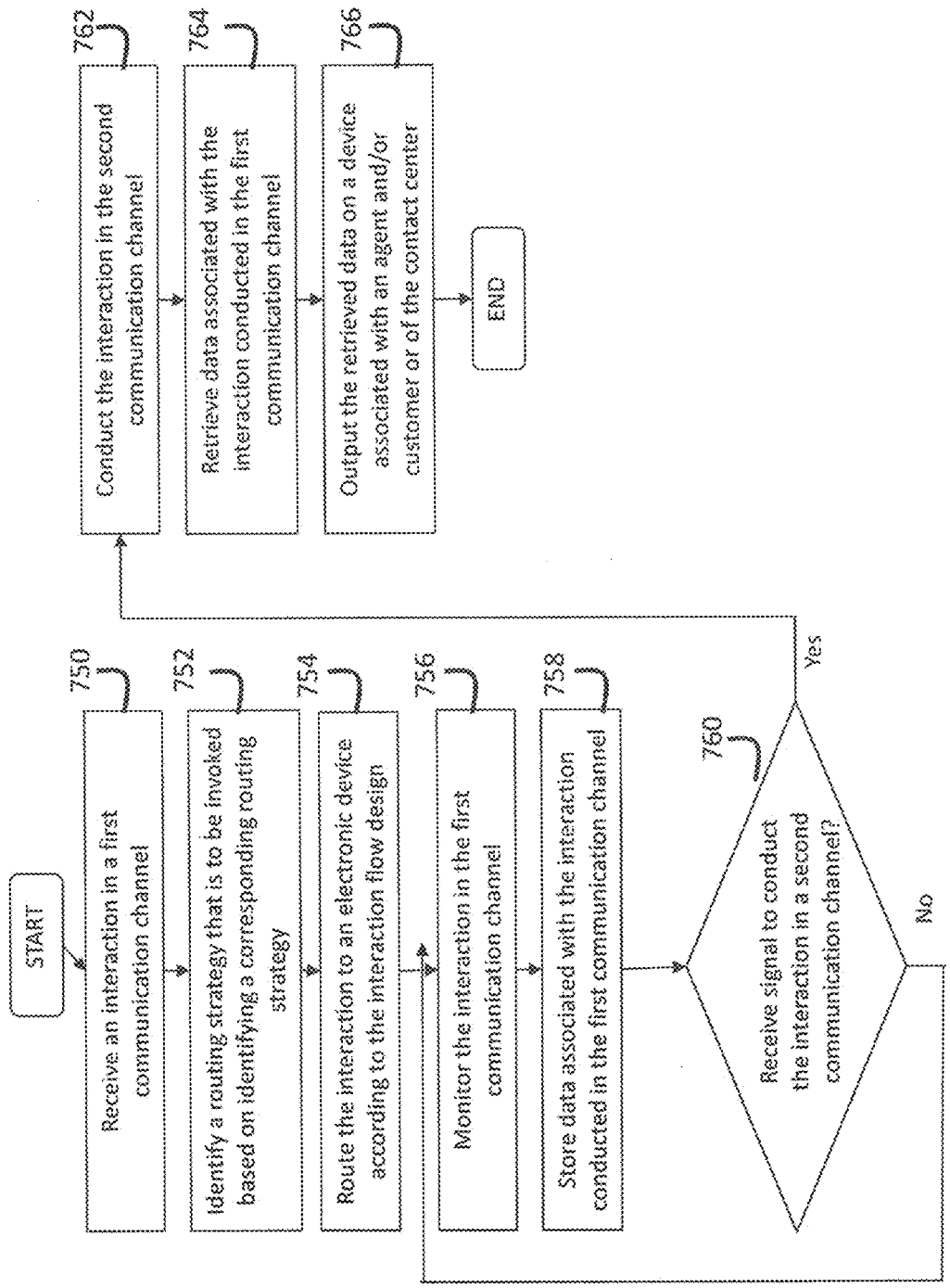
FIG. 14B is a flow diagram illustrating a process of executing an interaction flow, according to some embodiments of the present invention.

FIG. 14B is a flow diagram illustrating a process of executing an interaction flow according to embodiments of the present invention. The process starts and, at operation 750, the orchestration server 42 (or another component of the interaction system 2) receives an interaction in a first communication channel. For example, the orchestration server 42 (or another component of the interaction system 2) may receive an incoming or outgoing communication or interaction as part of a contact center environment, between a customer electronic device and a contact center resource (e.g., a contact center agent, an IVR system, a chatbot, etc.). According to one embodiment, an interaction object may be generated and stored in memory for maintaining data and context information of the interaction as soon as the interaction is detected. The interaction object may be generated, for example, by SIP server 44, and may include an interaction or session identification, an incoming address (e.g., the number called by the customer), a customer address (e.g., the customer's phone number), and interaction or context data that is updated during the interaction to reflect the information exchanged or determined by the interaction system 2 during the interaction.

At operation 752, the orchestration server 42 (or another component of the interaction system 2) identifies the routing strategy that is to be invoked, which routing strategy is identified as corresponding to a the interaction, and which may correspond to a predesigned or pre-generated flow. For example, the orchestration server 42 (or another component of the interaction system 2) may initiate a default routing strategy identified for a route point (e.g., telephone number), or the orchestration server 42 (or another component of the interaction system 2) may monitor the interaction (e.g., by way of voice or text-based content analysis) to determine the purpose or topic of the interaction, and then identify a predesigned routing strategy (e.g., generated from an interaction flow design) corresponding to the purpose or topic of the interaction.

At operation 754, the orchestration server 42 (or another component of the interaction system 2) routes the interaction to an electronic device (e.g., an agent device) according to the matched interaction flow design and, at operation 756, the orchestration server 42 (or another component of the interaction system 2) monitors the interaction in the first communication channel (e.g., by way of voice or text-based content analysis). During the course of the interaction, at operation 758, the orchestration server 42 (or another component of the interaction system 2) stores data associated with the interaction conducted in the first communication channel. For example, the orchestration server 42 (or another component of the interaction system 2) may monitor, collect, and store data about the customer's personal profile, their needs or desires, their demographic information, the progress of the interaction, etc. The data may be stored, for example, in the interaction object.

At operation 760, the orchestration server 42 (or another component of the interaction system 2) determines whether or not a signal to switch the interaction to a second communication channel is received. For example, during the course of an interaction being conducted in a voice channel, the interaction system may receive a signal to switch (or initiate in parallel) the interaction to (or conduct a sub-interaction in) a text-based communication channel (e.g., email, chat, or SMS text) to obtain additional information from the customer. The signal may be generated in response to a command from the customer and/or agent in response to a monitored event. For example, during the course of a voice interaction, the agent or customer may initiate sending a signal to switch the interaction to (or conduct a sub-interaction in) a text-based communication channel so that additional written information (such as an electronic signature) may be exchanged as part of the interaction. If such a signal is not received at operation 760, the orchestration server 42 (or another component of the interaction system 2) may return to operation 756 to continue monitoring the interaction in the first communication channel and storing relevant data associated with the interaction. If a signal to switch (or initiate in parallel) channels is received, however, the orchestration server 42 (or another component of the interaction system 2) may proceed to operation 762 to switch (or initiate in parallel) the interaction to the second communication channel. In this regard, messages are exchanged between the relevant servers to initiate conducting the interaction (or a sub-interaction) in the second communication channel. For example, if the switch is from voice to text, a signal may be transmitted to the multimedia/social media server 43. Each of the various servers and components of the interaction system 2 may then access the interaction object to retrieve or update the data stored therein after the interaction is switched to (or a sub-interaction is conducted in) the second communication channel.

At operation 764, the interaction system may retrieve data associated with the interaction conducted in the first communication channel, and at operation 766, the interaction system may output the retrieved data to an electronic device (e.g., associated with an agent and/or a customer of the contact center). For example, according to some embodiments, upon switching (or initiating in parallel) the interaction to the second communication channel, the interaction system may output, in the second communication channel, the data collected in the first communication channel to an electronic device associated with an agent or a customer of the contact center. For example, if the first communication channel is voice-based, and the second communication channel is text-based, the orchestration server 42 (or another component of the interaction system 2) may output a summary of relevant data collected in the first communication channel, or may output a transcript of the interaction in the first communication channel, to an agent or customer device. In this regard, a recording of the voice communication may be retrieved upon detecting the signal to conduct the interaction in the second communication channel, and a transcript or summary of the voice recording may be sent to an agent device and/or a customer device, thereby enabling the agent or customer to see, in second communication channel, what has occurred or been discussed in the first communication channel.

Thus, according to embodiments of the present invention, the orchestration server 42 (or another component of the interaction system 2) may facilitate tracking and monitoring interactions occurring in multiple communication channels, and provide relevant data obtained in a first communication channel as input in a second communication channel to enable the interaction to seamlessly transition between different communication channels.

Figure 14C:
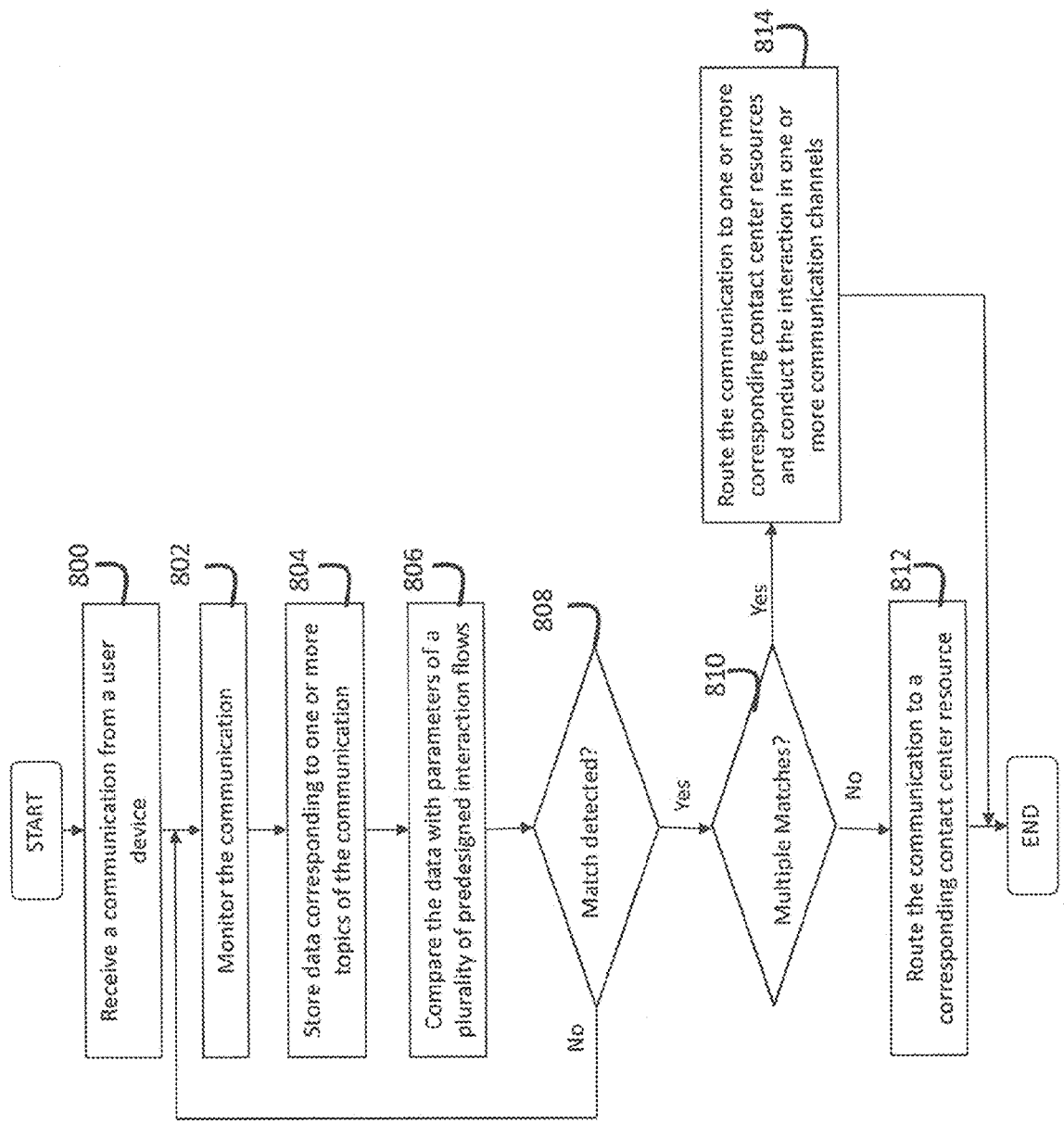
FIG. 14C is a flow diagram illustrating another process of executing an interaction flow, according to some embodiments of the present invention.

FIG. 14C is a flow diagram illustrating another process of executing an interaction flow according to embodiments of the present invention. At operation 800, the orchestration server 42 (or another component of the interaction system 2) receives a communication from a user device. According to some embodiments, the communication may be an unstructured communication that has not yet been matched with a corresponding interaction flow design. That is, the communication may be in the form of a chat, email, or voice communication in which the purpose of the communication at the time of initially receiving it may not be known to the orchestration server 42 (or another component of the interaction system 2), and therefore, it may not be appropriate to initiate a predesigned interaction flow corresponding to the communication. For example, a customer may initiate a chat communication on a website associated with the interaction system 2 (e.g., a social media website or page corresponding to the contact center), or call a phone number associated with the interaction system 2, and begin asking questions or explaining who they are or the purpose of their communication. According to some embodiments, the orchestration server 42 (or another component of the interaction system 2) may deliver messages or inquiries to the user to solicit information about the purpose or topic of the communication.

At operation 802, the orchestration server 42 (or another component of the interaction system 2) monitors the communication or interaction and, at operation 804, the orchestration server 42 (or another component of the interaction system 2) stores data corresponding to one or more topics of the communication. For example, according to some embodiments, a customer may initiate a communication (e.g., in a text or voice-based communication channel), and convey information indicating various topics or purposes for the communication (e.g., in the context of a telecommunication company contact center, a customer may initiate a chat session and explain that they want to upgrade their service plan and also upgrade their phone).

At operation 806, the orchestration server 42 (or another component of the interaction system 2) compares the stored data with parameters of a plurality of predesigned interaction flows. For example, the orchestration server 42 (or another component of the interaction system 2) may store data indicating various possible topics of conversation and determine that the communication matches one or more predesigned interaction flows.

At operation 808, the orchestration server 42 (or another component of the interaction system 2) determines whether or not the parameters of the one or more of the predesigned interaction flows matches the stored data. If a match is not found, the orchestration server 42 (or another component of the interaction system 2) returns to operation 802 to continue monitoring the communication and comparing data obtained from the communication to find one or more matching predesigned interaction flows. If a match is found at operation 808 (e.g., by determining that the data satisfies predetermined criteria for matching the communication with an interaction flow), the orchestration server 42 (or another component of the interaction system 2) may proceed, at block 810, to determine whether or not multiple predesigned interaction flow designed or interaction strategies correspond to or match the communication or interaction.

If, at block 810, the orchestration server 42 (or another component of the interaction system 2) identifies only one matching predesigned interaction flow or strategy, the orchestration server 42 (or another component of the interaction system 2) may proceed, at block 812, to route the communication to a corresponding contact center resource and proceed with executing the routing strategy of the matching predesigned interaction flow(s).

According to some embodiments, the orchestration server 42 (or another component of the interaction system 2) may identify a place or location within the matched flow to continue the interaction. For example, in some instances, as part of the unstructured communication, various operations of the matched interaction flow may be satisfied prior to identifying a matching interaction strategy. Thus, once a matching predesigned flow or strategy is identified, the orchestration server (or another component of the interaction system 2) may determine whether certain criteria or operations of the matched interaction flow have already been satisfied, and skip over such operations or blocks within the routing strategy to avoid repetitive operations during the interaction.

In the case of multiple matching interaction flows, the orchestration server 42 (or another component of the interaction system 2) may proceed, at block 814, to route the communication to one or more corresponding contact center resources and conduct the interaction in one or more different communication channels in parallel or sequentially. For example, multiple sub-interactions corresponding to the interaction may run concurrently or sequentially, with each sub-interaction being marked with a unique identification tag (e.g., stored in an interaction object corresponding to the interaction or sub-interactions). According to some embodiments, the multiple sub-interactions may be merged into a single interaction or communication as perceived by the user. Thus, according to some embodiments of the present invention, the orchestration server 42 (or another component of the interaction system 2) may enable the instructions of the multiple matching interaction flows to be executed concurrently or sequentially, according to the design and function of the interaction system 2 and/or the preferences of the customer, while maintaining information obtained during one interaction flow and providing that information as input to the other interaction flow(s) to reduce the need to exchange the same information with the customer multiple times.

As described above, the interaction system 2 may provide functionality for creating or designing an interaction flow, and for executing the interaction flow according to instructions generated during the creation of the interaction flow. Although various operations and process steps have been described above, various modifications may be made to the operations described above without departing from the spirit and scope of the present invention. For example, certain operations (e.g., the operations described with respect to FIGS. 14B and 14C) may be omitted, additional operations may be included, or the order of the operations may be modified according to some embodiments of the present invention.

Each of the various servers, controllers, switches, gateways, engines, and/or modules (collectively referred to as servers) in the afore-described figures may be a process or thread, running on one or more processors, in one or more computing devices 1500 (e.g., FIG. 15A, FIG. 15B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 15A:
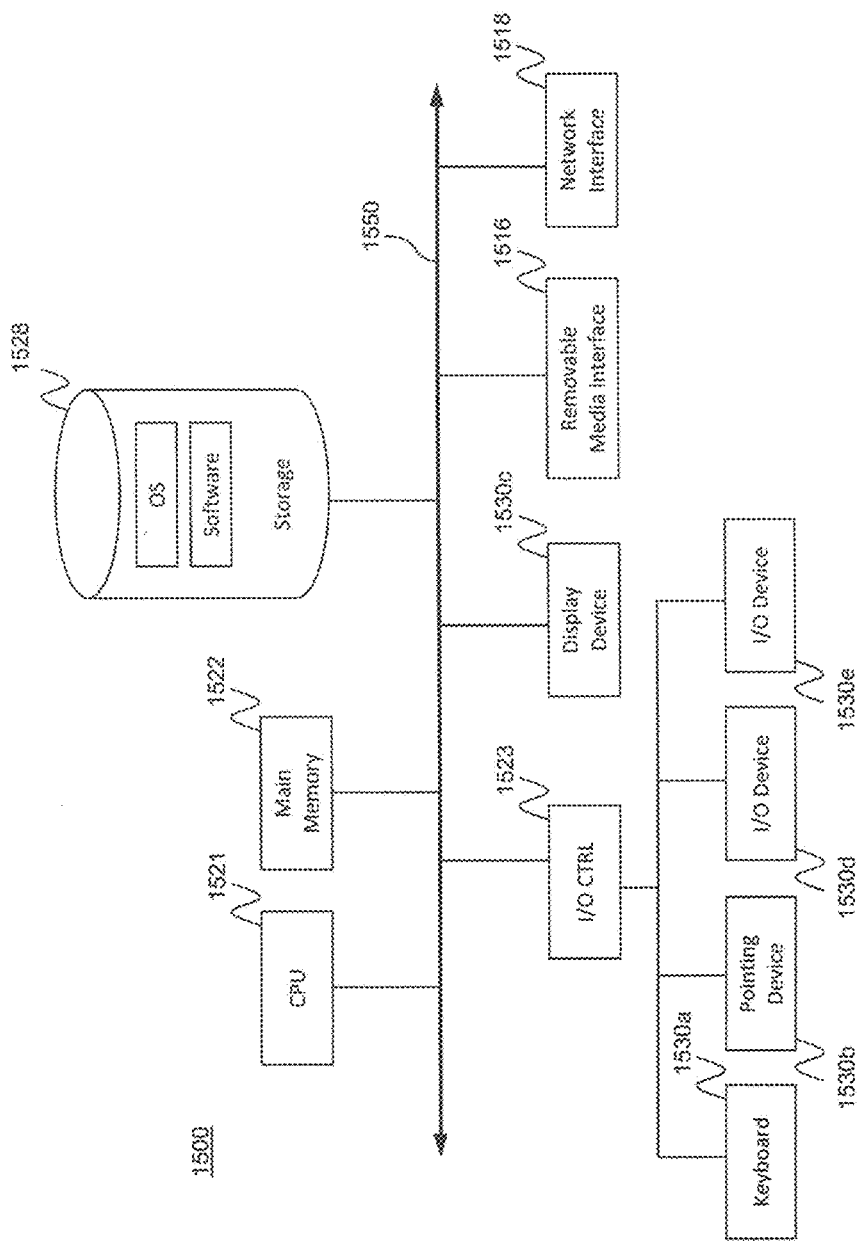
FIG. 15A is a block diagram of a computing device according to an embodiment of the present invention.
Figure 15B:
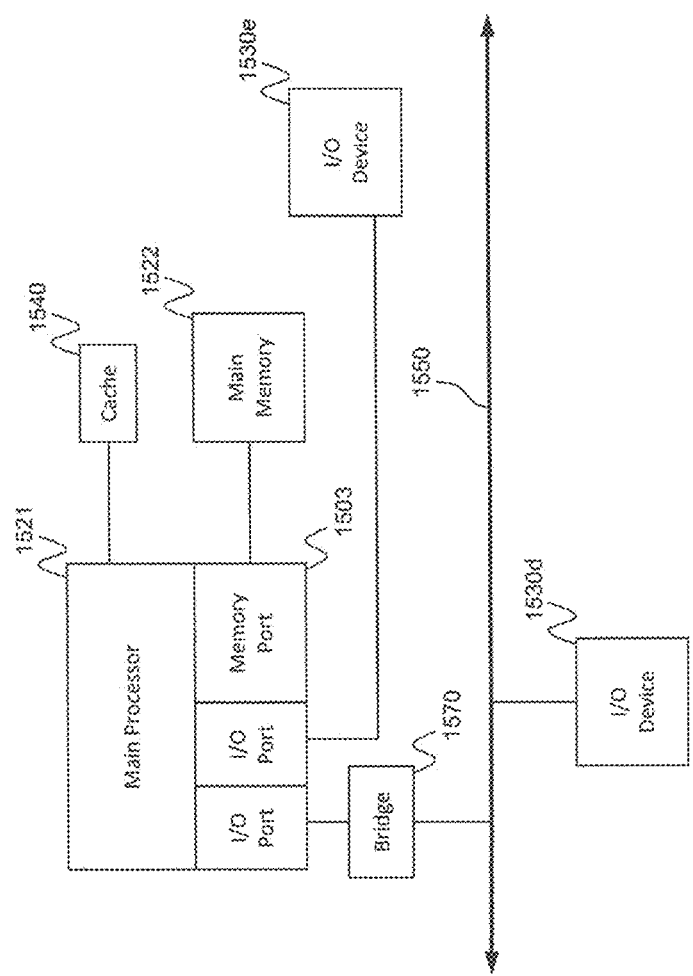
FIG. 15B is a block diagram of a computing device according to an embodiment of the present invention.

FIG. 15A and FIG. 15B depict block diagrams of a computing device 1500 as may be employed in exemplary embodiments of the present invention. Each computing device 1500 includes a central processing unit 1521 and a main memory unit 1522. As shown in FIG. 15A, the computing device 1500 may also include a storage device 1528, a removable media interface 1516, a network interface 1518, an input/output (I/O) controller 1523, one or more display devices 1530*c*, a keyboard 1530*a* and a pointing device 1530*b*, such as a mouse. The storage device 1528 may include, without limitation, storage for an operating system and software. As shown in FIG. 15B, each computing device 1500 may also include additional optional elements, such as a memory port 1503, a bridge 1570, one or more additional input/output devices 1530*d*, 1530*e* and a cache memory 1540 in communication with the central processing unit 1521. The input/output devices 1530*a*, 1530*b*, 1530*d*, and 1530*e* may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 15A, the central processing unit 1521 communicates with the main memory 1522 via a system bus 1550. As shown in FIG. 15B, the central processing unit 1521 may also communicate directly with the main memory 1522 via a memory port 1503.

FIG. 15B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 15A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 15B depicts an embodiment of a computer 1500 in which the central processing unit 1521 communicates directly with I/O device 1530e. FIG. 15B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 15A, may control the I/O devices. The I/O controller may control one or more I/O devices such as a keyboard 1530a and a pointing device 1530b, e.g., a mouse or optical pen.

Referring again to FIG. 15A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 15A and FIG. 15B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 15D:
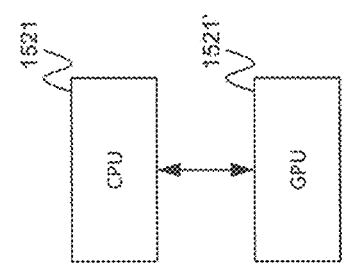
FIG. 15D is a block diagram of a computing device according to an embodiment of the present invention.
Figure 15C:
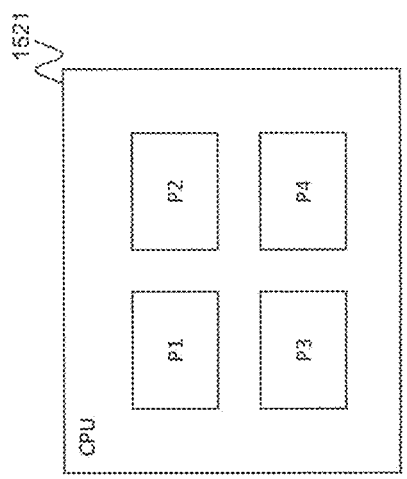
FIG. 15C is a block diagram of a computing device according to an embodiment of the present invention.

As shown in FIG. 15C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 15D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 15E:
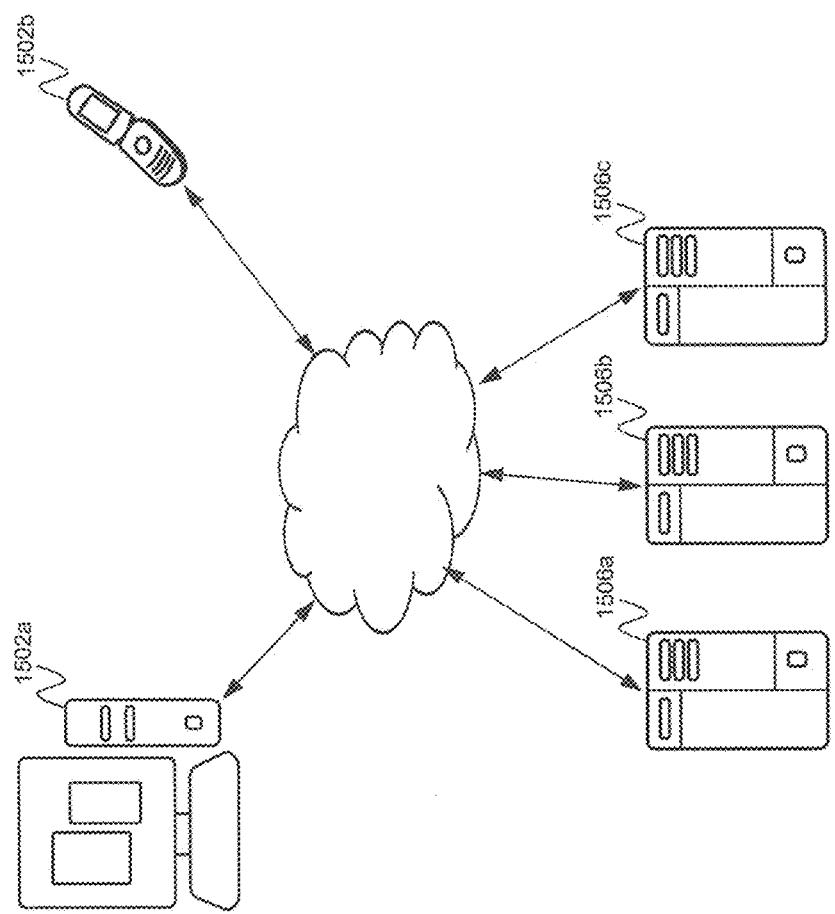
FIG. 15E is a block diagram of a network environment including several computing devices according to an embodiment of the present invention.

A computing device may be one of a plurality of machines connected by a network, or it may comprise a plurality of machines so connected. FIG. 15E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 15E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 15E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by claims and their equivalents rather than the foregoing description.

What is claimed is:

1. A system for managing an interaction flow for a contact center, the system comprising:
   a processor; and
   a memory coupled to the processor, wherein the memory has stored thereon, instructions that, when executed by the processor, cause the processor to:
      display on a graphical display, an interaction flow canvas and an interaction block selection tool;
      receive a user input to add a first interaction block to the interaction flow canvas;
      display an indication of a suggested location for positioning the first interaction block in response to receiving the user input to add the first interaction block to the interaction flow canvas;
      generate a first interaction instruction corresponding to the first interaction block; and
      receive a user input to add a second interaction block to the interaction flow canvas, wherein the first interaction instruction comprises an instruction for proceeding to the second interaction block after a criterion of the first interaction block is satisfied.

2. The system of claim 1, wherein the instructions further cause the processor to modify the first interaction instruction after receiving the user input to add the second interaction block to generate an outgoing instruction.

3. The system of claim 1, wherein the instructions further cause the processor to:
   generate a first flow path and a second flow path originating from the first interaction block; and
   join the first flow path and the second flow path at the second interaction block.

4. The system of claim 3, wherein the first interaction instruction comprises an instruction to split the flow into the first flow path and the second flow path, wherein the first flow path and the second flow path comprise a first communication channel block and a second communication channel block, respectively.

5. The system of claim 1, wherein the instructions further cause the processor to generate the first interaction instruction according to a predefined parameter of the first interaction block.

6. The system of claim 1, wherein the instructions further cause the processor to display a recommendation for the second interaction block in response to receiving the user input to add the first interaction block to the interaction flow canvas.

7. The system of claim 1, wherein the instructions further cause the processor to display a plurality of channel options corresponding to the first interaction block.

8. The system of claim 7, wherein the instructions further cause the processor to:
   detect a selection of one of the plurality of channel options; and automatically display an attribute of the first interaction block in response to detecting the selection of the one of the plurality of channel options.

9. A system for managing an interaction flow for a contact center, the system comprising:
- a processor; and
- a memory coupled to the processor, wherein the memory has stored thereon, instructions that, when executed by the processor, cause the processor to:
  - display on a graphical display, an interaction flow canvas and an interaction block selection tool;
  - receive a user input to add a first interaction block to the interaction flow canvas;
  - generate a first interaction instruction corresponding to the first interaction block;
  - receive a user input to add a second interaction block to the interaction flow canvas, wherein the first interaction instruction comprises an instruction for proceeding to the second interaction block after a criterion of the first interaction block is satisfied;
  - generate a first flow path and a second flow path originating from the first interaction block; and
  - join the first flow path and the second flow path at the second interaction block,
- wherein the instructions further cause the processor to generate a second interaction instruction corresponding to the second interaction block, the second interaction instructions comprising an instruction to wait until an action at the first flow path and an action at the second flow path are both completed before proceeding to a subsequent block in the interaction flow.

10. The system of claim 9, wherein the instructions further cause the processor to display an indication of a suggested location for positioning the first interaction block in response to receiving the user input to add the first interaction block to the interaction flow canvas.

11. The system of claim 9, wherein the instructions further cause the processor to modify the first interaction instruction after receiving the user input to add the second interaction block to generate an outgoing instruction.

12. The system of claim 9, wherein the instructions further cause the processor to:
- generate a first flow path and a second flow path originating from the first interaction block; and
- join the first flow path and the second flow path at the second interaction block.

13. A system for managing an interaction flow for a contact center, the system comprising:
- a processor; and
- a memory coupled to the processor, wherein the memory has stored thereon, instructions that, when executed by the processor, cause the processor to:
  - display on a graphical display, an interaction flow canvas and an interaction block selection tool;
  - receive a user input to add a first interaction block to the interaction flow canvas;
  - generate a first interaction instruction corresponding to the first interaction block; and
  - receive a user input to add a second interaction block to the interaction flow canvas, wherein the first interaction instruction comprises an instruction for proceeding to the second interaction block after a criterion of the first interaction block is satisfied;
  - generate the first interaction instruction according to a predefined parameter of the first interaction block;
  - display a channel selection option for selecting a communication channel corresponding to the first interaction block;
  - detect a selection of the channel selection option;
  - detect a selection of an alternative communication channel within the channel selection option; and
  - modify the first interaction instruction according to the alternative communication channel.

14. The system of claim 13, wherein the instructions further cause the processor to modify the first interaction instruction after receiving the user input to add the second interaction block to generate an outgoing instruction.

15. The system of claim 13, wherein the instructions further cause the processor to:
- generate a first flow path and a second flow path originating from the first interaction block; and
- join the first flow path and the second flow path at the second interaction block.

16. A system for managing an interaction flow for a contact center, the system comprising:
- a processor; and
- a memory coupled to the processor, wherein the memory has stored thereon, instructions that, when executed by the processor, cause the processor to:
  - display on a graphical display, an interaction flow canvas and an interaction block selection tool;
  - receive a user input to add a first interaction block to the interaction flow canvas;
  - generate a first interaction instruction corresponding to the first interaction block;
  - receive a user input to add a second interaction block to the interaction flow canvas, wherein the first interaction instruction comprises an instruction for proceeding to the second interaction block after a criterion of the first interaction block is satisfied;
  - detect a selection of the first interaction block after the first interaction block is positioned on the canvas; and
  - display a view of the first interaction block and an adjacent interaction block in response to detecting the selection of the first interaction block.

17. The system of claim 16, wherein the instructions further cause the processor to modify the first interaction instruction after receiving the user input to add the second interaction block to generate an outgoing instruction.

18. The system of claim 16, wherein the instructions further cause the processor to:
- generate a first flow path and a second flow path originating from the first interaction block; and
- join the first flow path and the second flow path at the second interaction block.

19. A system for managing an interaction flow for a contact center, the system comprising:
- a processor; and
- a memory coupled to the processor, wherein the memory has stored thereon, instructions that, when executed by the processor, cause the processor to:
  - display on a graphical display, an interaction flow canvas and an interaction block selection tool;
  - receive a user input to add a first interaction block to the interaction flow canvas;
  - generate a first interaction instruction corresponding to the first interaction block;
  - receive a user input to add a second interaction block to the interaction flow canvas, wherein the first interaction instruction comprises an instruction for proceeding to the second interaction block after a criterion of the first interaction block is satisfied;

invoke a routing strategy associated with the interaction flow; and display a graphical representation of a volume of traffic corresponding to connections of the interaction flow.

20. The system of claim 19, wherein the instructions further cause the processor to modify the first interaction instruction after receiving the user input to add the second interaction block to generate an outgoing instruction.

21. The system of claim 19, wherein the instructions further cause the processor to:

generate a first flow path and a second flow path originating from the first interaction block; and join the first flow path and the second flow path at the second interaction block.

22. A method for managing an interaction flow for a contact center, the method comprising:

displaying, by a processor, on a graphical display, an interaction flow canvas and an interaction block selection tool;

receiving, by the processor, a user input to add a first interaction block to the interaction flow canvas;

displaying, by the processor, an indication of a suggested location for positioning the first interaction block in response to receiving the user input to add the first interaction block to the interaction flow canvas;

generating, by the processor, a first interaction instruction corresponding to the first interaction block; and receiving, by the processor, a user input to add a second interaction block to the interaction flow canvas, wherein the first interaction instruction comprises an instruction for proceeding to the second interaction block after a criterion of the first interaction block is satisfied.

23. The method of claim 22, further comprising modifying, by the processor, the first interaction instruction after receiving the user input to add the second interaction block to generate an outgoing instruction.

24. The method of claim 22, further comprising:

generating, by the processor, a first flow path and a second flow path originating from the first interaction block; and joining, by the processor, the first flow path and the second flow path at the second interaction block.

25. The method of claim 24, wherein the first interaction instruction comprises an instruction to split the flow into the first flow path and the second flow path, wherein the first flow path and the second flow path comprise a first communication channel block and a second communication channel block, respectively.

26. The method of claim 22, further comprising displaying, by the processor, a recommendation for the second interaction block in response to receiving the user input to add the first interaction block to the interaction flow canvas.

27. A method for managing an interaction flow for a contact center, the method comprising:

displaying, by a processor, on a graphical display, an interaction flow canvas and an interaction block selection tool;

receiving, by the processor, a user input to add a first interaction block to the interaction flow canvas;

generating, by the processor, a first interaction instruction corresponding to the first interaction block;

receiving, by the processor, a user input to add a second interaction block to the interaction flow canvas, wherein the first interaction instruction comprises an instruction for proceeding to the second interaction block after a criterion of the first interaction block is satisfied;

generating, by the processor, a first flow path and a second flow path originating from the first interaction block;

joining, by the processor, the first flow path and the second flow path at the second interaction block; and generating, by the processor, a second interaction instruction corresponding to the second interaction block, the second interaction instructions comprising an instruction to wait until an action at the first flow path and an action at the second flow path are both completed before proceeding to a subsequent block in the interaction flow.

28. The method of claim 27, further comprising modifying, by the processor, the first interaction instruction after receiving the user input to add the second interaction block to generate an outgoing instruction.

29. The method of claim 27, further comprising:

generating, by the processor, a first flow path and a second flow path originating from the first interaction block; and joining, by the processor, the first flow path and the second flow path at the second interaction block.

30. A method for managing an interaction flow for a contact center, the method comprising:

displaying, by a processor, on a graphical display, an interaction flow canvas and an interaction block selection tool;

receiving, by the processor, a user input to add a first interaction block to the interaction flow canvas;

generating, by the processor, a first interaction instruction corresponding to the first interaction block;

receiving, by the processor, a user input to add a second interaction block to the interaction flow canvas, wherein the first interaction instruction comprises an instruction for proceeding to the second interaction block after a criterion of the first interaction block is satisfied;

invoking, by the processor, a routing strategy associated with the interaction flow; and displaying, by the processor, a graphical representation of a volume of traffic corresponding to connections of the interaction flow.

31. The method of claim 30, further comprising modifying, by the processor, the first interaction instruction after receiving the user input to add the second interaction block to generate an outgoing instruction.

32. The method of claim 30, further comprising:

generating, by the processor, a first flow path and a second flow path originating from the first interaction block; and joining, by the processor, the first flow path and the second flow path at the second interaction block.

33. A method for managing an interaction flow for a contact center, the method comprising:

displaying, by a processor, on a graphical display, an interaction flow canvas and an interaction block selection tool;

receiving, by the processor, a user input to add a first interaction block to the interaction flow canvas;

generating, by the processor, a first interaction instruction corresponding to the first interaction block;

receiving, by the processor, a user input to add a second interaction block to the interaction flow canvas, wherein the first interaction instruction comprises an instruction for proceeding to the second interaction block after a criterion of the first interaction block is satisfied;

generating, by the processor, the first interaction instruction according to a predefined parameter of the first interaction block;

displaying, by the processor, a channel selection option for selecting a communication channel corresponding to the first interaction block;

detecting, by the processor, a selection of the channel selection option;

detecting, by the processor, a selection of an alternative communication channel within the channel selection option; and modifying, by the processor, the first interaction instruction according to the alternative communication channel.

34. The method of claim 33, further comprising modifying, by the processor, the first interaction instruction after receiving the user input to add the second interaction block to generate an outgoing instruction.

35. The method of claim 33, further comprising:
generating, by the processor, a first flow path and a second flow path originating from the first interaction block; and
joining, by the processor, the first flow path and the second flow path at the second interaction block.

36. A method for managing an interaction flow for a contact center, the method comprising:
displaying, by a processor, on a graphical display, an interaction flow canvas and an interaction block selection tool;
receiving, by the processor, a user input to add a first interaction block to the interaction flow canvas;
generating, by the processor, a first interaction instruction corresponding to the first interaction block;
receiving, by the processor, a user input to add a second interaction block to the interaction flow canvas, wherein the first interaction instruction comprises an instruction for proceeding to the second interaction block after a criterion of the first interaction block is satisfied;
detecting, by the processor, a selection of the first interaction block after the first interaction block is positioned on the canvas; and
displaying, by the processor, a view of the first interaction block and an adjacent interaction block in response to detecting the selection of the first interaction block.

37. The method of claim 36, further comprising modifying, by the processor, the first interaction instruction after receiving the user input to add the second interaction block to generate an outgoing instruction.

38. The method of claim 36, further comprising:
generating, by the processor, a first flow path and a second flow path originating from the first interaction block; and
joining, by the processor, the first flow path and the second flow path at the second interaction block.

* * * * *